US006880161B2

(12) United States Patent
Kido

(10) Patent No.: US 6,880,161 B2
(45) Date of Patent: Apr. 12, 2005

(54) CAM STRUCTURE AND DISK EXCHANGE SYSTEM USING THE SAME

(75) Inventor: Kunio Kido, Nagano (JP)

(73) Assignee: Tokyo Pigeon Co., Ltd., Tokyo (JP)

( * ) Notice: Subject to any disclaimer, the term of this patent is extended or adjusted under 35 U.S.C. 154(b) by 620 days.

(21) Appl. No.: 10/068,464

(22) Filed: Feb. 6, 2002

(65) Prior Publication Data

US 2002/0114227 A1 Aug. 22, 2002

(30) Foreign Application Priority Data

Feb. 16, 2001 (JP) ........................................ 2001-040869

(51) Int. Cl.[7] .......................... G11B 17/30; G11B 21/02
(52) U.S. Cl. ................... 720/635; 369/30.9; 369/30.91
(58) Field of Search .......................... 369/30.9, 30.91, 369/30.98, 30.85; 720/608, 607, 661, 635, 636, 637, 638

(56) References Cited

U.S. PATENT DOCUMENTS

| | | | | |
|---|---|---|---|---|
| 3,838,861 A | * | 10/1974 | Hammond et al. | ...... 369/41.01 |
| 4,701,899 A | * | 10/1987 | d'Alayer de Costemor d'Arc | ................................................................. 369/30.78 |
| 5,123,005 A | * | 6/1992 | Kurosu | ........................ 720/602 |
| 5,365,506 A | * | 11/1994 | Lee | ............................. 720/612 |
| 5,463,611 A | * | 10/1995 | Kim | ......................... 369/30.85 |
| 5,544,147 A | * | 8/1996 | Koizumi et al. | .......... 369/30.85 |
| 5,555,239 A | * | 9/1996 | Takai et al. | ............... 369/30.85 |
| 5,629,923 A | * | 5/1997 | Hisatomi | .................... 720/615 |
| 5,754,519 A | * | 5/1998 | Bando | ..................... 369/30.89 |
| 6,044,054 A | * | 3/2000 | Shiomi | ........................ 720/607 |
| 6,175,545 B1 | * | 1/2001 | Akama et al. | ............... 720/663 |
| 6,545,967 B1 | * | 4/2003 | Kubokawa | .................. 720/615 |
| 6,744,704 B1 | * | 6/2004 | Funaya et al. | ........... 369/30.85 |

FOREIGN PATENT DOCUMENTS

| | | | | | |
|---|---|---|---|---|---|
| EP | 0481640 A | * | 4/1992 | ........... | G11B/17/03 |
| JP | 63300477 A | * | 12/1988 | ........... | G11B/25/04 |
| JP | 63300479 A | * | 12/1988 | ........... | G11B/25/04 |
| JP | 03283052 A | * | 12/1991 | ........... | G11B/17/04 |
| JP | 05135470 A | * | 6/1993 | ........... | G11B/17/04 |

* cited by examiner

*Primary Examiner*—Allen Heinz
*Assistant Examiner*—Christopher R. Magee
(74) *Attorney, Agent, or Firm*—Hogan & Hartson, LLP

(57) ABSTRACT

A cam structure is equipped with a first cam that displaces a first follower section in a radial direction, a second follower section that rotates with the first cam and has at least three support pins, and a second cam that displaces the second follower section in an axial direction. The first cam is formed from divided segments defining at least three arcuate surfaces with different radiuses and sloped connection surfaces that connect the arcuate surfaces and are provided in ranges that give appropriate pressure angles with respect to the first follower section, and the second cam is provided with cam sections, each of the cam sections being divided in the radial direction in the number corresponding to the number of the support pins. The divided cam sections of the second cam are disposed at positions arranged in a circumferential direction in a manner that displacements in the axial direction of the second follower section are timed with displacements in the radial direction of the first follower section.

22 Claims, 61 Drawing Sheets

FIG. 17(A)
FIG. 17(B)
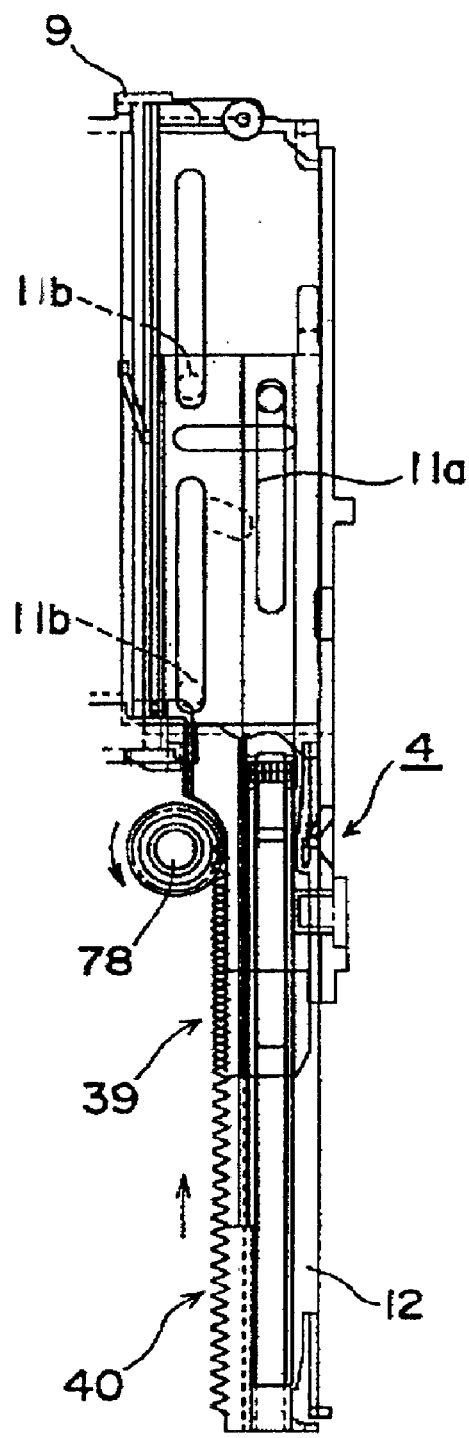
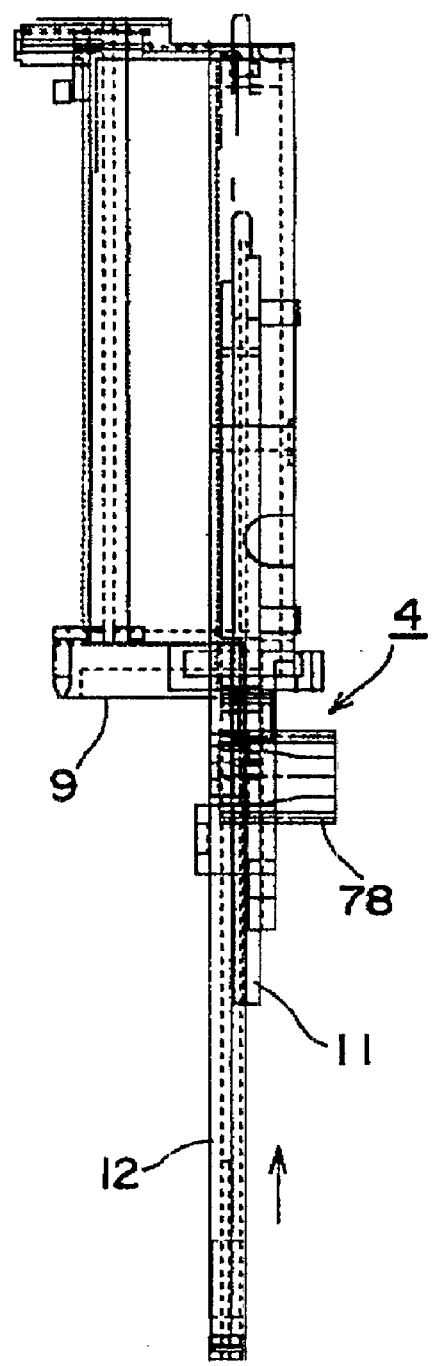

FIG. 41(A)
FIG. 41(B)
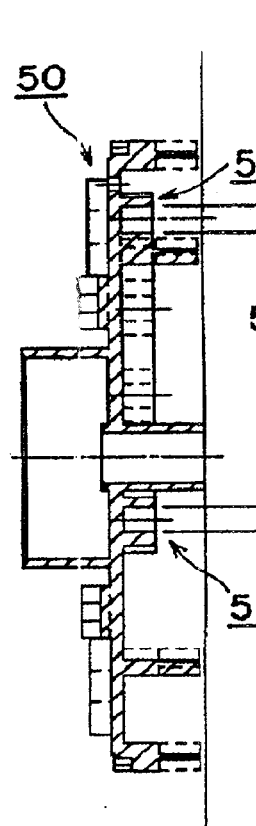
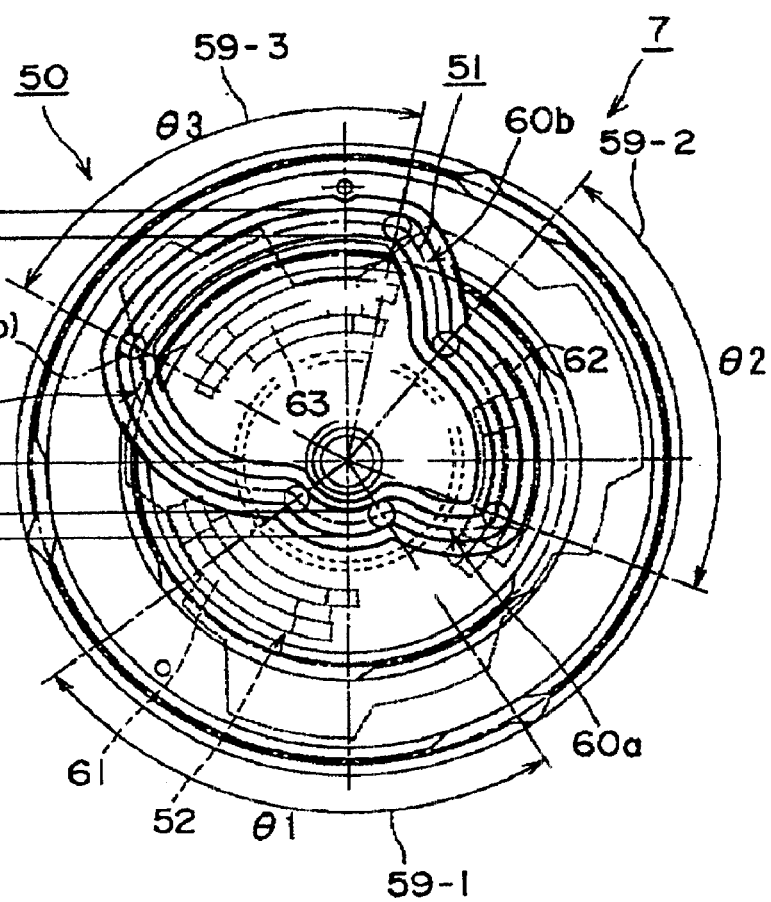

(9 Locations)

Plunger OFF
in EJECT Operation

Plunger OFF
in PLAY Operation

Plunger ON
in 3-stage switching

Plunger ON
in CRG selection

|     | Θ0 | Θ1 | Θ2 |
|-----|----|----|----|
| S1  | ○  | ●  | ●  |
| S2  | ●  | ○  | ●  |
| S3  | ●  | ●  | ○  |

(E)

|     | Θ0 | Θ1 | Θ2 | Θ3 |
|-----|----|----|----|----|
| S1  | ○  | ●  | ●  | ○  |
| S2  | ●  | ○  | ●  | ○  |
| S3  | ●  | ●  | ○  | ○  |

(H)

|     | Θ0 | Θ1 | Θ2 | Θ3 | Θ4 | Θ5 |
|-----|----|----|----|----|----|----|
| S1  | ○  | ●  | ●  | ●  | ●  | ○  |
| S2  | ●  | ○  | ●  | ●  | ●  | ○  |
| S3  | ●  | ●  | ○  | ●  | ●  | ○  |
| S4  | ●  | ●  | ●  | ○  | ●  | ○  |
| S5  | ●  | ●  | ●  | ●  | ○  | ○  |

(F)

|     | Θ0 | Θ1 | Θ2 | Θ3 |
|-----|----|----|----|----|
| S1  | ○  | ●  | ●  | ●  |
| S2  | ●  | ○  | ●  | ●  |
| S3  | ●  | ●  | ○  | ●  |

(H')

|     | Θ0 | Θ1 | Θ2 | Θ3 | Θ4 | Θ5 |
|-----|----|----|----|----|----|----|
| S1  | ○  | ●  | ●  | ●  | ●  | ●  |
| S2  | ●  | ○  | ●  | ●  | ●  | ●  |
| S3  | ●  | ●  | ○  | ●  | ●  | ●  |
| S4  | ●  | ●  | ●  | ○  | ●  | ●  |
| S5  | ●  | ●  | ●  | ●  | ○  | ●  |

|     | Θ0 | Θ1 | Θ2 |
|-----|----|----|----|
| S1  | ●  | ●  | ●  |
| S2  | ○  | ●  | ●  |
| S3  | ○  | ○  | ●  |

(J)

|     | Θ0 | Θ1 | Θ2 | Θ3 |
|-----|----|----|----|----|
| S1  | ●  | ●  | ●  | ○  |
| S2  | ○  | ●  | ●  | ●  |
| S3  | ○  | ○  | ●  | ●  |

(N)

|     | Θ0 | Θ1 | Θ2 | Θ3 | Θ4 | Θ5 |
|-----|----|----|----|----|----|----|
| S1  | ●  | ●  | ●  | ●  | ●  | ○  |
| S2  | ○  | ●  | ●  | ●  | ●  | ●  |
| S3  | ○  | ○  | ●  | ●  | ●  | ●  |
| S4  | ○  | ○  | ○  | ●  | ●  | ●  |
| S5  | ○  | ○  | ○  | ○  | ●  | ●  |

(J')

|     | Θ0 | Θ1 | Θ2 | Θ3 |
|-----|----|----|----|----|
| S1  | ●  | ●  | ●  | ○  |
| S2  | ○  | ●  | ●  | ○  |
| S3  | ○  | ○  | ●  | ○  |

(M)

|     | Θ0 | Θ1 | Θ2 | Θ3 | Θ4 | Θ5 |
|-----|----|----|----|----|----|----|
| S1  | ●  | ●  | ●  | ●  | ●  | ○  |
| S2  | ○  | ●  | ●  | ●  | ●  | ○  |
| S3  | ○  | ○  | ●  | ●  | ●  | ○  |
| S4  | ○  | ○  | ○  | ●  | ●  | ○  |
| S5  | ○  | ○  | ○  | ○  | ●  | ○  |

|     | Θ0 | Θ1 | Θ2 |
|-----|----|----|----|
| S1  | ○  | ○  | ○  |
| S2  | ●  | ○  | ○  |
| S3  | ●  | ●  | ○  |

(L)

|     | Θ0 | Θ1 | Θ2 | Θ3 |
|-----|----|----|----|----|
| S1  | ○  | ○  | ○  | ●  |
| S2  | ●  | ○  | ○  | ●  |
| S3  | ●  | ●  | ○  | ●  |

(P)

|     | Θ0 | Θ1 | Θ2 | Θ3 | Θ4 | Θ5 |
|-----|----|----|----|----|----|----|
| S1  | ○  | ○  | ○  | ○  | ○  | ●  |
| S2  | ●  | ○  | ○  | ○  | ○  | ●  |
| S3  | ●  | ●  | ○  | ○  | ○  | ●  |
| S4  | ●  | ●  | ●  | ○  | ○  | ●  |
| S5  | ●  | ●  | ●  | ●  | ○  | ●  |

(O)

|     | Θ0 | Θ1 | Θ2 | Θ3 | Θ4 |
|-----|----|----|----|----|----|
| S1  | ○  | ○  | ○  | ○  | ○  |
| S2  | ●  | ○  | ○  | ○  | ○  |
| S3  | ●  | ●  | ○  | ○  | ○  |
| S4  | ●  | ●  | ●  | ○  | ○  |
| S5  | ●  | ●  | ●  | ●  | ○  |

(G)

(H)

(M)

(N)

(O)

(P)

CAM STRUCTURE AND DISK EXCHANGE SYSTEM USING THE SAME

BACKGROUND OF THE INVENTION

1. Field of the Invention

The present invention relates to cam structures. More particularly, the present invention relates to improvements on a cam structure of a compound cam that is equipped with an axial direction cam that displaces one follower section in an axial direction and a radial direction cam that displaces another follower section in a radial direction. The present invention also relates to a disk exchange system that uses the cam structure. The disk may e any disk-shaped recording media including optical disks, such as, CDs (compact discs), DVDs (digital versatile discs) and the like.

2. Description of Related Art

Conventionally, a cam mechanism, in which a rotary cam having step differences in an axial direction is rotated to make a follower section to follow along the step differences and move in the axial direction, has been used. For example, in a cam mechanism shown in FIGS. 67–69, an axial direction cam 101 having three cams 102 that are in the same shape and disposed at intervals of 120 degrees in a circumferential direction is rotated, and a circular plate (follower section) 103 is raised and lowered while moving along the cam 102. In this cam mechanism, the circular plate 103 can be uniformly supported by three regularly disposed protrusions 104 that come in contact with the cams 103.

Also, a cam mechanism, which is equipped with rotary cams with different radiuses arranged in a radial direction and a follower section that is moved in the radial direction along the cams, has been used. For example, a radial direction cam 105 with cams in three stages shown in FIG. 70 is formed from three arcuate surfaces 106 having different radiuses and three connection slopes 107 that connects the three arcuate surfaces 106. A follower section 108 can be moved along the circumferential shape of the cam 105. The arcuate surfaces 106 and the connection slopes 107 shown in the figure are alternately disposed with each of their center angles (i.e., angles of rotation) being 60 degrees.

A rotary member may be equipped with the axial direction cam 101 and the radial direction cam 105 described above. By the rotary member, one follower section (the rotary plate 103) in an axial direction and another follower section (the follower section 108) in a radial direction can be simultaneously displaced. Furthermore, in a compound cam having such a rotary member, movements in various patterns can be realized by one rotary cam by timing the movements of the follower sections 103 and 108. For example, while the follower section 108 may be maintained in one of the stages, and the other follower section 103 may be moved in the axial direction.

However, since the radial direction cam 105 is accompanied with the following limitations, it is sometimes difficult to achieve complex movements by simply combining the axial direction cam 101 and the radial direction cam 105.

Namely, in the radial direction cam 105, the arcuate surfaces 106 that form the respective stages have different radiuses and therefore the three connection slopes 107 that connect these arcuate surfaces 106 necessarily have different inclinations. Therefore, when it is desired that the follower section 108 be smoothly moved in any of the connection slopes 107, the connection slope 107a with a steep inclination that connects the first stage arcuate surface 106 and the third stage arcuate surface 106 preferably have a smaller pressure angle, and needs to secure a wide range (in other words, to make greater the center angle that occupies the connection slope 107a in 360 degrees). By doing so, the ranges occupied by the respective connection slopes 107 become different from one another, which makes it difficult to dispose the arcuate surfaces 120 at equal intervals of 120 degrees. As a result, movements of one follower section in the axial direction are difficult to be timed with movements of another follower section in the radial direction.

SUMMARY OF THE INVENTION

In view of the above, it is an object of the present invention to provide a cam structure that times movements in an axial direction of one follower section with movements in a radial direction of another follower section, and realizes movements in various patterns by one rotary cam.

In accordance with one embodiment of the present invention, a cam structure comprises a first cam that displaces a first follower section in a radial direction, a second follower section that rotates with the first cam and has at least three support pins, and a second cam that displaces the second follower section in an axial direction, wherein the first cam is formed from divided segments defining at least three arcuate surfaces with different radiuses and sloped connection surfaces that connect the arcuate surfaces and provided in ranges that give appropriate pressure angles with respect to the first follower section, and the second cam is provided with cam sections, each of the cam sections of the second cam being divided in the radial direction in a number corresponding to the number of the support pins, wherein the divided cam sections are disposed at positions arranged in a circumferential direction in a manner that displacements in the axial direction of the second follower section are timed with displacements in the radial direction of the first follower section.

In accordance with one embodiment of the present invention, angles of rotation θ1, θ2 and θ3 of the respective arcuate surfaces of the first cam are mutually equal (θ1=θ2=θ3), and circumferential angular widths of plane surfaces (indicated respectively as H1, H2 and H3 in the figure) of the respective cam sections of the second cam are mutually equal (H=H2=H3). In contrast, circumferential angular widths of the sloped connection surfaces of the first cam 51 may be different from one another. Similarly, circumferential angular widths at bottom sections (L1, L2 and L3) between the respective cam sections of the second cam may be different from one another. In on aspect, the support pins of the second follower section may be provided at equal intervals of 120 degrees, and sloped sections of the cam sections of the second cam may also be provided at intervals of 120 degrees, wherein each of the cam sections is divided in the radial direction into three segments, which are then shifted from one another in the circumferential direction to thereby obtain appropriate timings.

In one aspect of the embodiment of the present invention, the first cam may perform selection and positioning of one of at least two carriages, the second cam displaces the second follower section in the axial direction to switch a power transmission. The cam structure further comprises a third cam in a circular configuration with a cam radius thereof changing in stages according to its rotation angles and selects one of the at least two carriages to be moved. The first cam, the second cam and the third cam are integrally formed in one piece, the second cam performs the power transmission switching within a specified rotation angle range that is continuous with the same radius of each of the at least three arcuate surfaces that form the first cam, and the power transmission switching by the second cam and the selection of the carriages are performed in a specified rotation angle range of any one of cam sections of a plurality of radiuses. As a result, while a state in which a position of a desired one of the carriages is determined is maintained, the power transmission switching and the carriage selection can be performed.

Furthermore, in another aspect of the present invention, the cam structure is further equipped with a fourth cam that operates a rotational position determination switch for detecting operation positions of the first-third cams, which rotate 360 degrees, within their respective rotation angles, whereby the rotational position determination switch is turned on and off according to rotational amounts of the cams. In this case, the rotational position determination switch, which is turned on and off by the cam sections, may be turned on and off by an optical detection element (e.g., a photo-interrupter) or a magnetic detection element (e.g., a Hall element). Also, a conductive contact member (brush) provided on the cam side and a conductive member (pattern) on a substrate may be contacted on and off with one another to achieve the detection.

Other objects, features and advantages of the invention will become apparent from the following detailed description taken in conjunction with the accompanying drawings.

BRIEF DESCRIPTION OF THE DRAWINGS

FIGS. 17(A) and 17(B) are a plan view and a side view showing movements of the first slider, the second slider and the play gear, respectively.

FIGS. 41(A) and 41(B) are an entire cross-sectional view and a bottom view of a structure of the cam gear and a stage determination cam (first cam), respectively.

Figure 57:
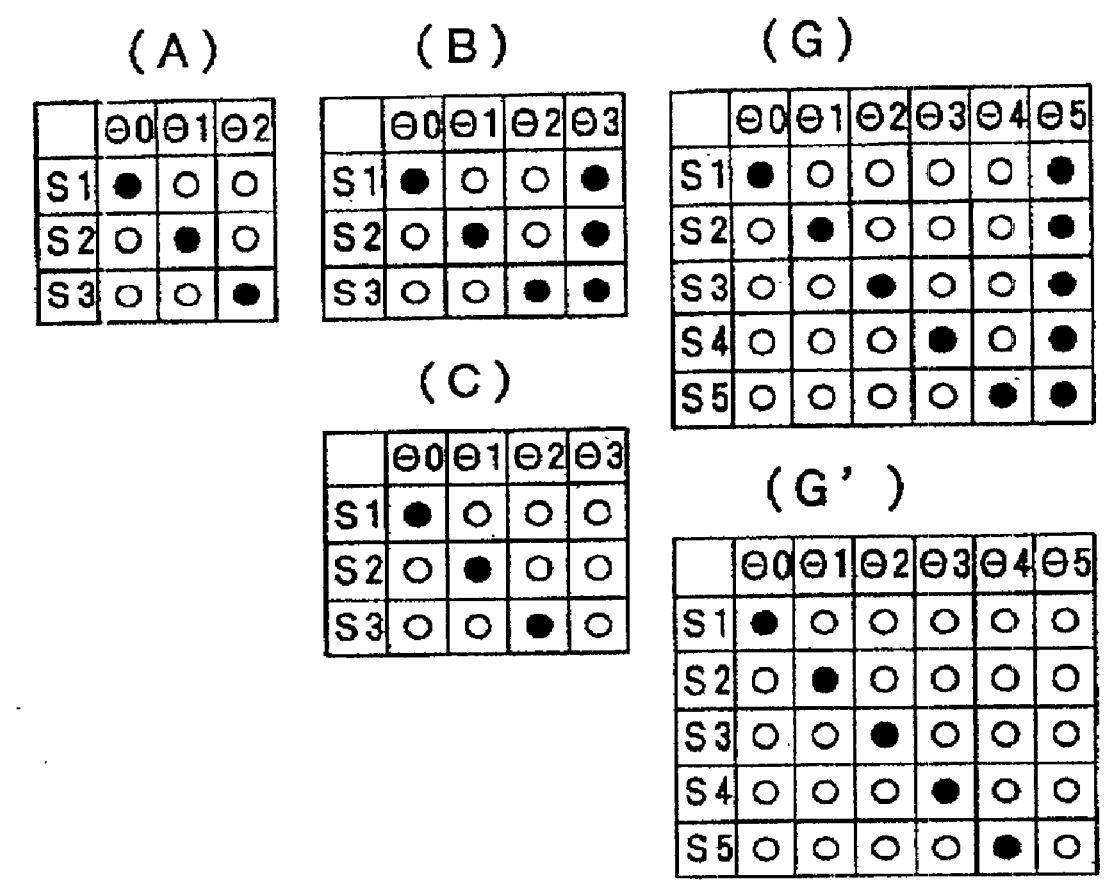

FIG. 57 shows tables of patterns of engagement configurations between the cams of the interlocking cam and the carriages.

FIG. 58 shows tables of patterns of engagement configurations between the cams of the interlocking cam and the carriages.

FIG. 59 shows tables of patterns of engagement configurations between the cams of the interlocking cam and the carriages.

FIG. 60 shows tables of patterns of engagement configurations between the cams of the interlocking cam and the carriages.

PREFERRED EMBODIMENTS OF THE INVENTION

An embodiment of the present invention will be described below with reference to the accompanying drawings.

Figure 1:
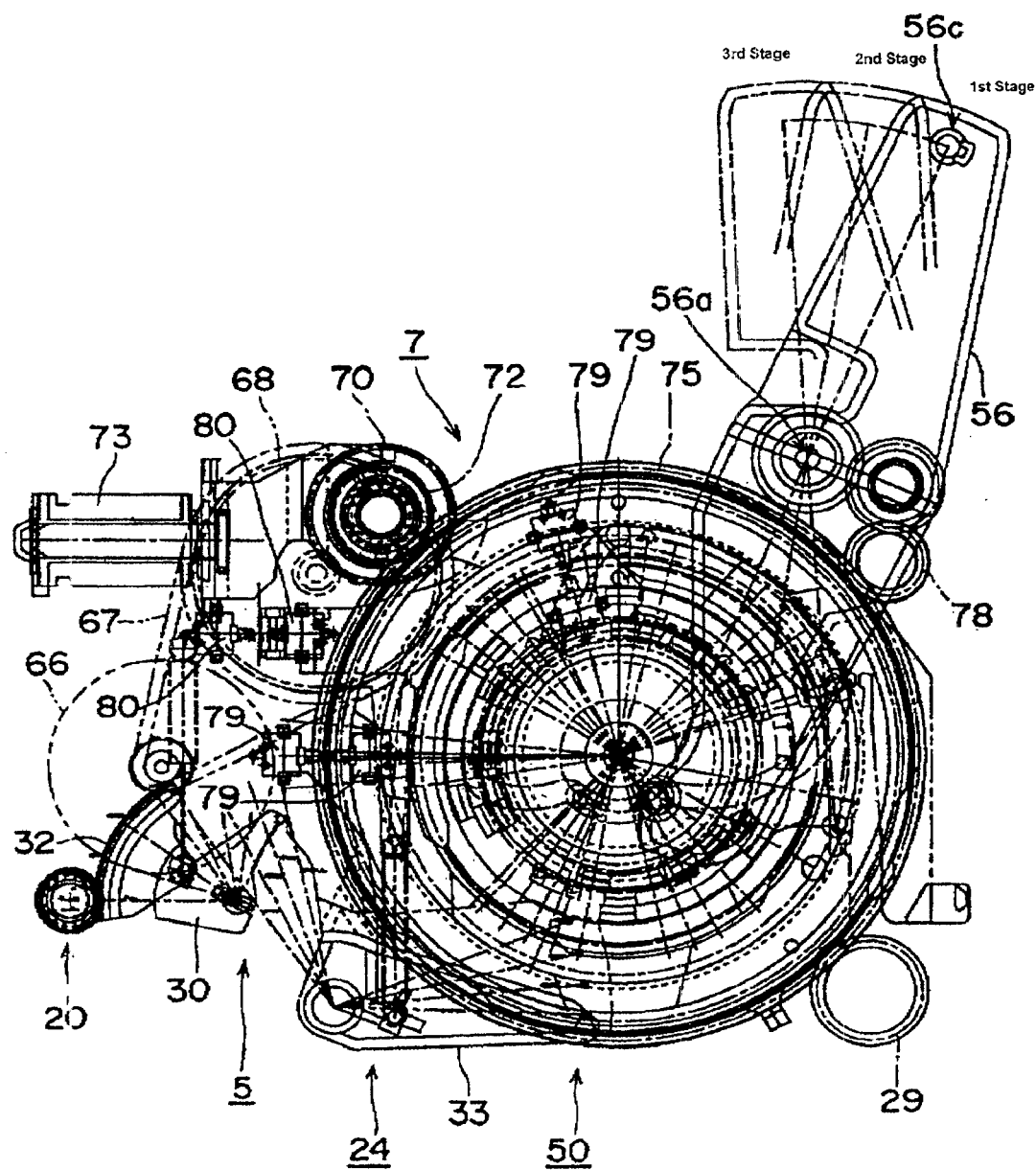
FIG. 1 is a plan view of a main part of a disk exchange system in accordance with one embodiment of the present invention to which a linkage, a selector system, a selected position retaining and returning system, a cam structure, and a rotation transmission switching system are applied.
Figure 56:
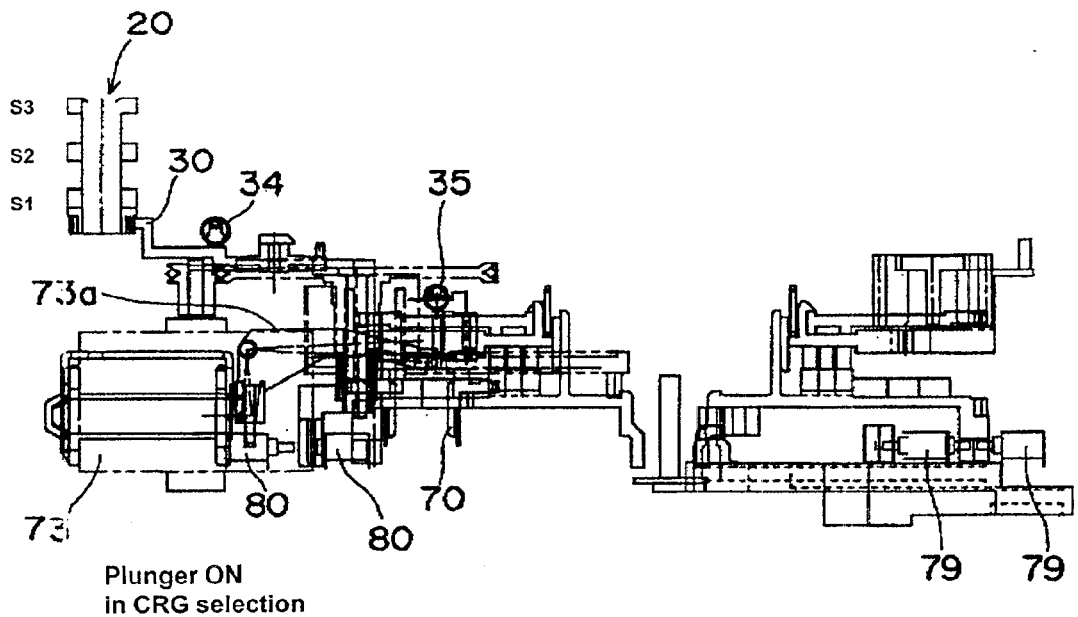
FIG. 56 schematically shows a structure of the rotation transmission switching system in a carriage selection operation (when the plunger is turned on).
Figure 61:
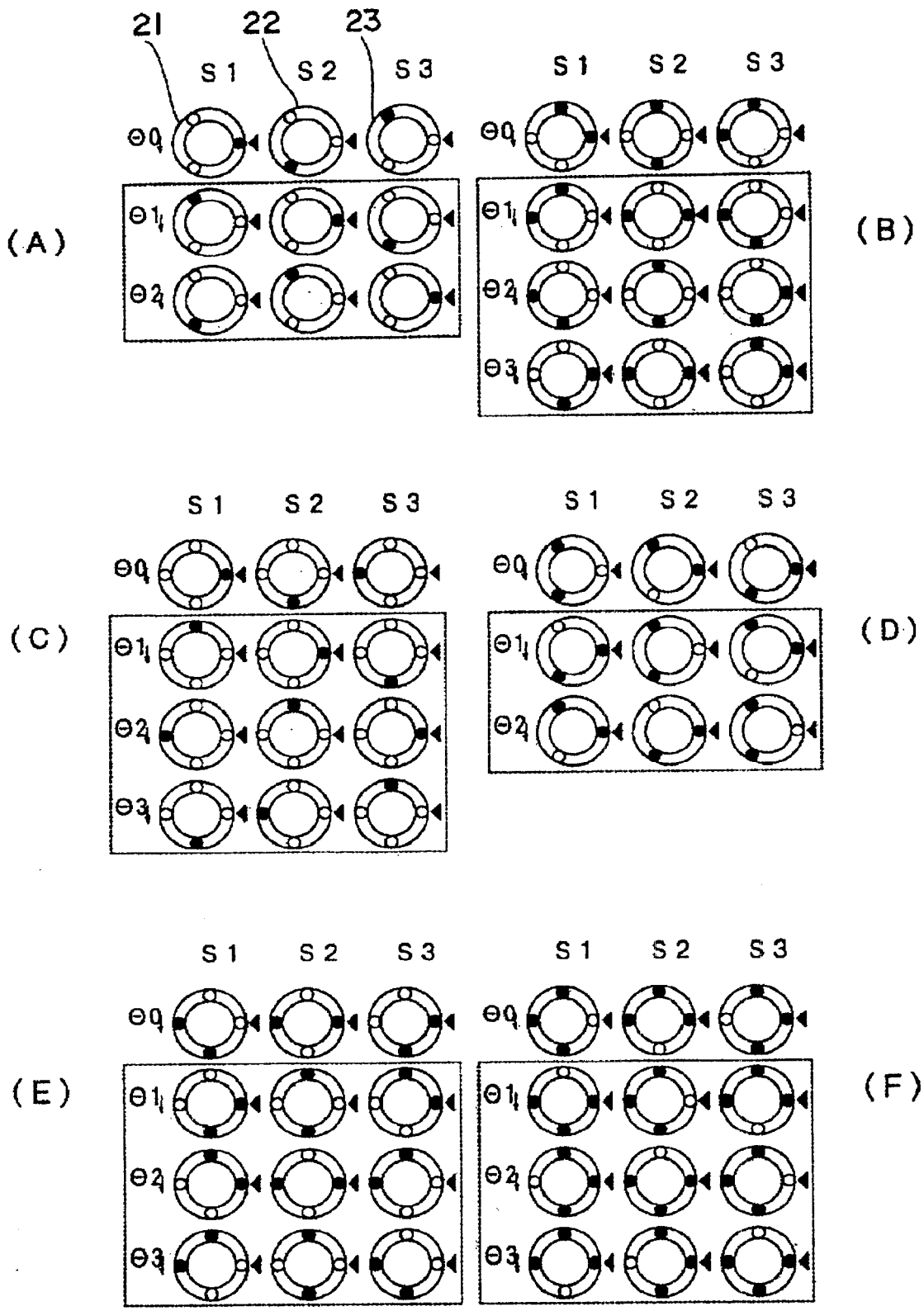
FIG. 61 shows allocation patterns of positions of indication sections on the cams of the interlocking cam and rotation angles.
Figure 62:
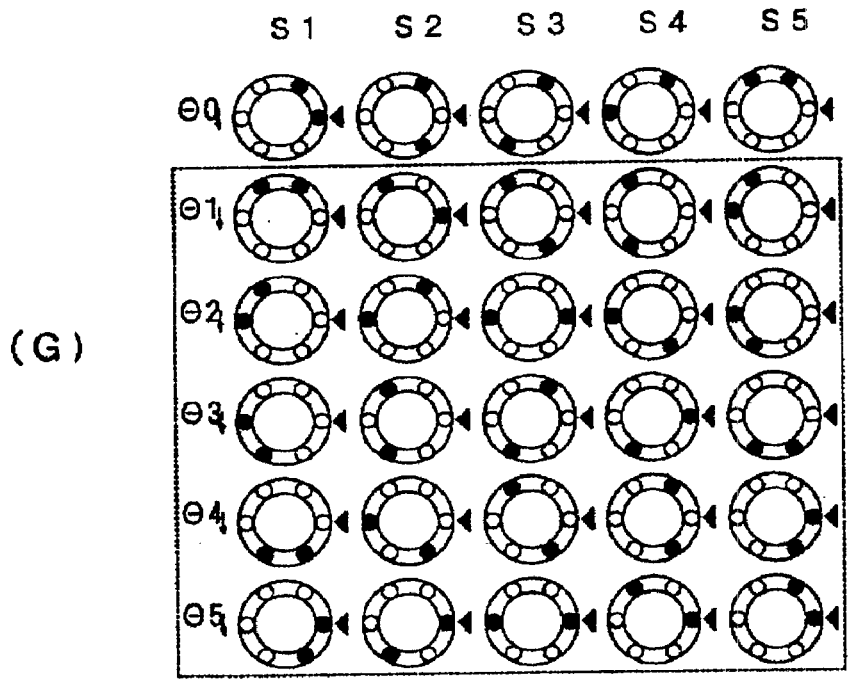
FIG. 62 shows allocation patterns of positions of indication sections on the cams of the interlocking cam and rotation angles.
Figure 62:
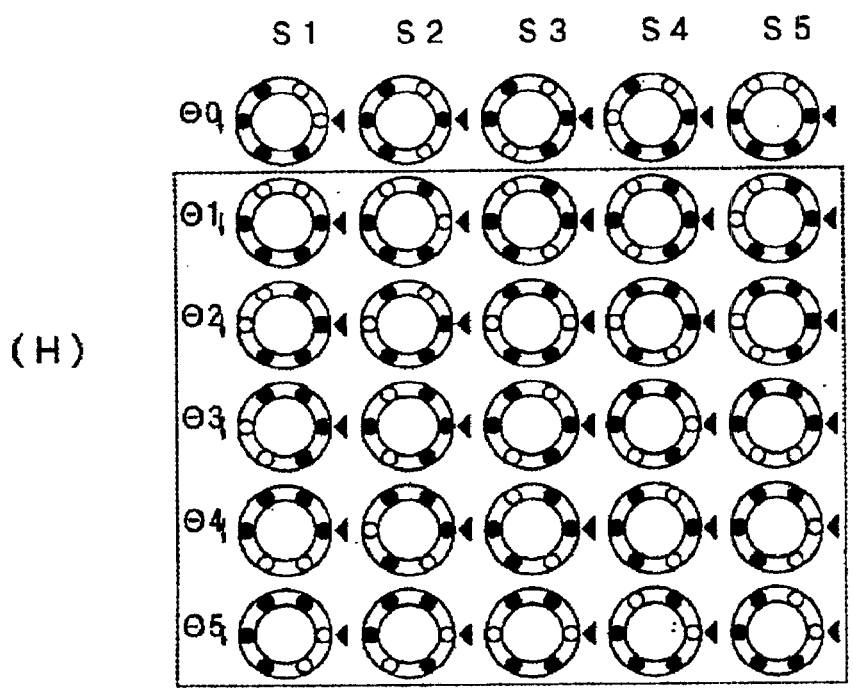
Figure 63:
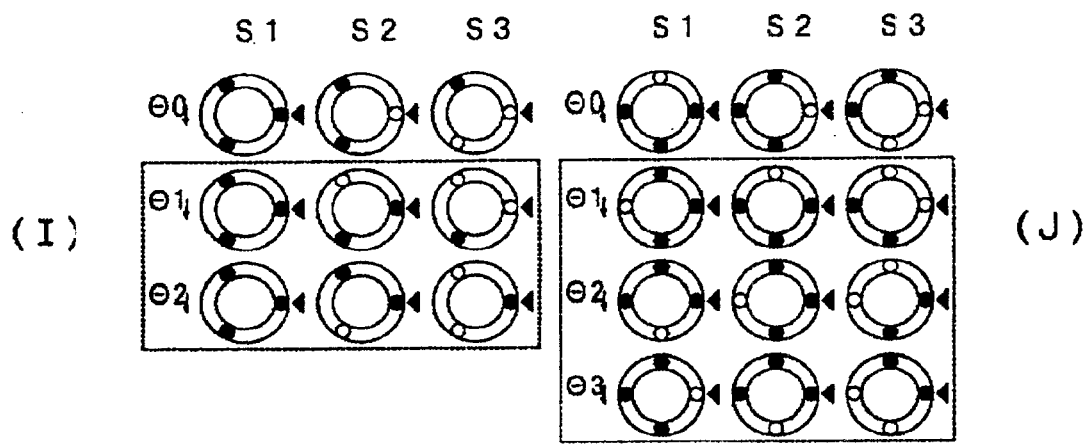
FIG. 63 shows allocation patterns of positions of indication sections on the cams of the interlocking cam and rotation angles.
Figure 64:
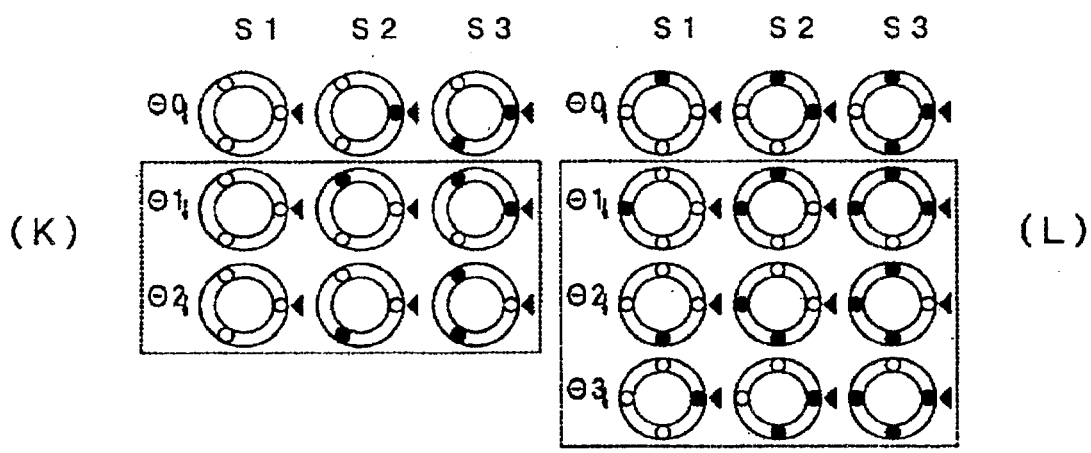
FIG. 64 shows allocation patterns of positions of indication sections on the cams of the interlocking cam and rotation angles.
Figure 65:
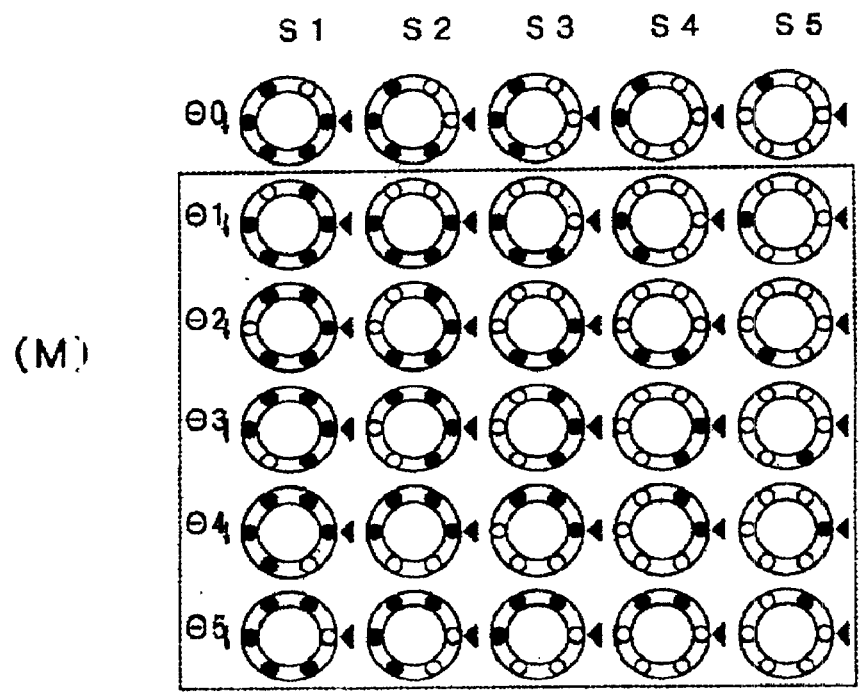
FIG. 65 shows allocation patterns of positions of indication sections on the cams of the interlocking cam and rotation angles.
Figure 65:
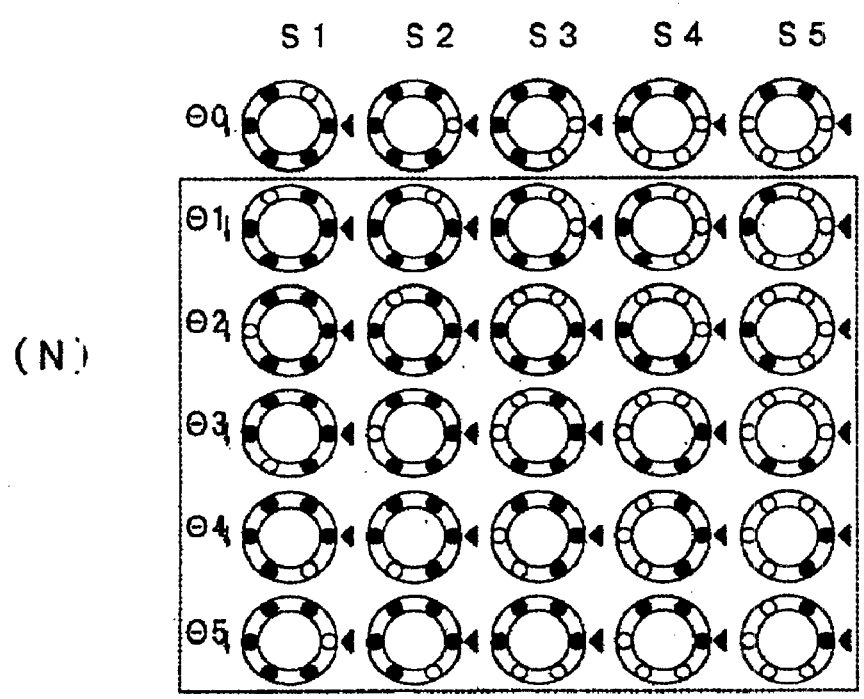
Figure 66:
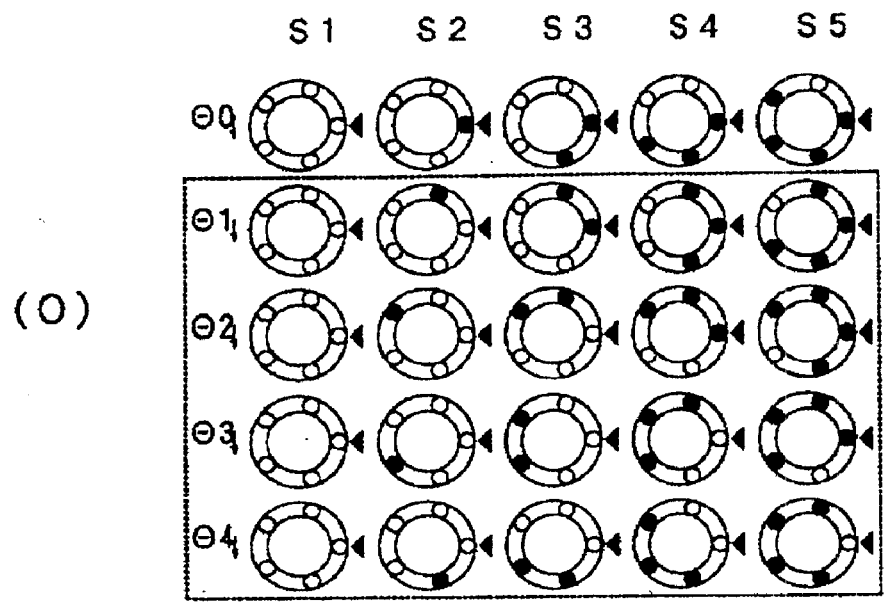
FIG. 66 shows allocation patterns of positions of indication sections on the cams of the interlocking cam and rotation angles.
Figure 66:
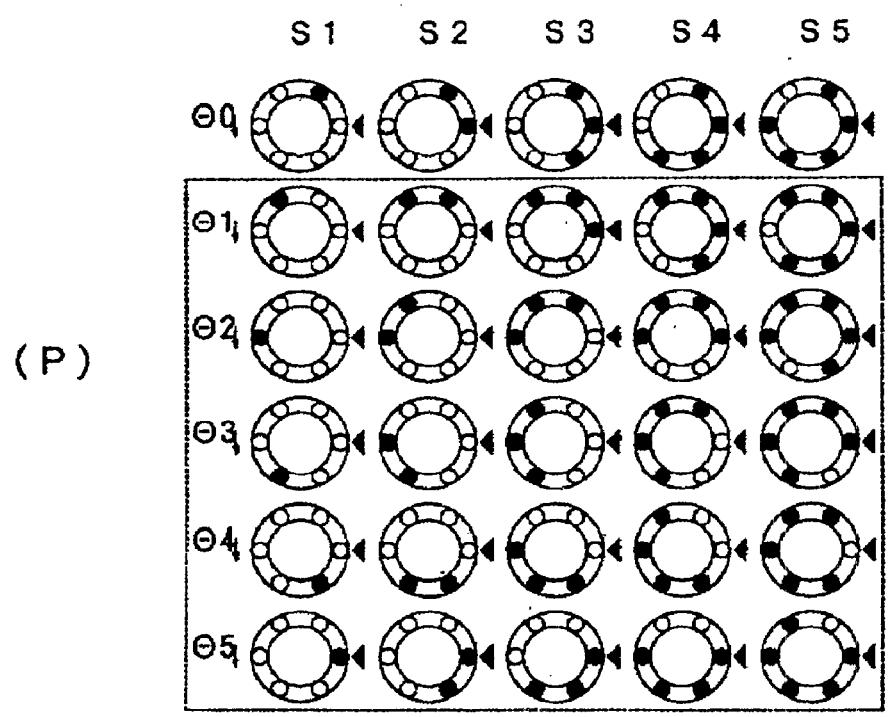
Figure 67:
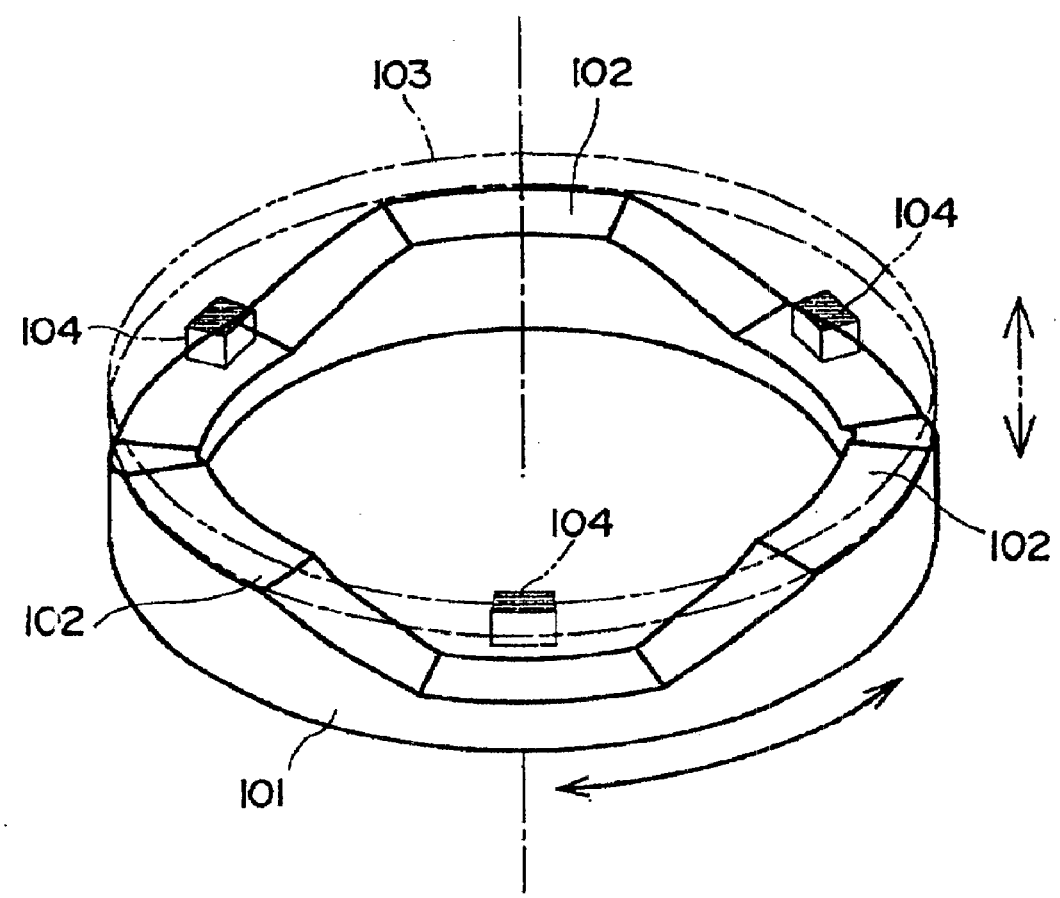
FIG. 67 is a perspective view of a structure example of a conventional axial direction cam.
Figure 68:
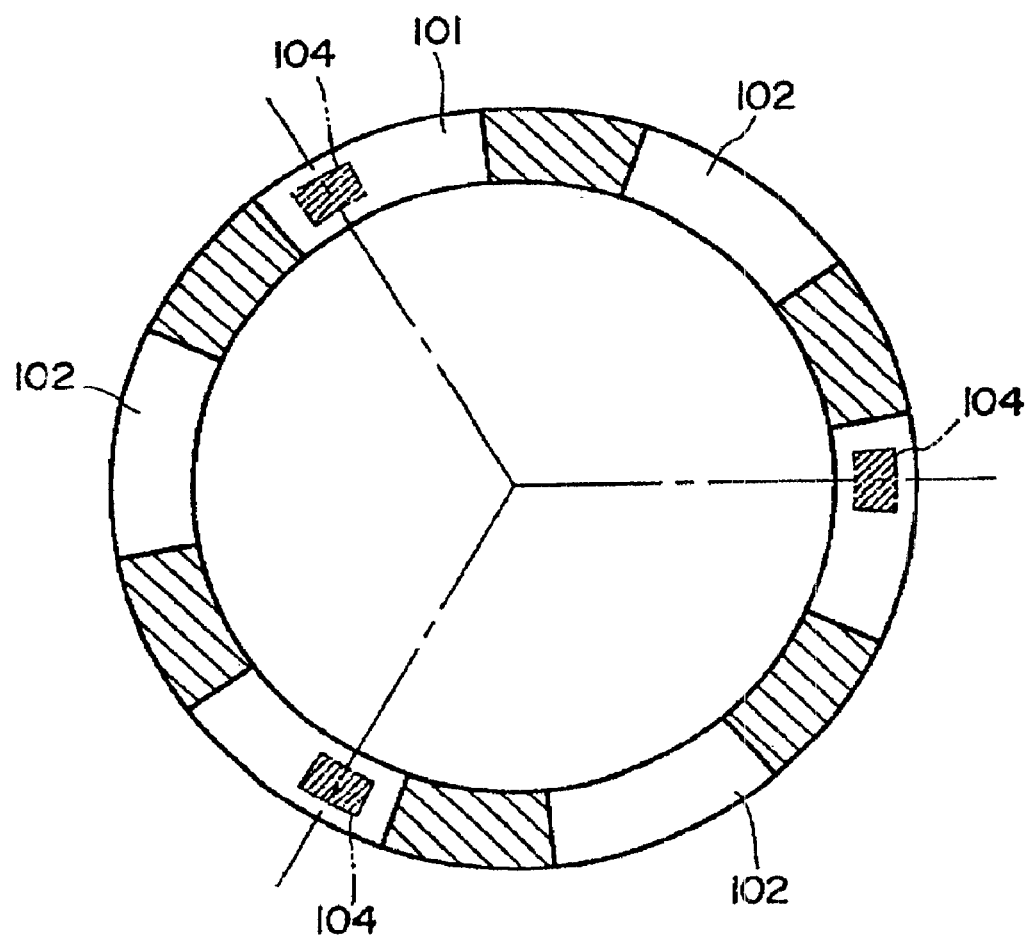
FIG. 68 is a plan view of a structure example of a conventional axial direction cam.
Figure 69:
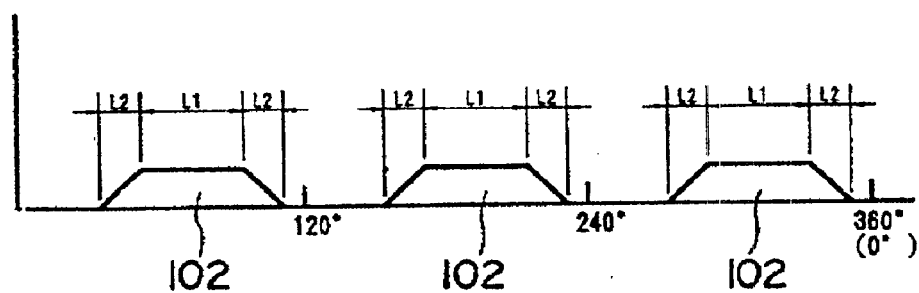
FIG. 69 shows a cam diagram of a structure example of a conventional axial direction cam.
Figure 70:
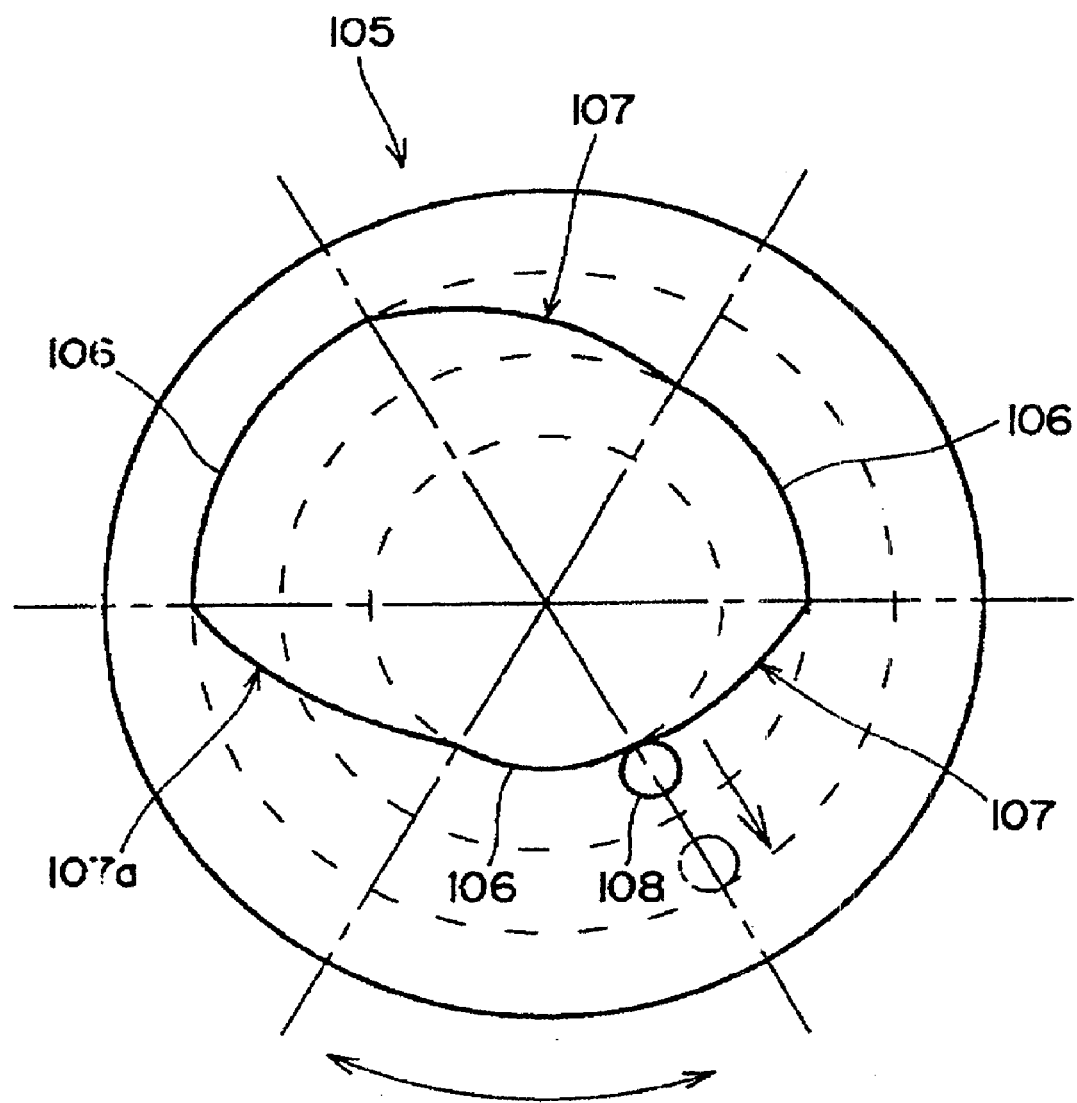
FIG. 70 is a plan view of a structure example of a conventional radial direction cam.

Referring to FIGS. 1 through 56, one embodiment of the present invention, in which a linkage system 4, a selector system 5, a selected position retaining and returning system 6, a cam structure 7 and a rotary transmission switching system 8 are implemented in a disk exchange system, is described.

First, a general structure of a disk exchange system is described. The disk exchange system in accordance with the present embodiment includes at least two carriages, each of which is capable of storing one disk, is capable of open-close operations only when a carriage is selected, and moveable between a play (performance) position and an ejection (to remove the stored disk for exchange) position. Even while one disk is being played, the disk exchange system is capable of ejecting another disk. Such a function is referred to as an exchange system in the present specification. For example, while a first disk is being played, a second disk can be ejected and exchanged with anther disk without stopping the performance. The disk may be any disk-shaped recording media including optical disks, such as, CDs (compact discs), DVDs (digital versatile discs) and the like.

In the embodiment described below, the present invention is applied to a CD exchange system with three carriages. The carriages are indicated with reference numbers 1, 2 and 3 in this order from the bottom. For example, when the carriage 1 that is located at the bottom in the first stage among the carriages 1, 2 and 3 is selected for performance, the selected carriage 1 is transferred to the play position to play the CD. While the CD in the first stage is being played, another one of the carriages 2 and 3 may be moved to the ejection position so that the CD can be replaced without stopping the performance of the CD in the carriage 1 in the first stage. In the following description, when any of the carriages 1, 2 and 3 located at the bottom position, the middle position and the upper position are in a play state, they are referred to as the first stage, the second stage and the third stage, respectively.

When any of the carriages is called with the "stage", this means that the corresponding carriage is selected for a play performance. This helps to readily discriminate the carriage in a play state from the other carriages in a non-play state. For example, in FIG. 23, s1, s2 and s3 indicate the first, second and third stage, respectively.

Each of the carriages 1–3 of the exchange system moves back and forth between a neutral position at which a loaded CD stands by until the CD is played or ejected and a play position located deeper from the neutral position at which a CD that is selected for performance is played, and between the neutral position and an ejection position at which a CD is ejected. In the figures, the neutral position, the play position and the ejection position are referred to as "N", "P" and "E", respectively. In the present embodiment, an operation in which any of the carriages are moved between the ejection position and the neutral position is called an ejection operation, and an operation in which any of the carriages are moved between the play position and the neutral position is called a play operation.

With the CD exchange system described above, when an x-stage among the three carriages 1–3 (x means one of 1 through 3) is selected, and a play state is set at the play position, the selected x-stage carriage x cannot perform a loading (returning from the play position or ejecting in this example) unless the performance is stopped. Accordingly, to allow the carriage x in this condition to perform a loading, another carriage other than the one at the x-stage (for example, the carriage 2 or the carriage 3, when the x-stage is the first stage) needs to be selected.

Now, the linkage 4, as a first feature of the present embodiment, is described. The linkage 4 in accordance with one embodiment of the present invention is shown in FIGS. 7 through 12.

The linkage 4 is a mechanism that performs simultaneously or with time lags linkage operations of a first slider 11 and a second slider 12 by a single driving device along a base 10. In the present embodiment, the first slider 11 has an engaging protrusion 16 that is moved by elastic deformations of the first slider 11 between a restricting position at which movements of the first slider are restricted and a releasing position at which the positional restrictions on the first slider 11 are released. The base 10 has a movement prevention fixed protrusion 13 that prevents movements of the first slider 11 in one direction by engaging itself with the engaging protrusion 16. The second slider 12 has a release member 19 with a pushing claw 18 that elastically deforms the engaging protrusion 16 through a pressure-receiving claw 17 provided on the first slider 11 from a push-restriction position to a restriction release position. The base 10 has a fixed sloped section 14 with a slope 14a that elastically deforms the release member 19, which elastically deforms the second slider 12 in association with movements of the second slider 12 to thereby move the engaging protrusion 16 through the pushing claw 18 in an engagement releasing direction. As a result, only when the second slider 12 moves to a predetermined position, it releases the movement restriction on the first slider 11 and establishes the linkage operations.

The base 10 is formed from a part of a chassis 9 of the CD exchange system, and functions as a fixed guide along which the first slider 11 and the second slider 12 slide. For example, in the present embodiment, the base 10 is formed from an elongated fixed member that has a rectangular cross section shown in FIG. 7. The base 10 includes the movement prevention fixed protrusion 13 and the fixed sloped section 14.

Figure 7:
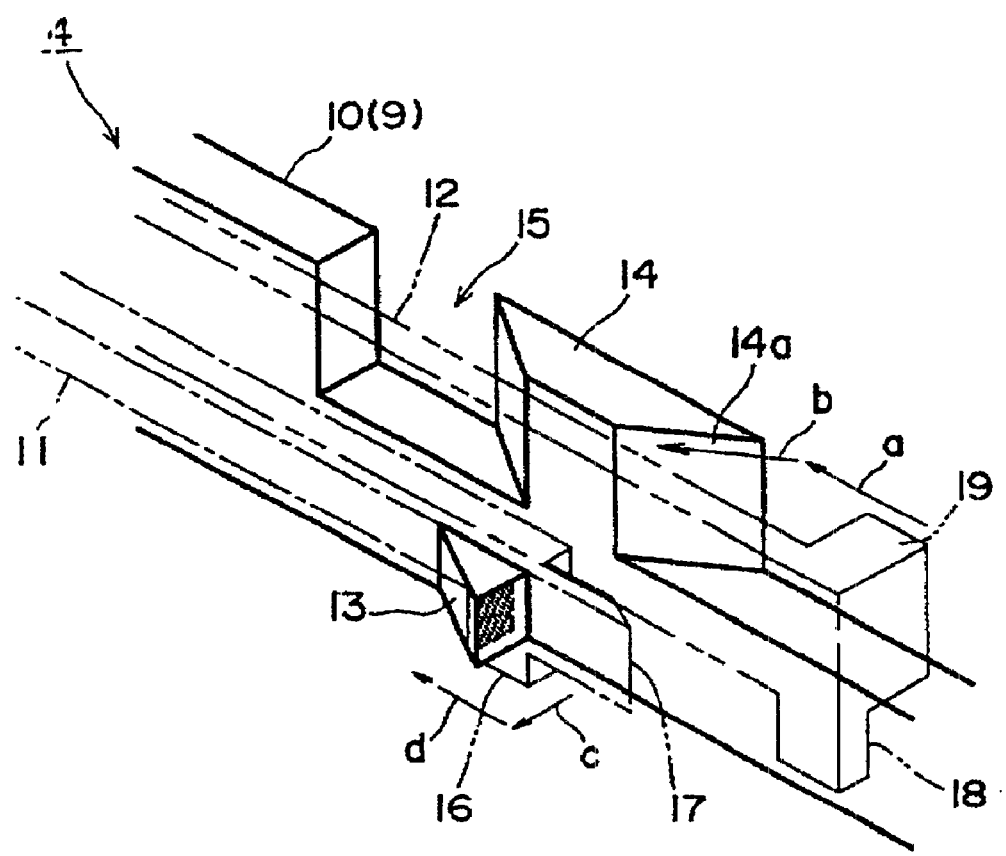
FIG. 7 is a perspective view of a main part of the linkage.
Figure 10:
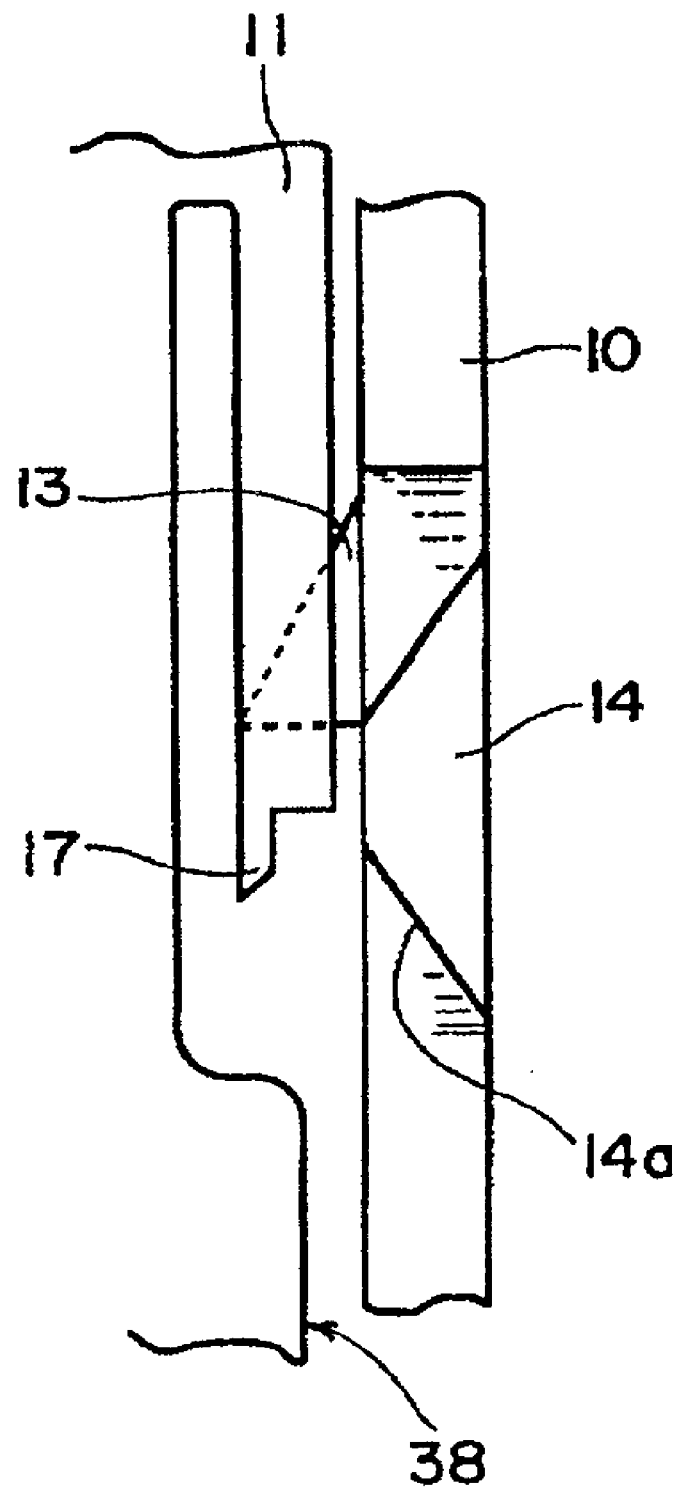
FIG. 10 is a plan view of a main part of the linkage.

The movement prevention fixed protrusion 13 defines a protrusion that hooks the engaging protrusion 16 on the first slider 11 to prevent movements of the first slider 11, and is provided on a side surface of the base 10, as shown in FIG. 7. As shown in FIG. 11, the movement prevention fixed protrusion 13 is formed from a hooking face 13 that is formed vertically or near vertically with respect to the side surface of the base 10 and hooks the engaging protrusion 16, and a sloped surface 13b that pushes the engaging protrusion 16 outwardly when the first slider 11 returns to a front side of the CD exchange system, which form a triangular configuration as viewed in plan, for example as shown in FIG. 10.

Figure 12:
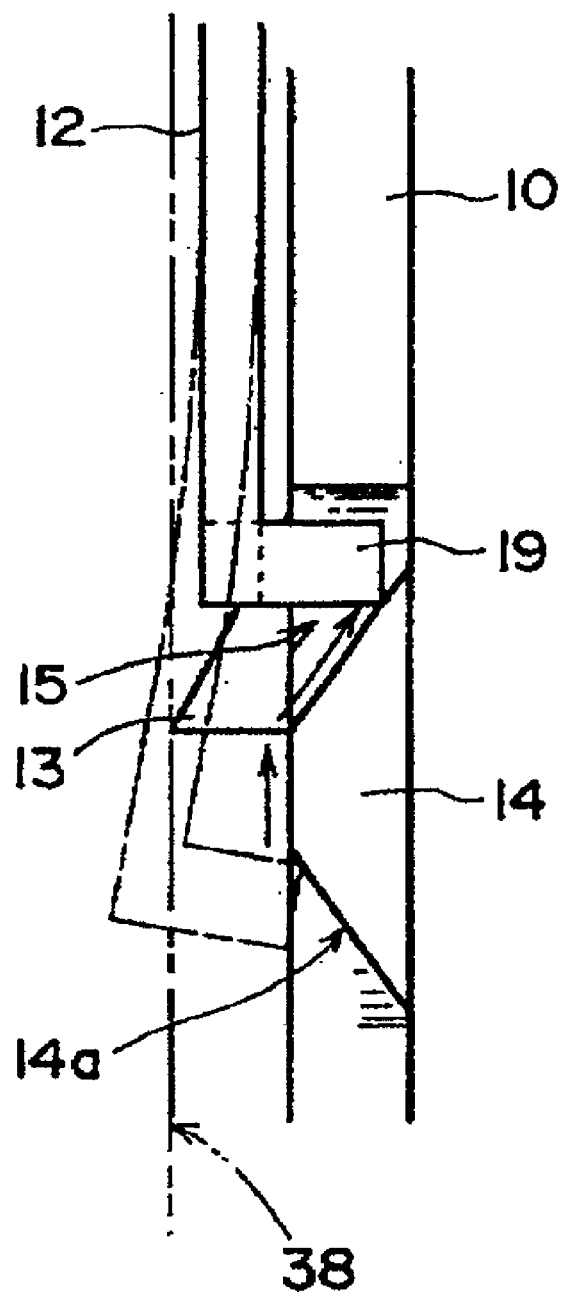
FIG. 12 is a plan view showing movements of the second slider with respect to a base.

The fixed sloped section 14 abuts against the release member 19 on the second slider 12 in movements, and pushes out the release member 19 to the side by an amount corresponding to the height (or width) of the slope thereof in association with movements of the second slider 12 to thereby elastically deform the second slider 12. The fixed sloped section 14 has, for example, a trapezoidal configuration, as shown in the figures; and is provided with a slope 14a in its front side, and a space 15 in its rear side (deeper side) that is capable of storing the release member 19 of the second slider 12 which moves over the fixed sloped section 14, as shown in FIG. 12.

The first slider 11 is formed from a member that moves in a longitudinal direction along the base 10, and is equipped with the engaging protrusion 16 and the pressure-receiving claw 17. In the present embodiment, the first slider 11 and the second slider 12 are provided on one side of the base 10, and the second slider 12 is disposed above the first slider 11, as shown in FIG. 7. However, the first slider 11 and the second slider 12 can be disposed in mutually reverse positions in a vertical direction.

Figure 8:
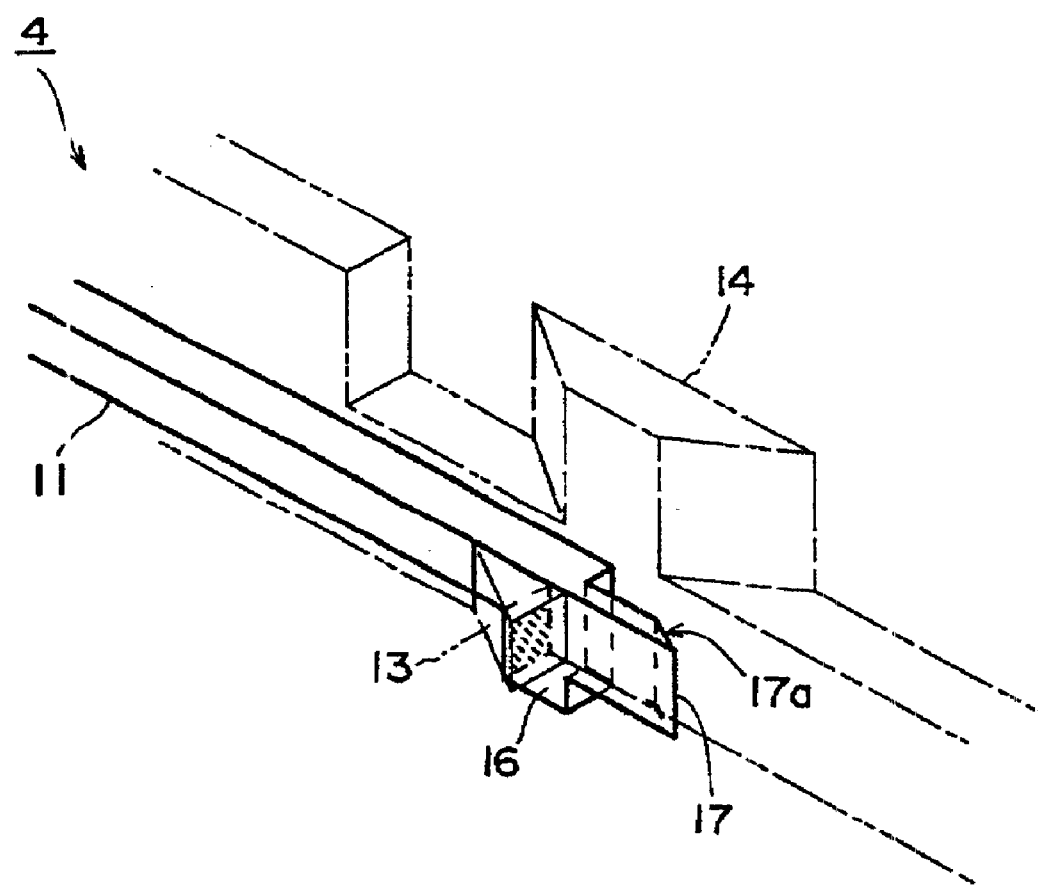
FIG. 8 is a perspective view of a first slider of the linkage.

The pressure-receiving claw 17 is a protrusion that downwardly protrudes at an area adjacent to the frontal end of the first slider 11, and hooks the movement prevention fixed protrusion 13 in contact regions of both of the sliders 11 and 12 that are shown by broken hatching lines shown in FIG. 8, to thereby restrict sliding movements of the first slider 11 to the deeper side.

The pressure-receiving claw 17 is a protrusion that protrudes toward the front side further from the frontal end of the first slider 11, so that it can hooks the pushing claw 18 of the second slider 12. The pressure-receiving claw 17 is provided at the frontal end of the first slider 11 and separated a distance from the base 10 to thereby form a space between the pressure-receiving claw 17 and the base 10 in which the pushing claw 18 can enters. Also, the slope 17a is provided at the frontal end of the pressure-receiving claw 17 on the side of the base 10, such that the pushing claw 18 of the second slider 12 can be further readily introduced in the space.

The second slider 12 starts moving toward the deeper side (i.e., the rear side opposite to the front side of the CD exchange system) before the first slider 11 whose movement is restricted, and releases the first slider 11 from the base 10 by removing the restriction acting on the first slider 11 while the second slider 12 is moving whereby the first slider 11 becomes moveable. The release member 19 and the pushing claw 18 provided on the second slider 12 are involved in the restriction releasing action.

Figure 11A:
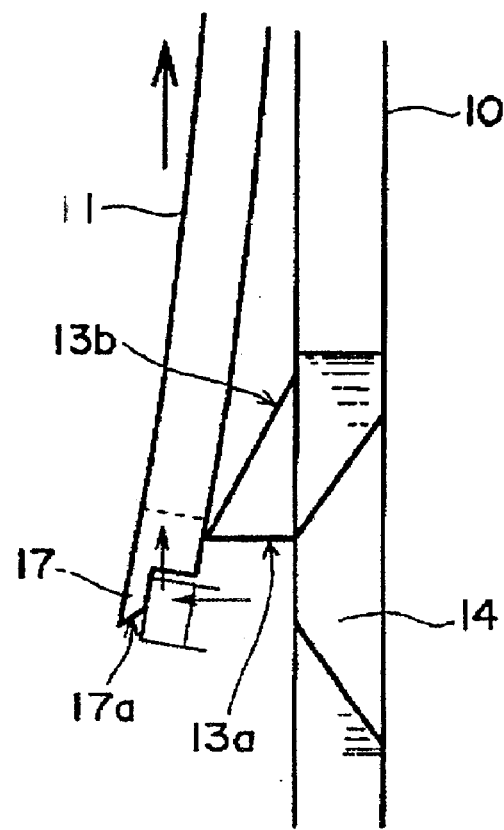
FIGS. 11(A) and 11(B) are plan views showing movement of the first slider and the second slider, respectively.
Figure 11B:
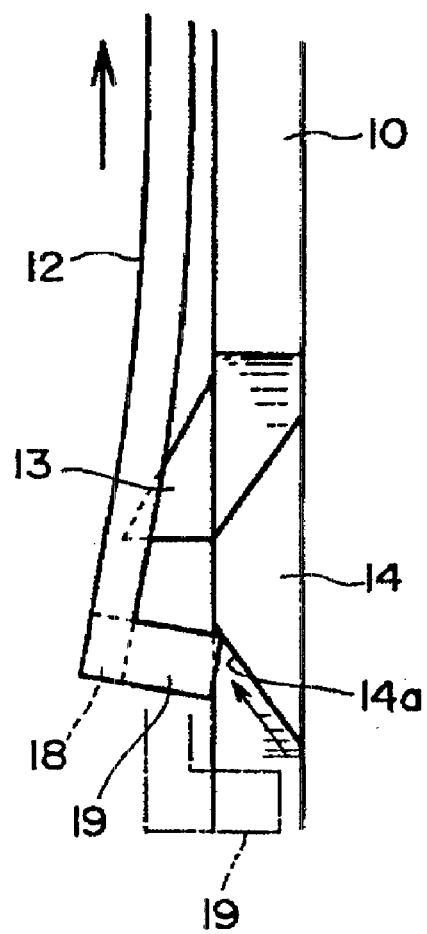

The release member 19 is a protrusion that extends from the frontal end section of the second slider 12 toward the side of the base 10, as shown in FIG. 11(B). While the second slider 12 is moving toward the deeper side, the release member 19, which follows the slope 14a of the fixed sloped section 14 on the base 10, is pushed to the side and bends the second slider 12 to the side by a corresponding amount. At the same time, the pushing claw 18 provided below the release member 19 is also similarly pushed to the side.

Figure 9:
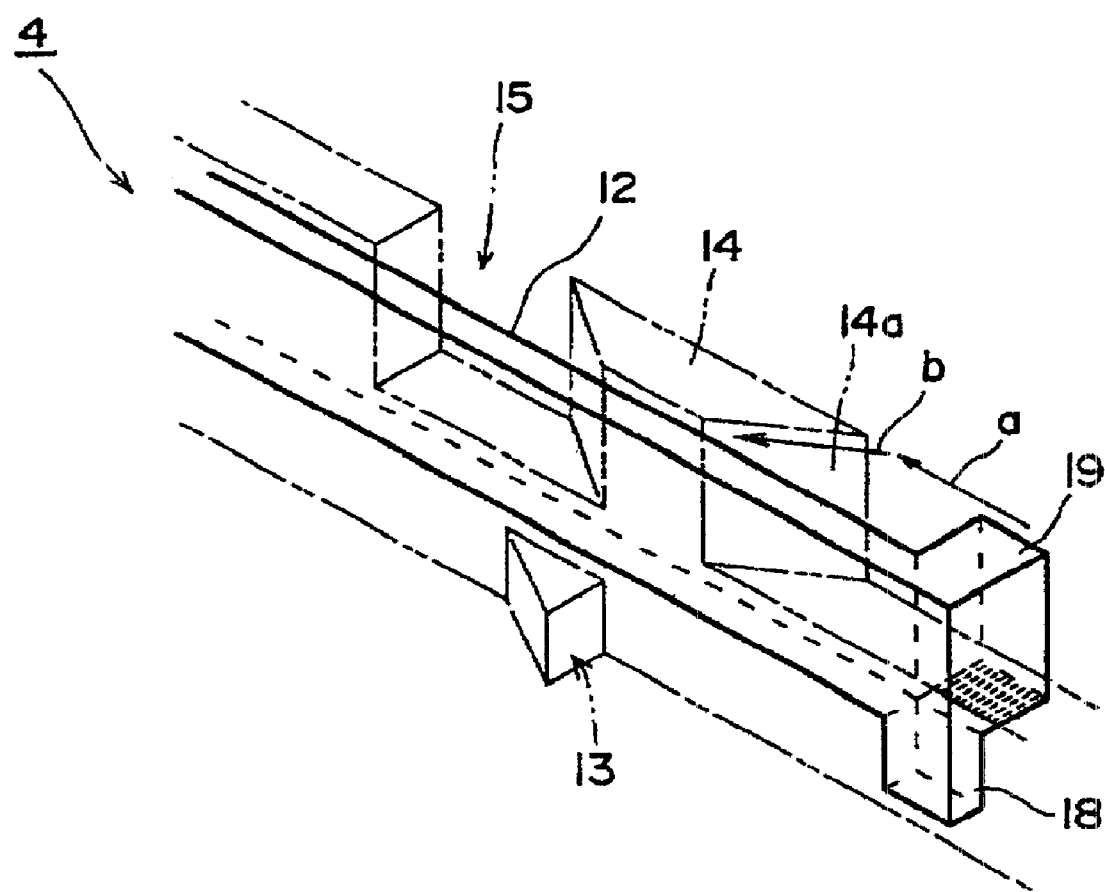
FIG. 9 is a perspective view of a second slider of the linkage.

The pushing claw 18 is a protrusion that downwardly protrudes from the frontal end of the second slider 12, as shown in FIG. 9. The pushing claw 18 is formed to a thickness that can fit in the space between the pressure-receiving claw 17 of the first slider 11 and the base 10.

In the present embodiment, the first slider 11 has a configuration shown in FIG. 10, and has a generally straight end face that defines a restriction section 38. The restriction section 38 approaches the second slider 12 and functions to prevent movements of the second slider 12 toward the side while the release member 19 is stored in the space 15, as shown in FIG. 12, to thereby prevent the release member 19 from escaping from the space 15. Accordingly, the first slider 11 in a state shown in FIG. 12 cannot move in both of the forward and rear directions.

Linkage operations of the first slider 11 and the second slider 12 described above are explained below. As shown in FIG. 8 or FIG. 10, the first slider 11 cannot slide further into the deeper side as long as the engaging protrusion 16 is hooked by the movement prevention fixed protrusion 13.

As the second slider 12 slides alone in a direction indicated by an arrow a (to the deeper side) in FIG. 9, the pushing claw 18 of the second slider 12 enters between the pressure-receiving claw 17 of the first slider 11 and the base 10. In parallel with this movement, the release member 19 is guided along the fixed sloped section 14 toward the side as indicated by an arrow b, such that the second slider 12 gradually bends, as shown in FIG. 11 (B), and the pushing claw 18 also moves toward the side. At this moment, the pushing claw 18 outwardly pushes the pressure-receiving claw 17 from the inside (from the side of the base 10), as shown in FIG. 11(A), releases its engagement with the engaging protrusion 16 and further pushes the pressure-receiving claw 17 to the deeper side. As a result, the first slider 11, which has been so far hooked by the engaging protrusion 16, rides over the engaging protrusion 16, so that it becomes slidable to the deeper side. In the mean time, the release member 19 of the second slider 12 drops in the space 15, after it rides over the fixed sloped section 14.

Next, one embodiment in which the linkage 4 described above is applied to a CD exchange system is described. First, members that are involved in the operation of the linkage 4 are described.

A driving device that slides the first slider 11 and the second slider 12 is formed from a single driving system. For example, a driving device in the CD exchange system in accordance with the present embodiment is structured with a motor 66 and a motor rotational force transfer system including a belt 67, pulley 68, driving gear 69, rotary gear 70, second gear 72, operation transfer device 75 and play gear 78. The structure from the motor 66 to the operation transfer device 75 will be described below in detail in connection with a rotation transmission switching system 8. The play gear 78 is capable of normal and reverse rotations depending on the rotation of the motor 66, and is capable of sliding the first slider 11 and the second slider 12 toward the deeper side and the front side.

FIGS. 14 through 21 show the linkage 4 that provides linked operations in which one of the carriages 1–3 selected as an x-stage in the CD exchange system is horizontally moved from a neutral position, and clamped from above and below at a play position.

Figure 14:
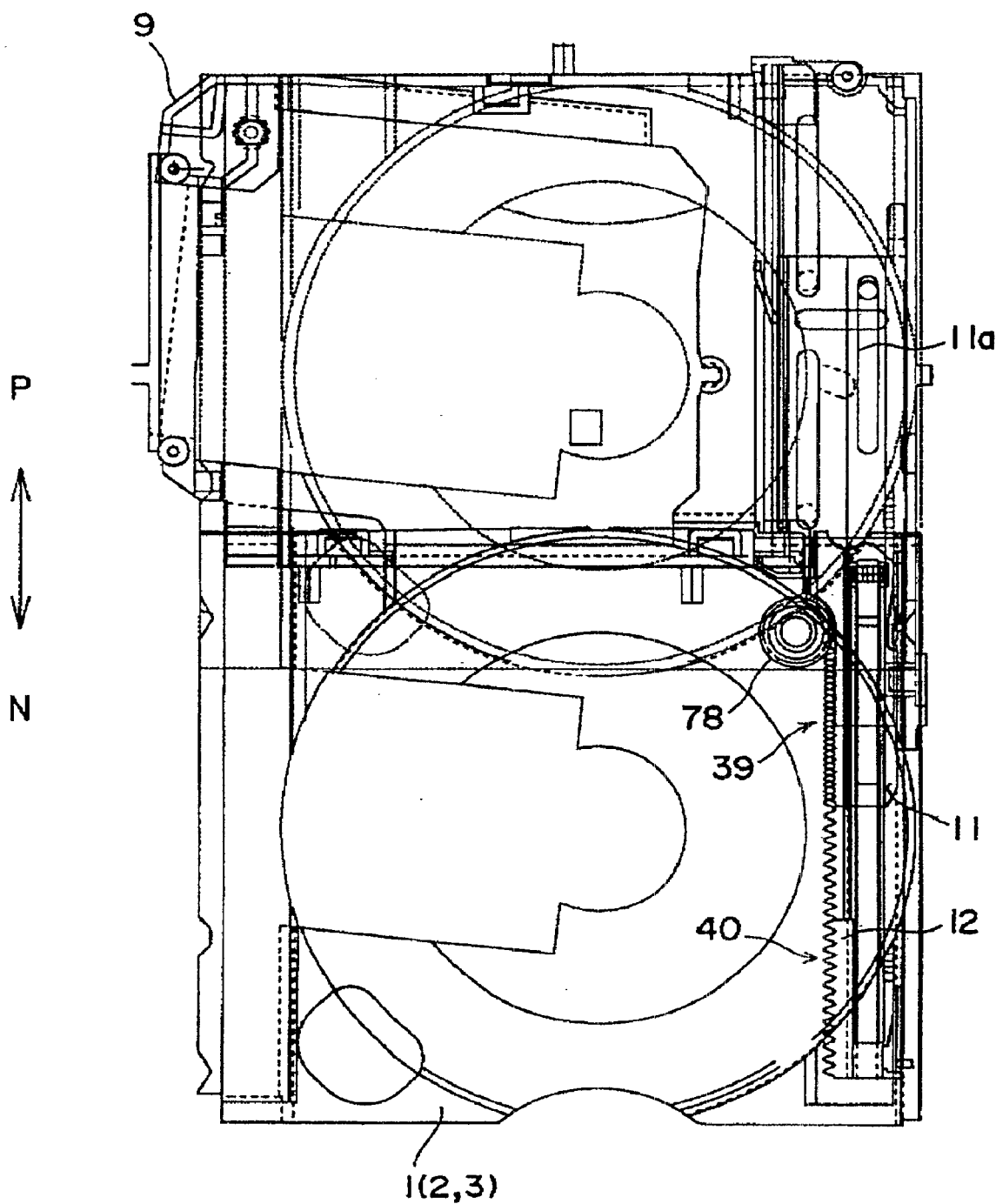
FIG. 14 is a plan view of the disk exchange system mainly showing the structures of the linkage and the carriages.
Figure 15A:
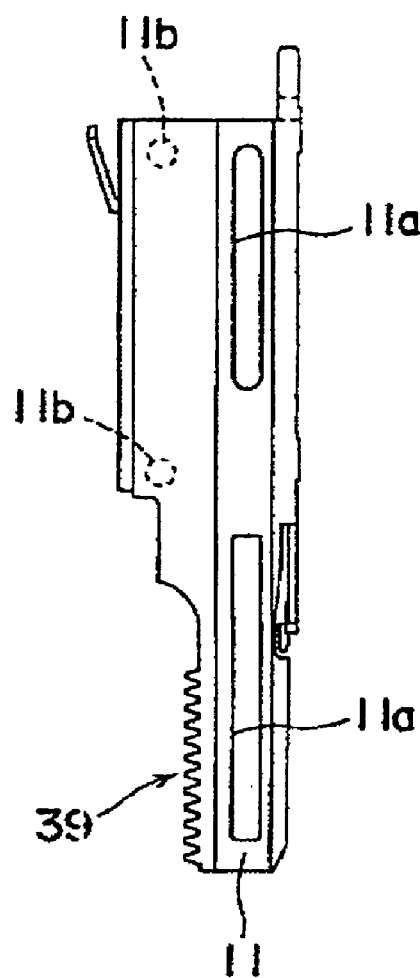
FIGS. 15(A) and 15(B) are plan views showing configuration examples of the first slider and the second slider, respectively.
Figure 15B:
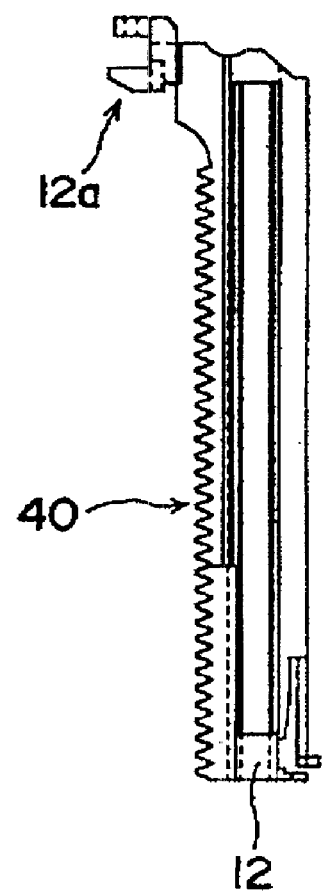
Figure 16:
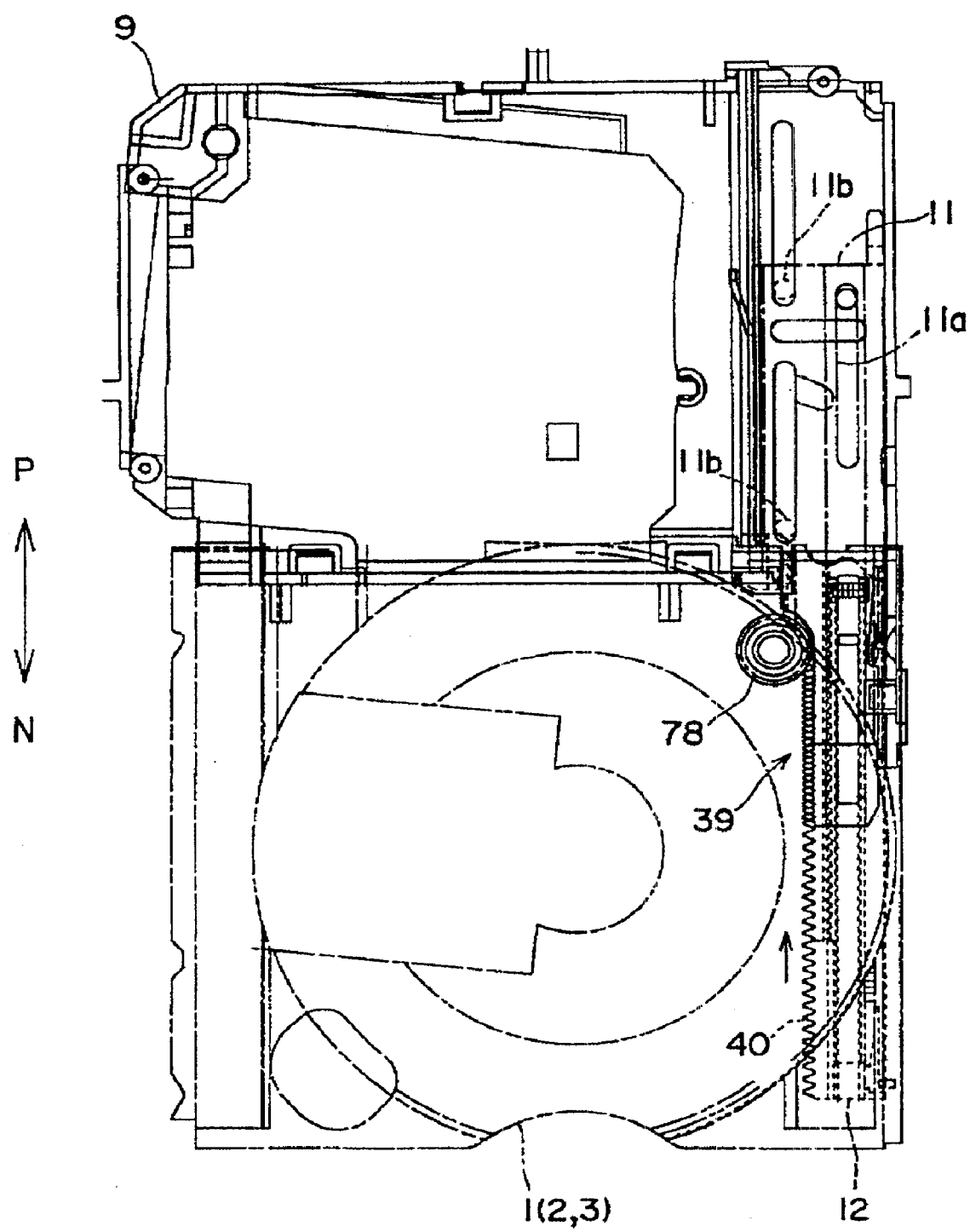
FIG. 16 is a plan view of the disk exchange system mainly showing the structures of the linkage and a play gear.

As shown in FIGS. 14 through 16, the first slider 11 and the second slider 12 are provided on the right side of the CD exchange system as viewed in plan and in a slidable manner in front and rear directions (in a direction from the neutral position toward the play position and a reverse direction). The first slider 11 and the second slider 12 are equipped with racks 39 and 40 near the central areas on side end sections thereof, respectively. Gear teeth of the racks 39 and 40 engage the play gear 78.

The first slider 11 is movable in a stroke corresponding to the length of a long-hole 11a, as shown in FIG. 15(A). Also, the rack 39 is formed to have a length that is generally the same as the stroke length.

Figure 2:
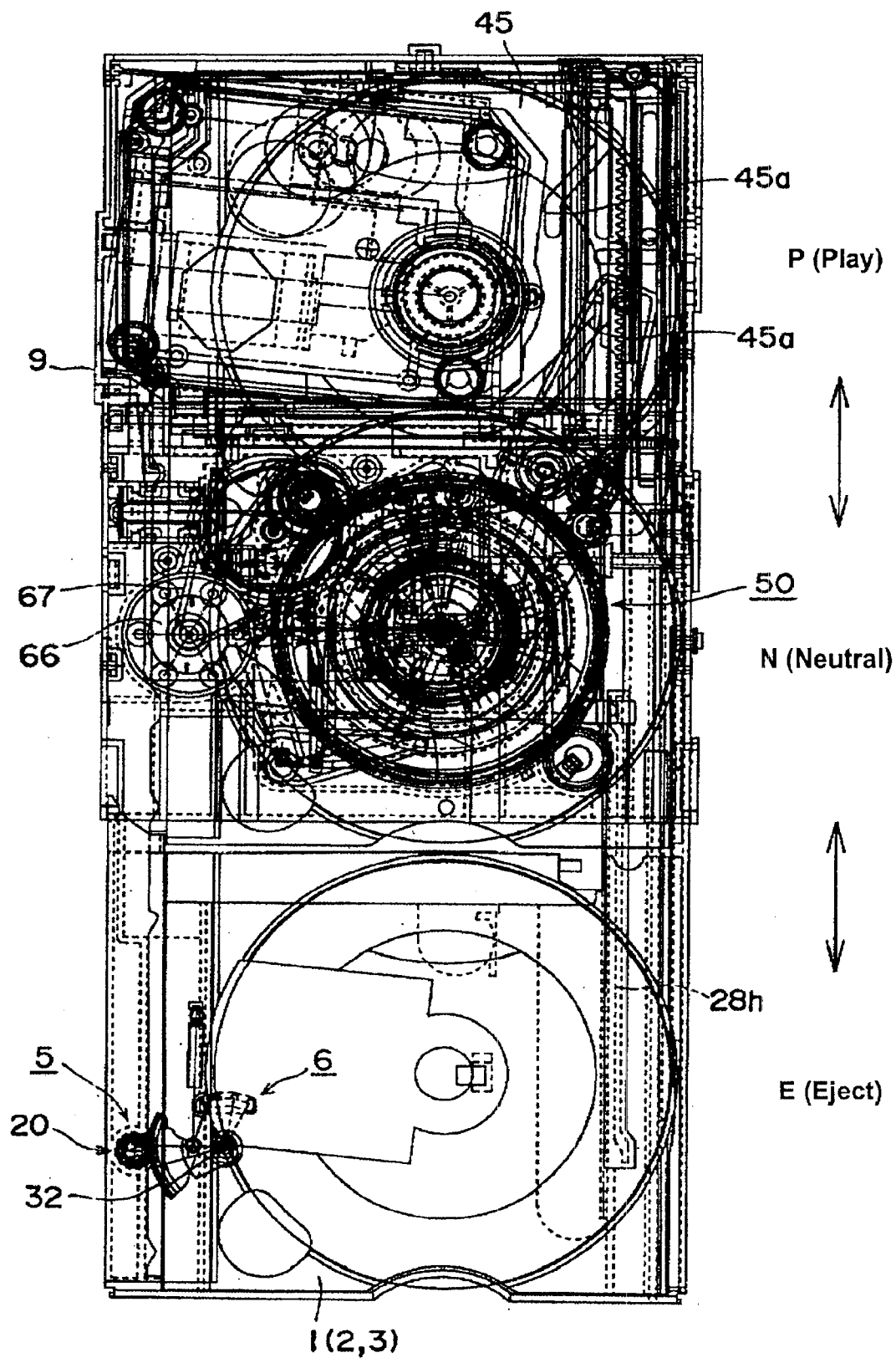
FIG. 2 shows a plan view of a structure of a disk exchange system in which each carriage is capable of shifting among a play position, a neutral position and an ejection position.

The first slider 11 is equipped with two vertically protruding engaging protrusions 11b. These engaging protrusions 11b engage slanted grooves 45a of a lateral slider 45 that is provided in the play position of the CD exchange system, as shown in FIG. 2, in a moveable manner in a width direction of the CD exchange system. Accordingly, the lateral slider 45 slides in the width direction in association with sliding movements of the first slider 11.

Figure 4:
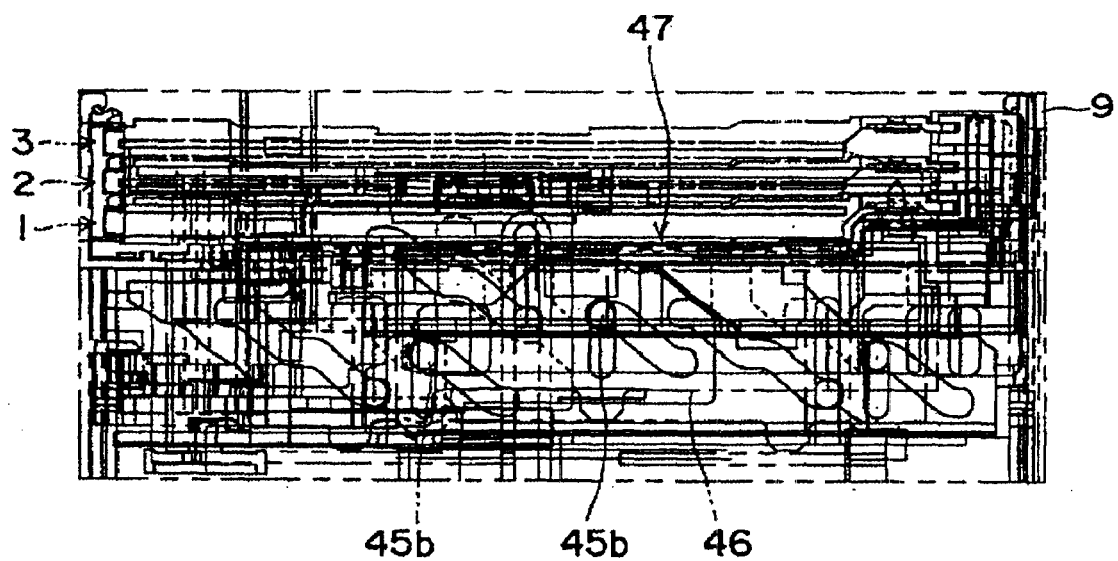
FIG. 4 is a rear view of the disk exchange system shown in FIG. 2.
Figure 5:
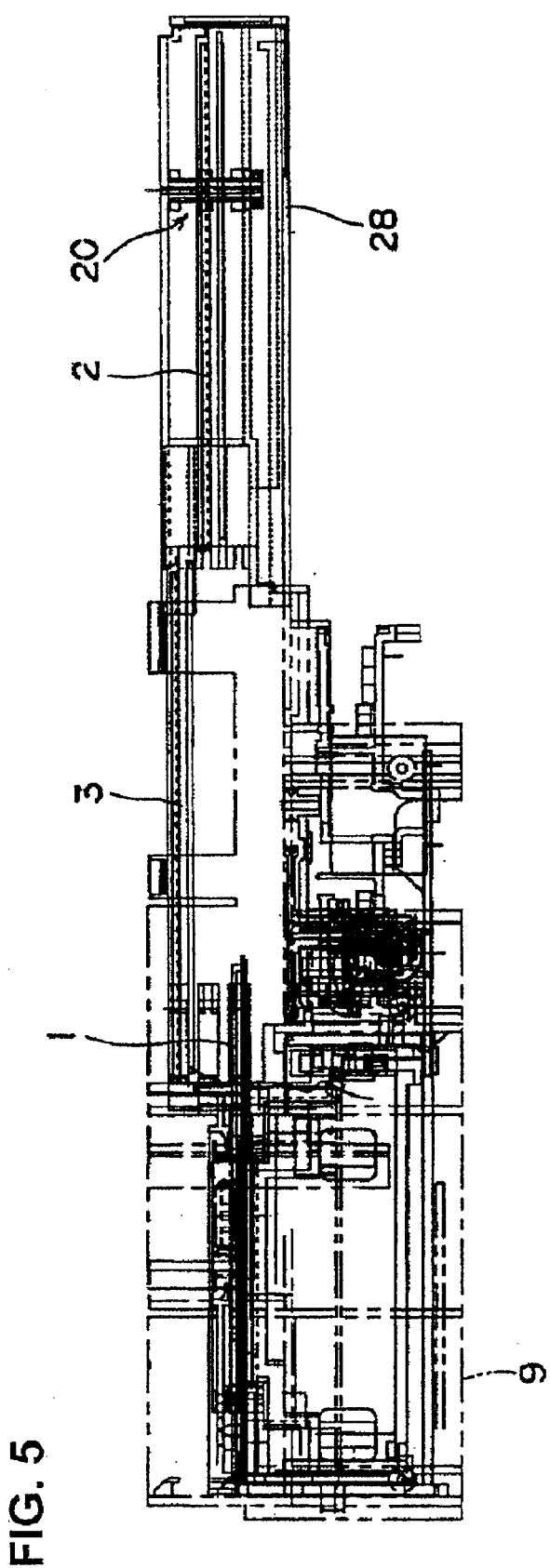
FIG. 5 is a left-side side view of the disk exchange system shown in FIG. 2.
Figure 6:
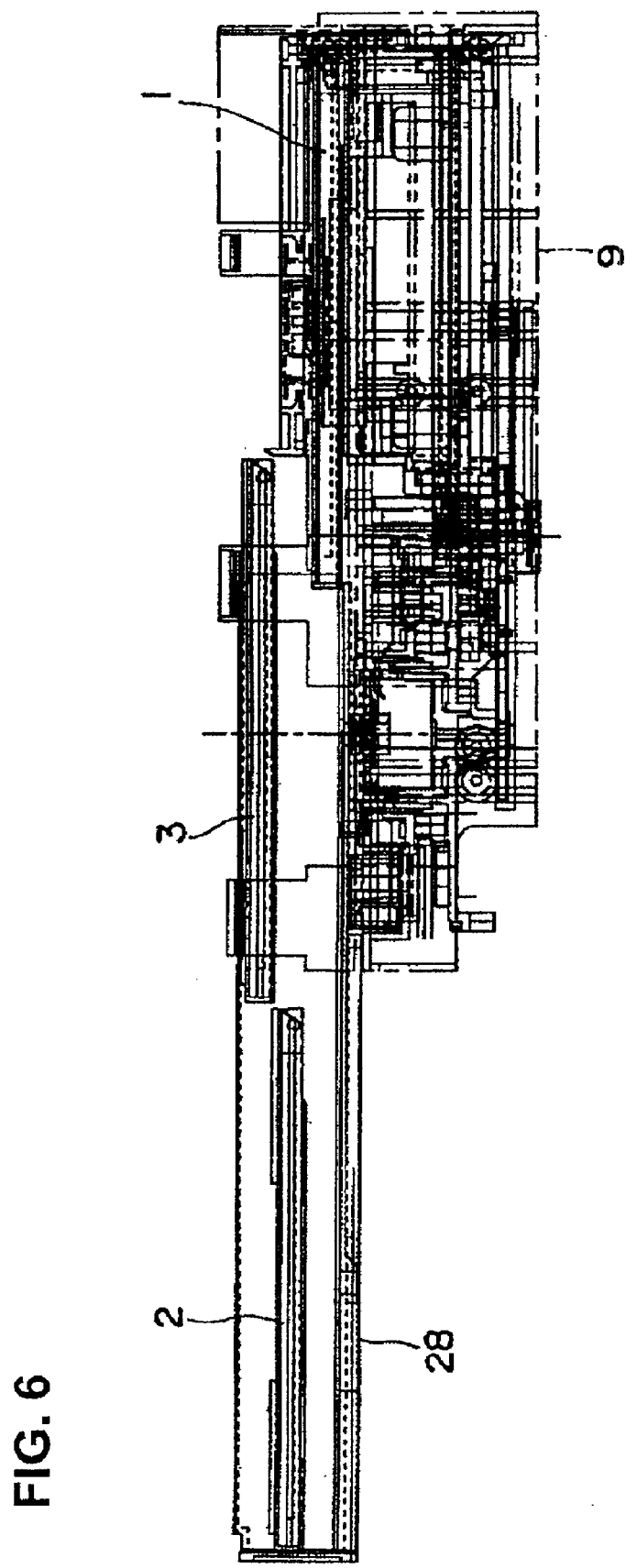
FIG. 6 is a right-side side view of the disk exchange system shown in FIG. 2.

The lateral slider 45 is also provided with engaging protrusions 45b that extend in the rear direction (or in the front direction). The engaging protrusions 45b engage slanted grooves 46a of a longitudinal slider 46 that is provided in the play position of the CD exchange system, as shown in FIG. 4, in a moveable manner in a longitudinal direction. Accordingly, the longitudinal slider 46 slides in a longitudinal direction in association with lateral sliding movements of the lateral slider 45. The longitudinal slider 46 supports a CD turntable 47 in the play position.

The rack 40 of the second slider 12 is longer than the rack 39 of the first slider 11, as shown in FIG. 15(B). The length of the rack 40 corresponds to the sliding length of the carriage between the neutral position and the play position. Also, the second slider 12 has an engaging section 12a that hooks and moves the carriage that is determined as a stage (in other words, selected for performance) to the play position.

The first slider 11 and the second slider 12 are initially in a stand-by condition as indicated in FIG. 16 by a dot-and-dash line and a broken line. In this case, the rack 40 of the second slider 12 engages the play gear 78, but the rack 39 of the first slider 11 does not engage the play gear 78. As shown in FIGS. 16 and 17, when the play gear 78 is rotated, only the second slider 12 that is in engagement with the play gear 78 moves, and moves together with the carriage being hooked toward the play position. Then, when the second slider 12 is moved to the deepest position, the linkage 4 operates as described above.

Figure 18A:
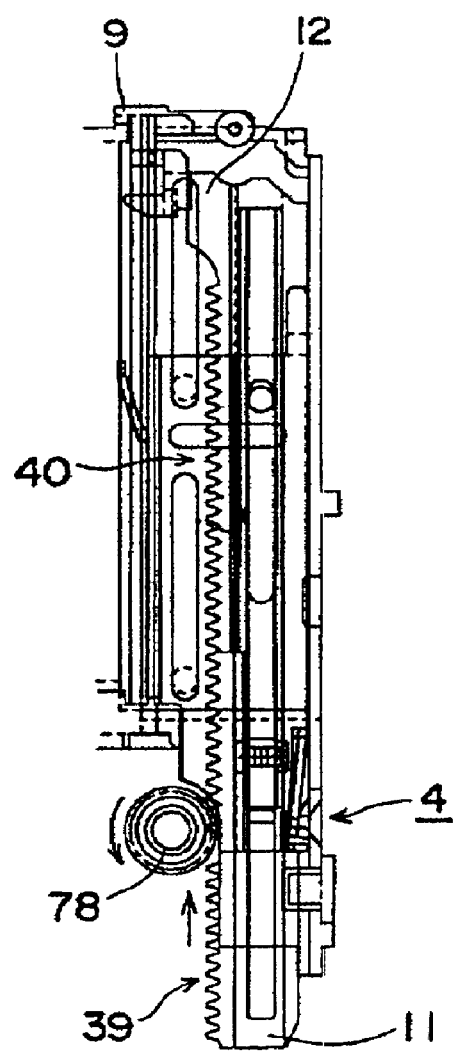
FIGS. 18(A) and 18(B) are a plan view showing movements of the first slider and the second slider, and a plan view in part of a main portion of the linkage, respectively.
Figure 18B:
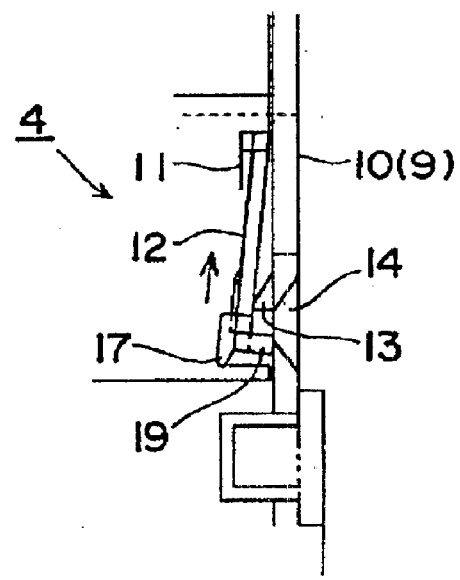
Figure 19A:
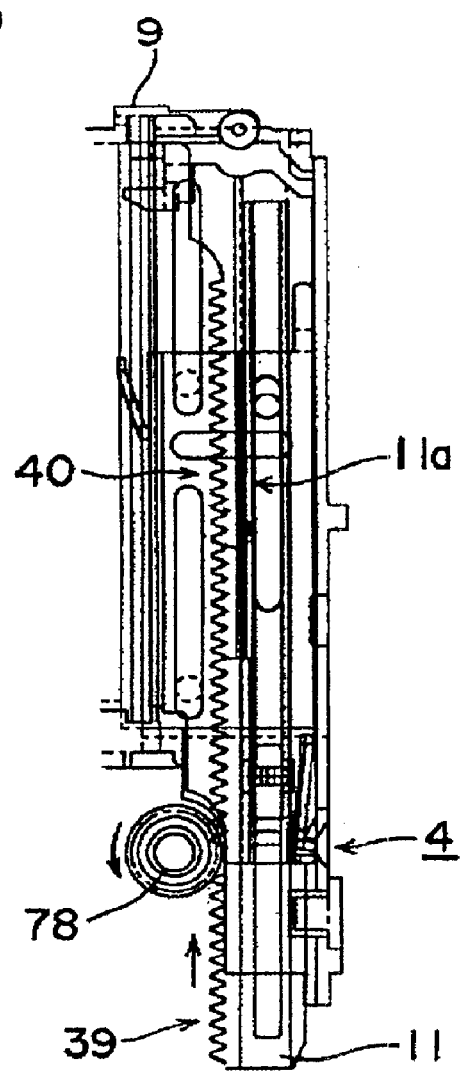
FIGS. 19(A) and 19(B) are a plan view showing movements of the first slider and the second slider, and a plan view in part of a main portion of the linkage, respectively.
Figure 19B:
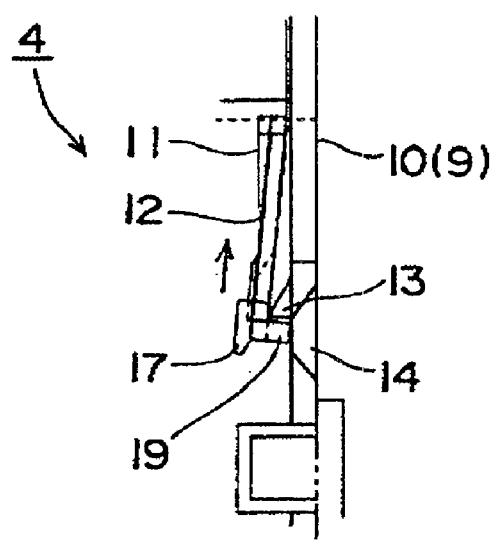
Figure 20A:
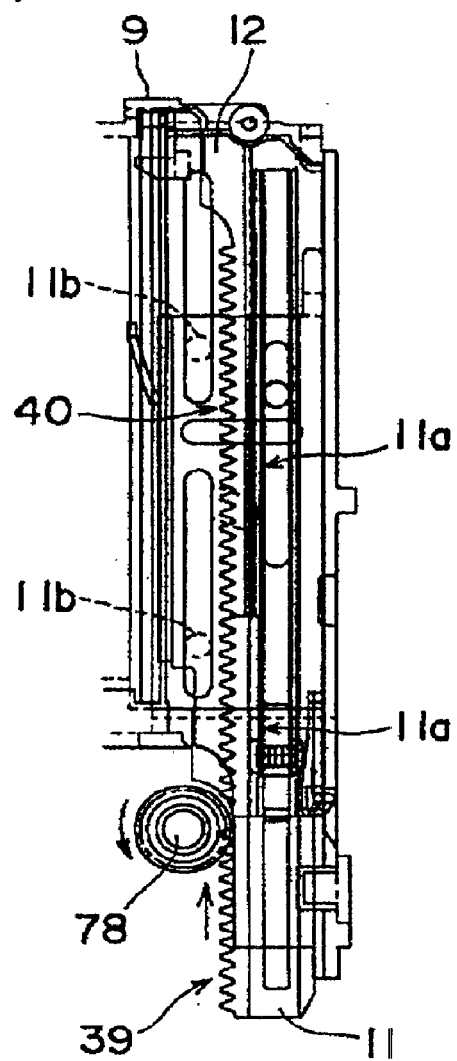
FIGS. 20(A) and 20(B) are a plan view showing movements of the first slider and the second slider, and a plan view in part of a main portion of the linkage, respectively.
Figure 20B:
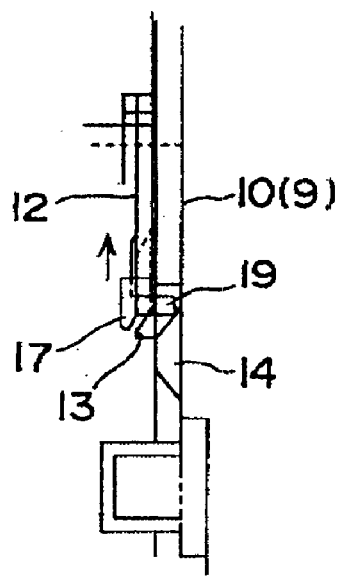
Figure 21A:
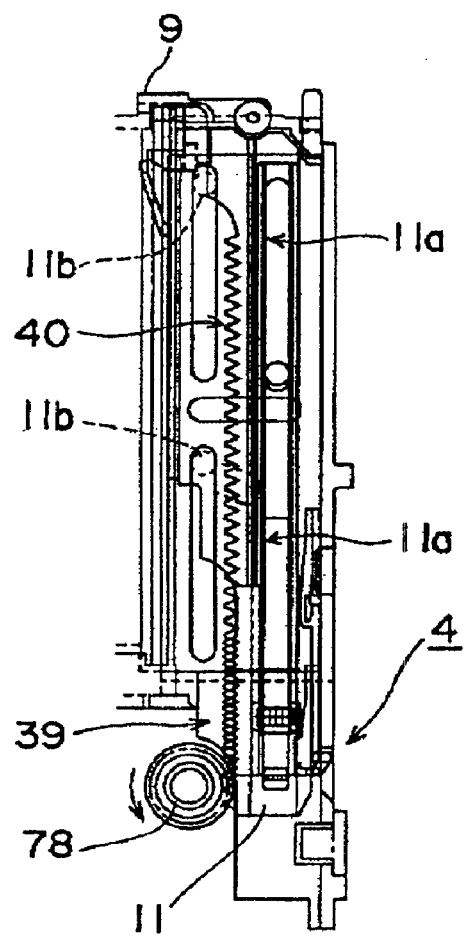
FIGS. 21(A) and 21(B) are a plan view showing movements of the first slider and the second slider, and a plan view in part of a main portion of the linkage, respectively.
Figure 21B:
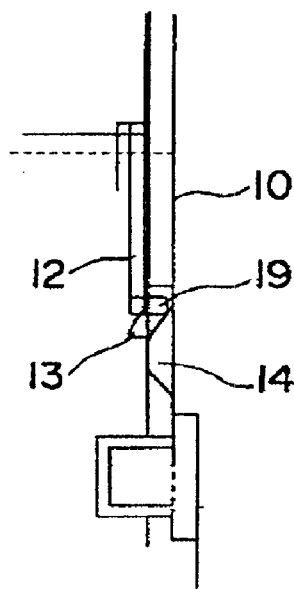

In other words, as shown in FIGS. 18 through 20, the release member 19 and pushing claw 18 release the engaging protrusion 16 of the first slider 11 from the movement prevention fixed protrusion 13 to thereby release the restriction acting thereon and allows the first slider 11 to shift. The first slider 11 shifts by an amount corresponding to the extent to which the engagement is released, and the gear teeth of the rack 39 engages the play gear 78. Therefore, by the linkage 4, the carriage is moved to the center of the play position and then the transmitted power is relayed, and the play gear 78 engages once again the other rack 39. As a result, the first slider 11 moves, laterally slides the lateral slider 45, and longitudinally slides the longitudinal slider 46, whereby the turntable 47 is moved up or down by the foregoing movements and a selected CD is clamped. It is noted that there are occasions in which the centers may not coincide with one another unless the second slider 12 is placed in a completely shifted position. Therefore, the turntable 47 may preferably be moved up or down after the second slider 12 has been placed in the completely shifted position. Also, the carriage should not be moved until after the up or down movement of the turntable 47 is completed. Conversely, when returning to the neutral position, the returning movement is started after the clamps are released. In this case, after the turntable 47 has been completely separated, the play gear 78 engages the rack 40, and the carriage located in the play position is horizontally shifted to the neutral position.

In this manner, by the linkage 4 implemented in the CD exchange system, the linked play and a series of operations can be performed without using special linking parts. Moreover, since a single driving device can move the entire moving parts, the number of parts does not increase.

Figure 13:
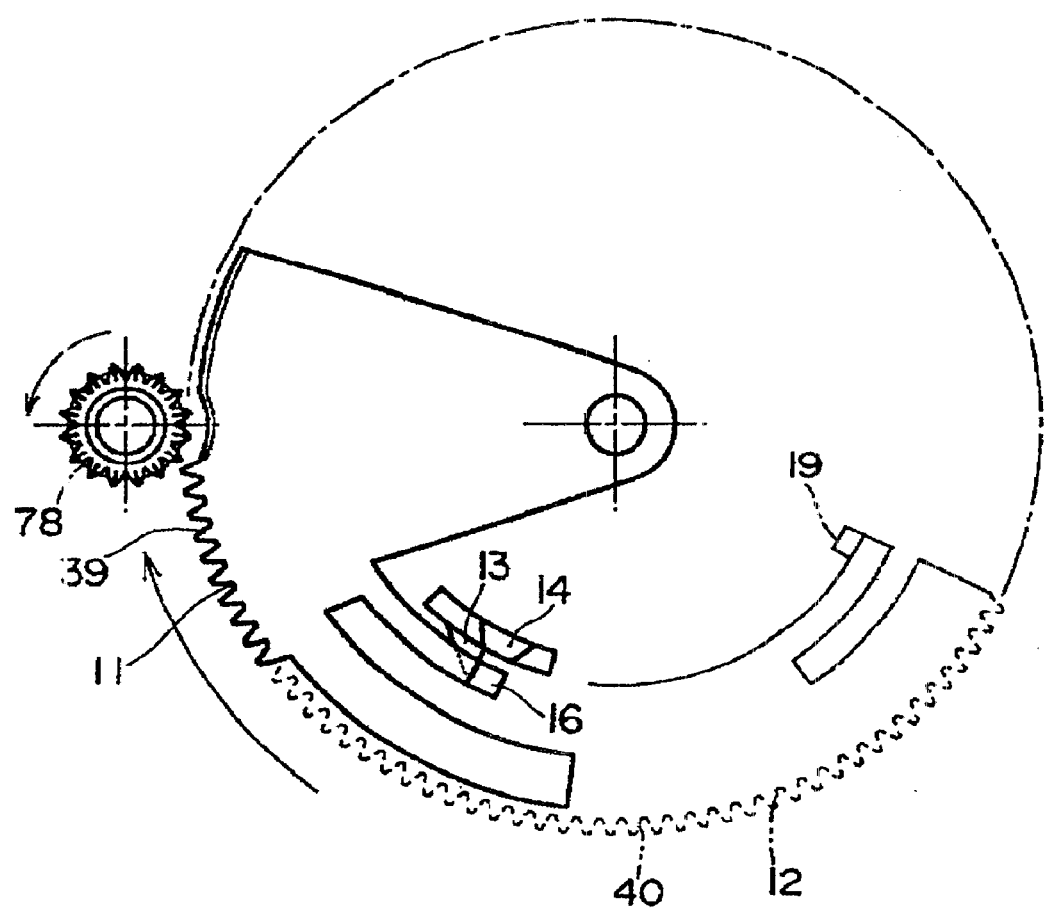
FIG. 13 shows a linkage with a slider formed from a rotational member having a circular or an arcuate rack.

It is noted that the linkage 4 of the present embodiment is one example of preferred embodiments, and is not limited to an application in a CD exchange system such as the one described above. Many modifications can be made within a range without departing from the subject matter of the present invention, and the present embodiment is applicable to systems other than a CD exchange system. For example, the linkage 4 can be applied not only to the linear racks 39 and 40 described above but also to circular or arcuate racks on circular gears shown in FIG. 13.

Next, the selector system 5, which is a second feature of the present embodiment, will be described. The selector system 5 in accordance with one embodiment of the present invention will be described with reference to FIGS. 22 through 32.

The selector system 5 selects only a desired carriage between at least two carriages disposed in layers, and shifts the selected carriage between the play position and the neutral position, or between the ejection position and the neutral position. In the present embodiment, the selector system 5 includes an interlocking cam 20 having three cams 21, 22 and 23 respectively corresponding to three carriages 1, 2 and 3 arranged in appropriately designed directions on one rotary shaft 27, a driving device 42 that rotates the interlocking cam 20, and an engaging member 25 that can be engaged with and released from a recessed section 26 provided on each of the carriages 1–3. The cams 21 through 23 that engage the carriages 1–3 are switched from one to the other depending on rotation angles of the rotary shaft 27 to select a desired one of the carriages. Components of the selector system 5 are described below.

Figure 22:
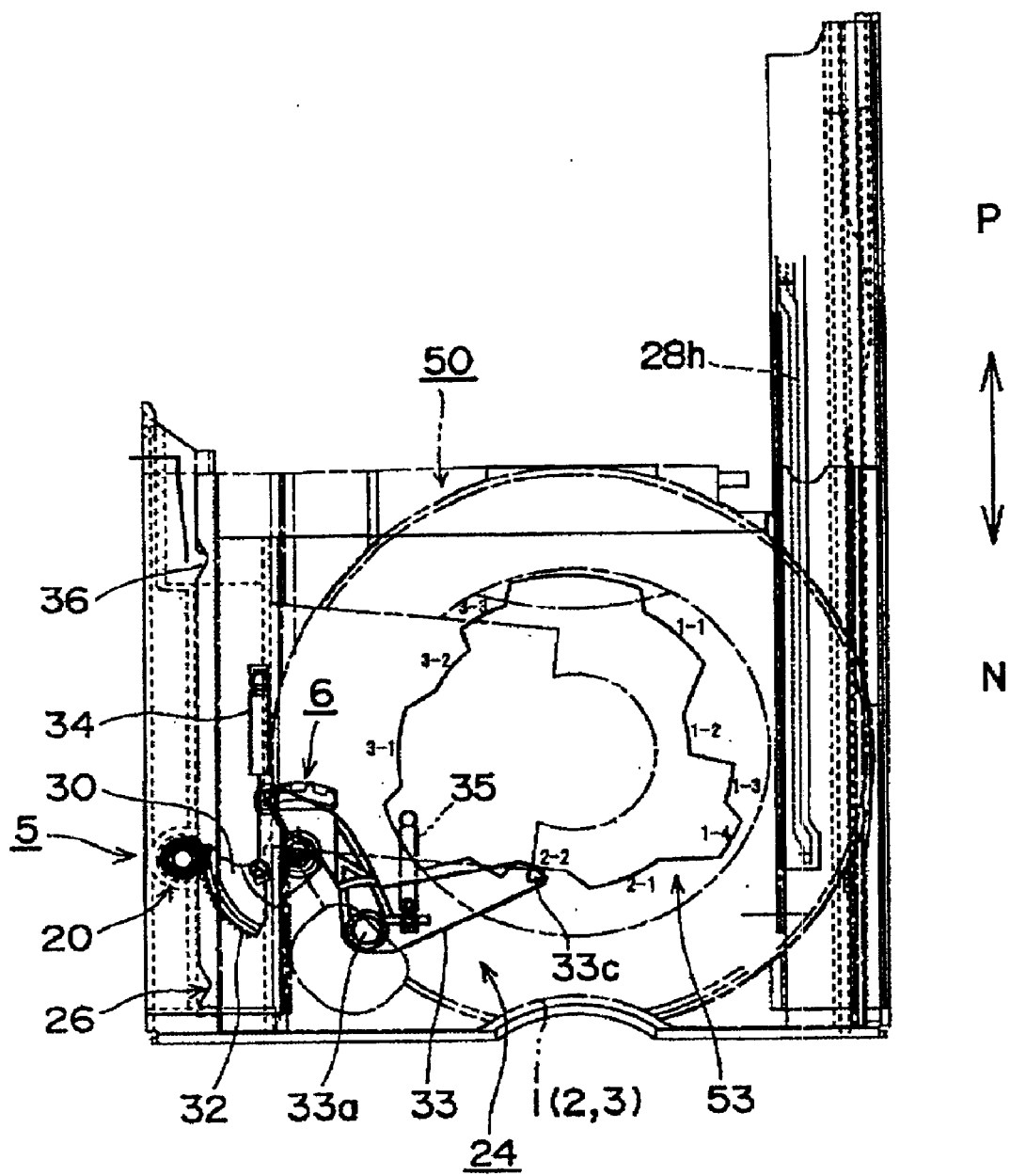
FIG. 22 is a plan view of a main part of a structure of the selector system.
Figure 23:
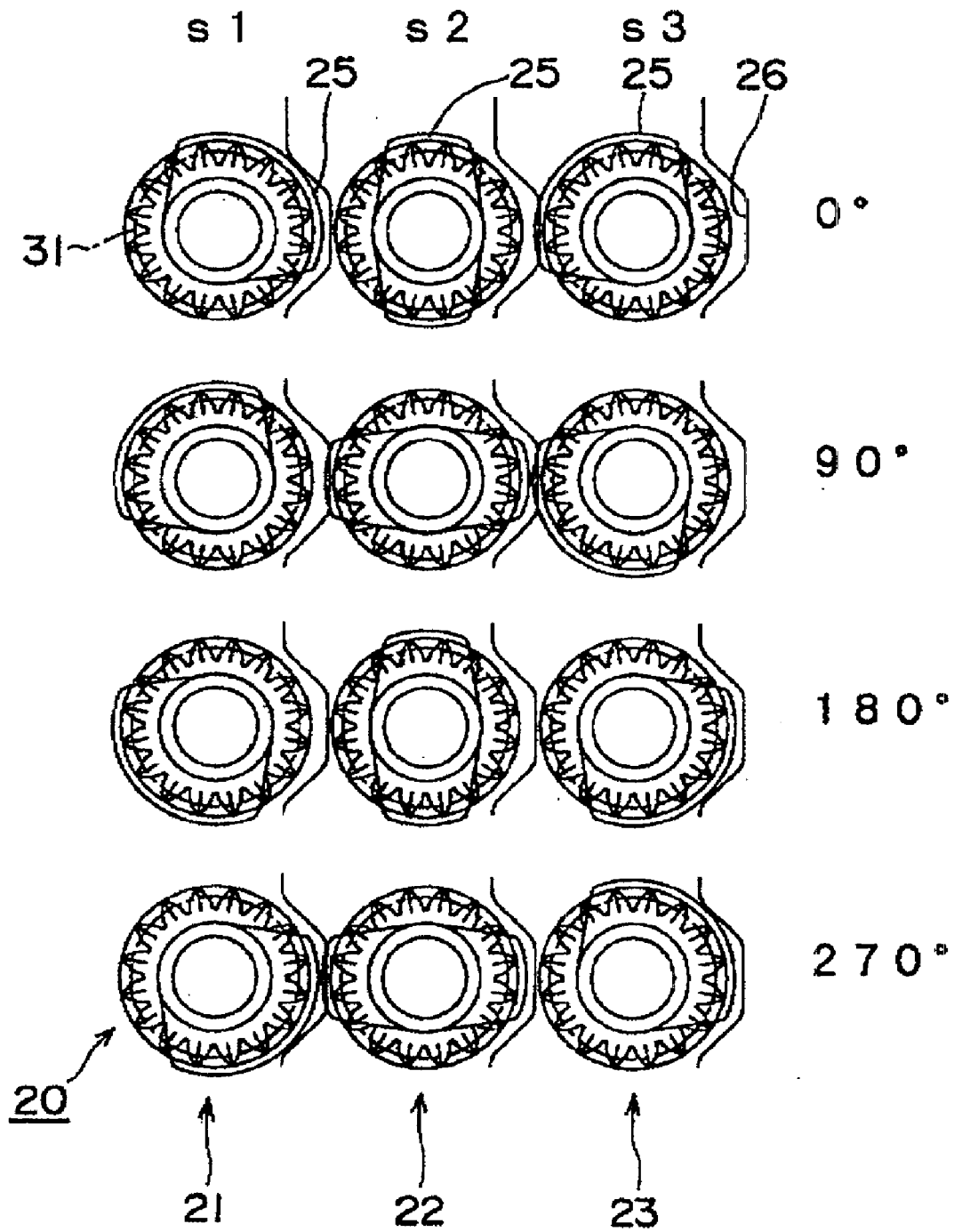
FIG. 23 shows configurations of engagement between an interlocking cam and cams in various shapes.
Figures 24A, 24B:
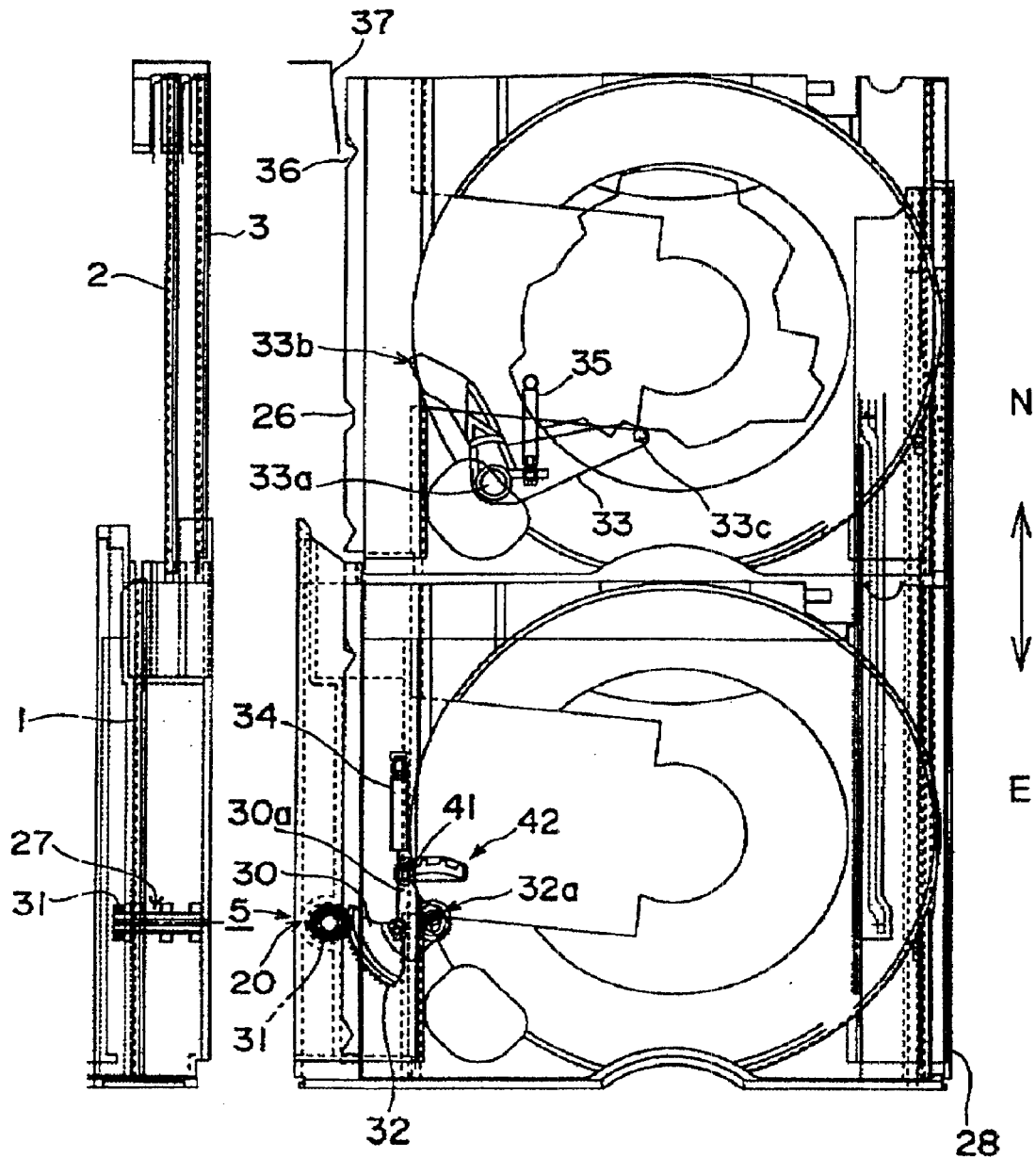
FIGS. 24(A), 24(B) and 24(C) are a left-side side view, a plan view and a front view of the disk exchange system, respectively, showing operations of the selector system at the time of an ejection operation.
Figure 24C:
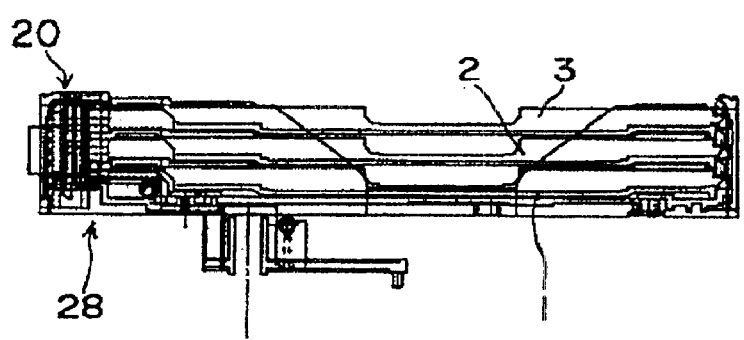

The interlocking cam 20 is formed from three cams 21, 22 and 23 that are stacked one on top of the other on the rotary shaft 27 and coaxially rotate, and disposed in a space provided on a side section of a drawer 28, as shown in FIGS. 22 and 24. As shown in FIG. 23, the three cams 21–23 are provided such that each 90-degree rotation of the interlocking cam 20 switches the carriages 1–3 that are engaged with the cams 21–23 from one to the other. For example, in the present embodiment, the cam 21 at the first stage and the cam 23 at the third stage are formed in a fan-shape, and the cam 22 at the second stage is formed in a generally rectangular shape. The cam at the first stage at 0 degree, the cam at the second stage at 90 degrees, the cam at the third stage at 180 degrees, and all the cams 21 through 23 at the first through third stages at 270 degrees, engage the respective recessed sections 26 provided on the side sections of the carriages 1–3. Any of the carriages 1–3 whose recessed section 26 engages the corresponding cams 21 through 23 follows the movement of the drawer 28, and performs an ejection operation as a result of the interlinked operation, as shown in FIG. 24.

Figure 30A:
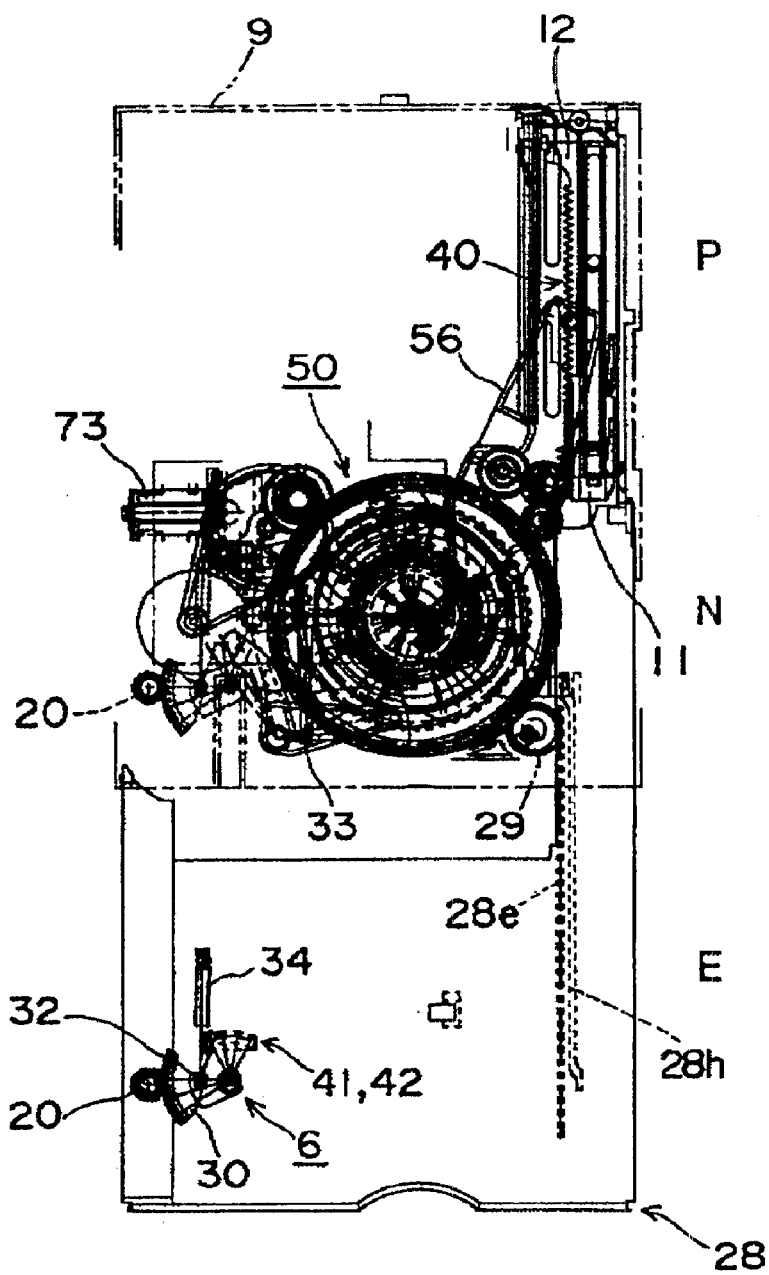
FIGS. 30(A) and 30(B) are a plan view and a front view of a structure of the disk exchange system when the carriage 2 performs an exchange operation while the carriage 1 is in the play operation.
Figure 30B:
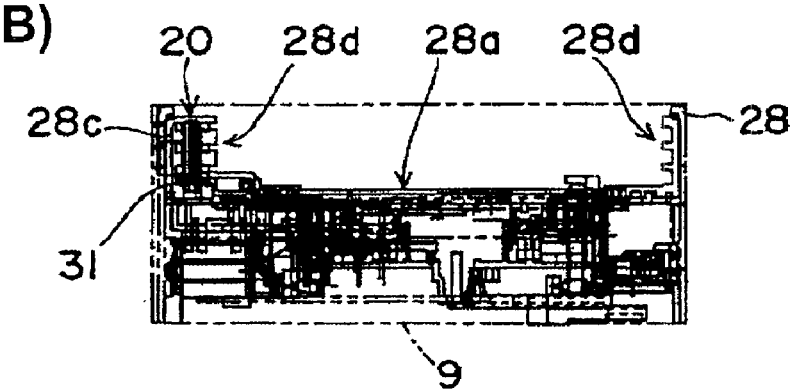
Figure 31:
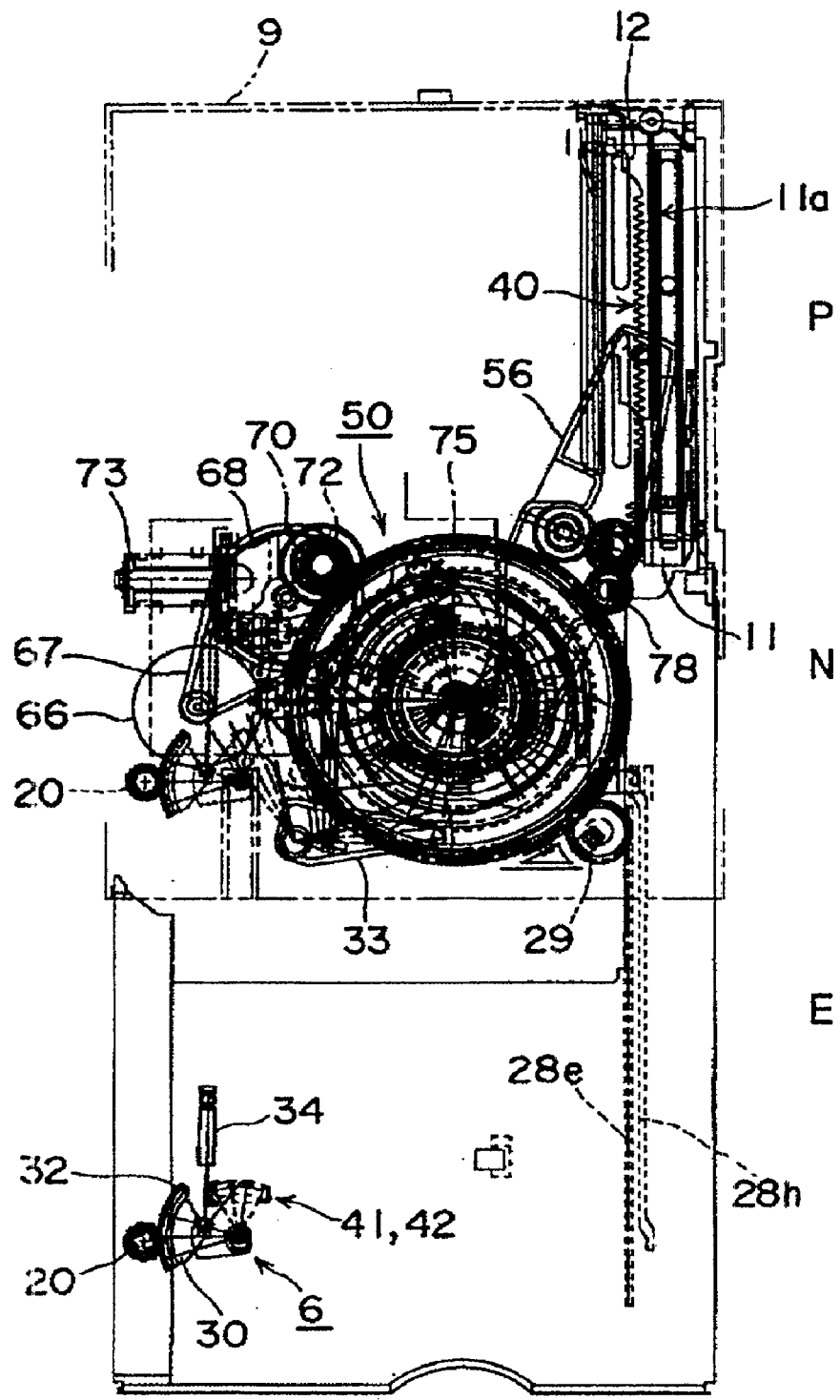
FIG. 31 is a plan view of a structure of the disk exchange system when a carriage 3 performs an exchange operation while the carriage 1 is in the play operation.

Also, the interlocking cam 20 is provided in a manner to move with the drawer 28 at the time of the ejection operation. The drawer 28 is first described below. The drawer 28 is formed from a bottom plate 28a and side plates 28b and 28c, as shown in FIG. 30, which define a frame body that is slidable to the ejection position. The interlocking cam 20 is provided on the side plate 28c, and the drawer 28 slides to the ejection position with any one of the carriages 1–3 that engages the corresponding cams 21–23. The side plates 28b and 28c include grooves 28d on their inner walls, which store the respective carriages 1–3, as shown in FIG. 30, in a slidable manner toward the play position. Also, the drawer 28 has a rack 28e that is provided on the bottom plate 28a near the side plate 28b, and has gear teeth facing to the interior thereof. By the rotation of an ejection gear 29 that engage the gear teeth of the rack 28e, the drawer 28 slides between the neutral position and the ejection position. An engaging groove 28h is a guide that engages a rotation stopper 64 of a plate cam 57 shown in the figures such as FIG. 45.

Figure 36:
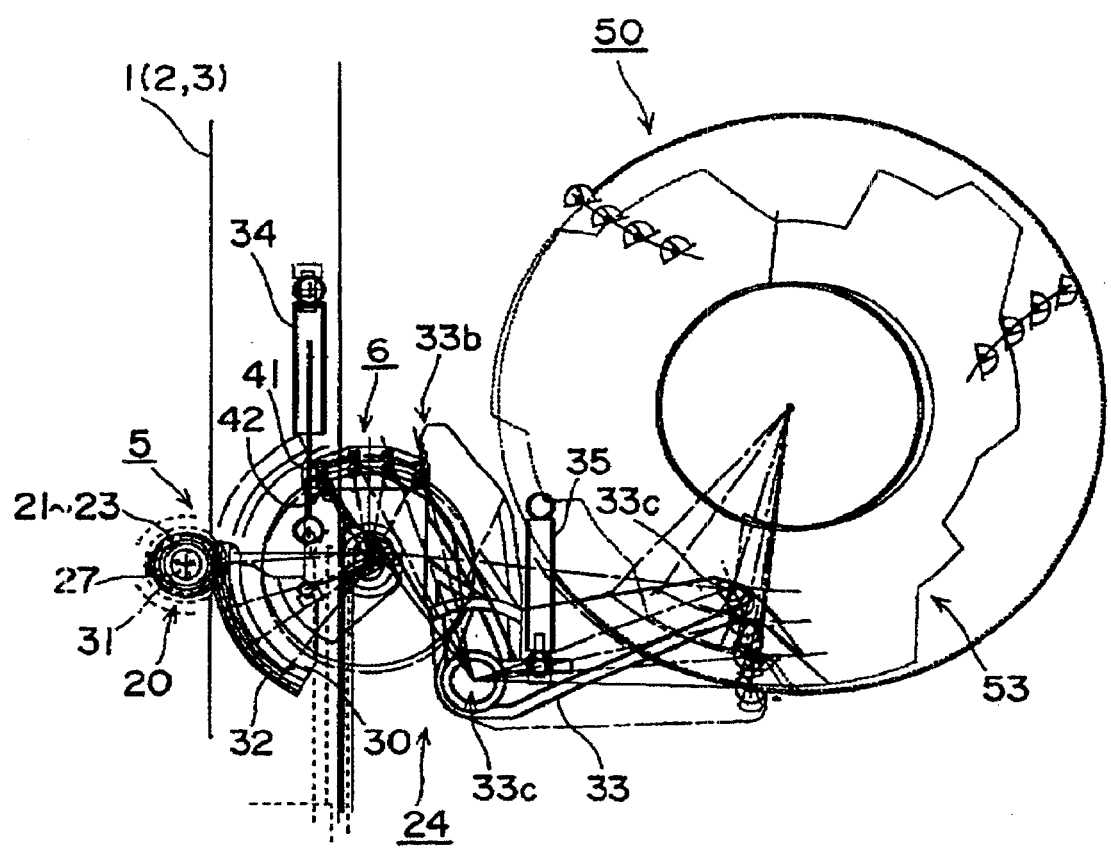
FIG. 36 is a plan view of a structure of a selected position retaining and returning system for carriages.

The driving device 24 rotates the above-described interlocking cam 20 in stages, and is formed from a first gear 31, a second gear 32, a rocking arm 33 and a cam gear 50 (see FIGS. 24, 36 etc.)

The first gear 31 has a circularly arranged gear teeth coaxially provided at a lower section of the rotary shaft 27 of the interlocking cam 20, and transfers movements from the rocking arm 33 to rotate the interlocking cam 20 by a specified amount in stages (90 degrees each). The first gear 31 is provided in one unit with the interlocking cam 20, and moves to the ejection position with the drawer 28 just as does the interlocking cam.

Figure 25:
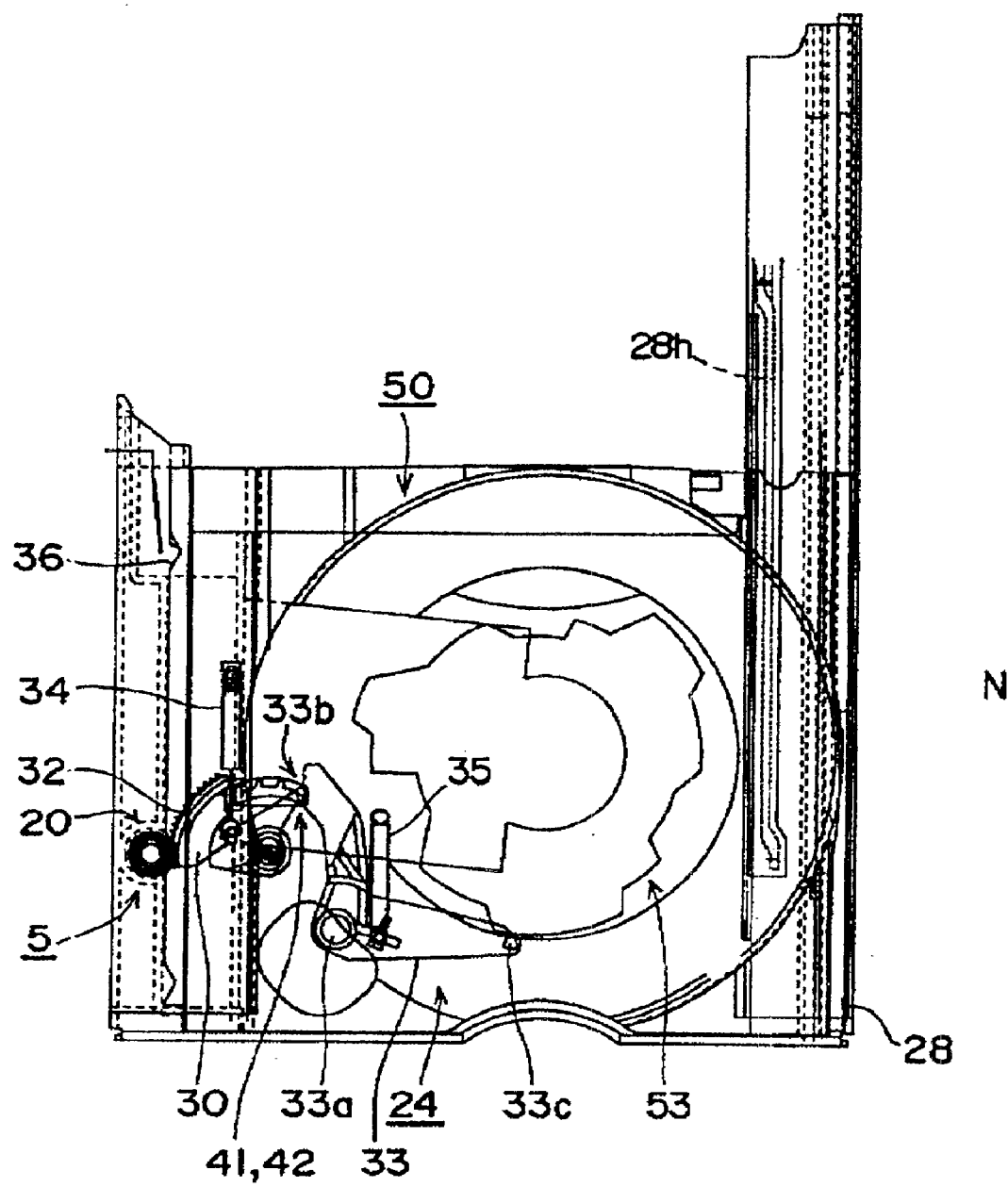
FIG. 25 is a plan view of the selector system in the neutral position.
Figure 26A:
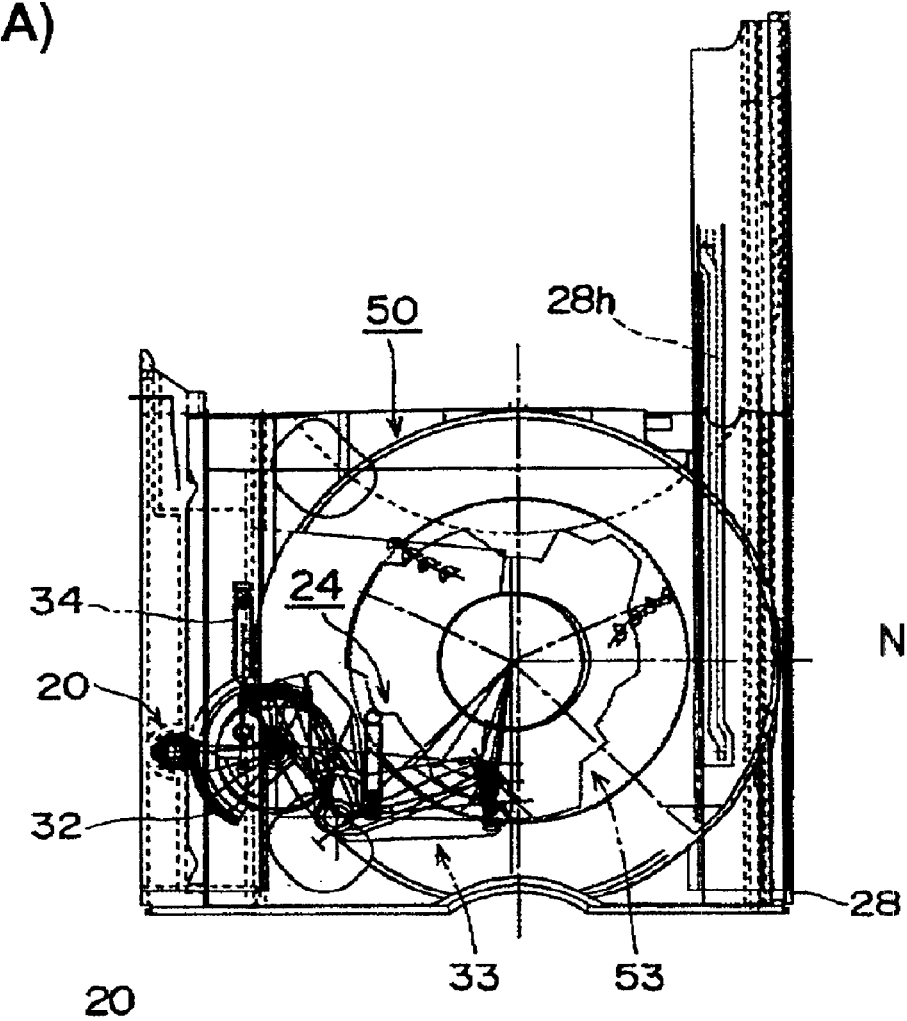
FIGS. 26(A) and 26(B) are a plan view and a front view showing movements of the selector system in the neutral position.
Figure 26B:
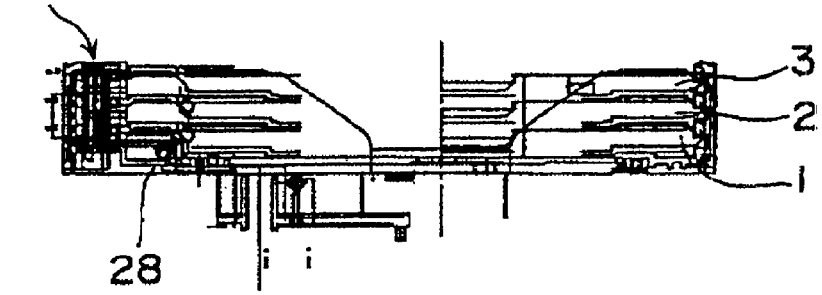
Figure 27:
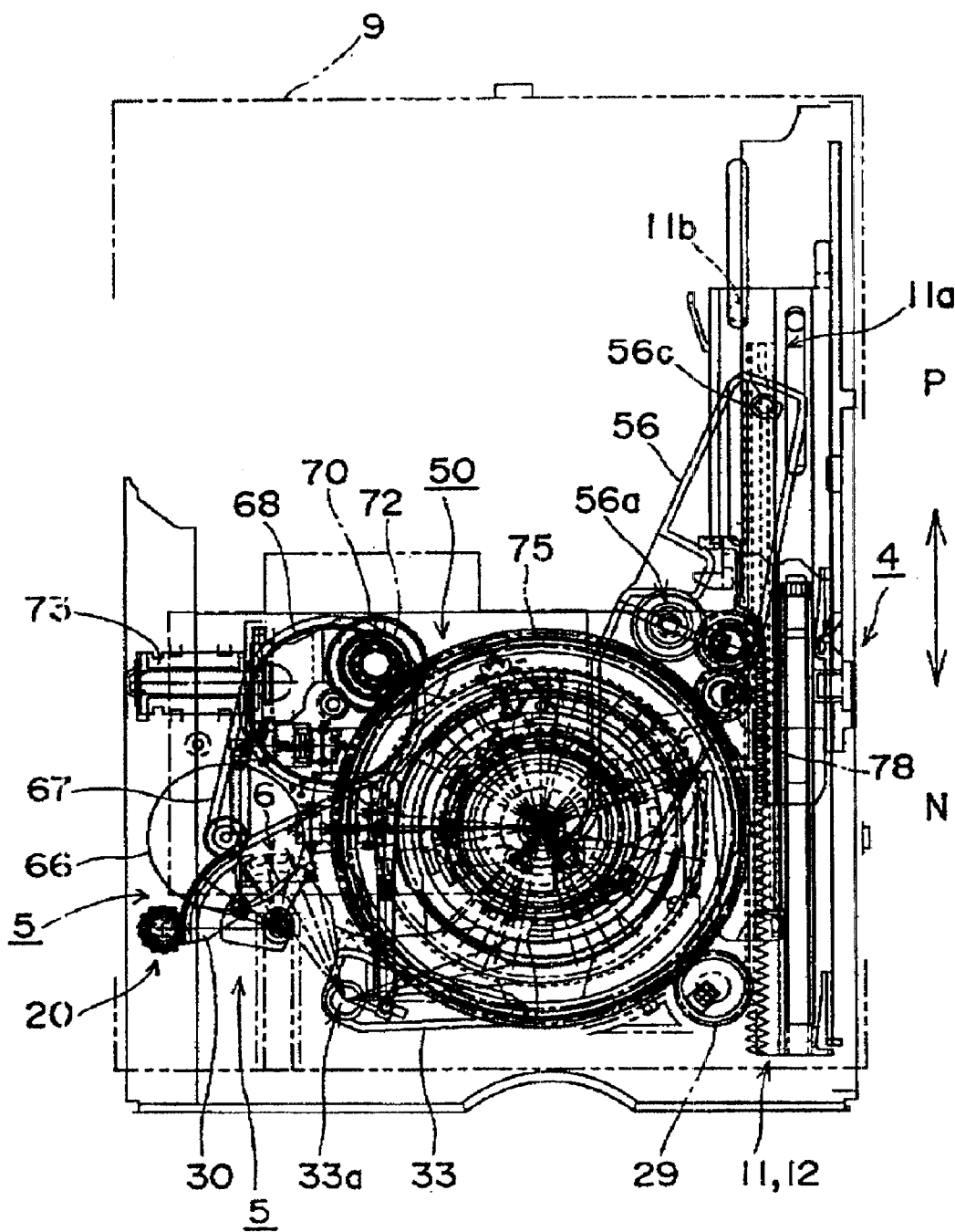
FIG. 27 is a plan view of a structure of the disk exchange system.
Figure 28:
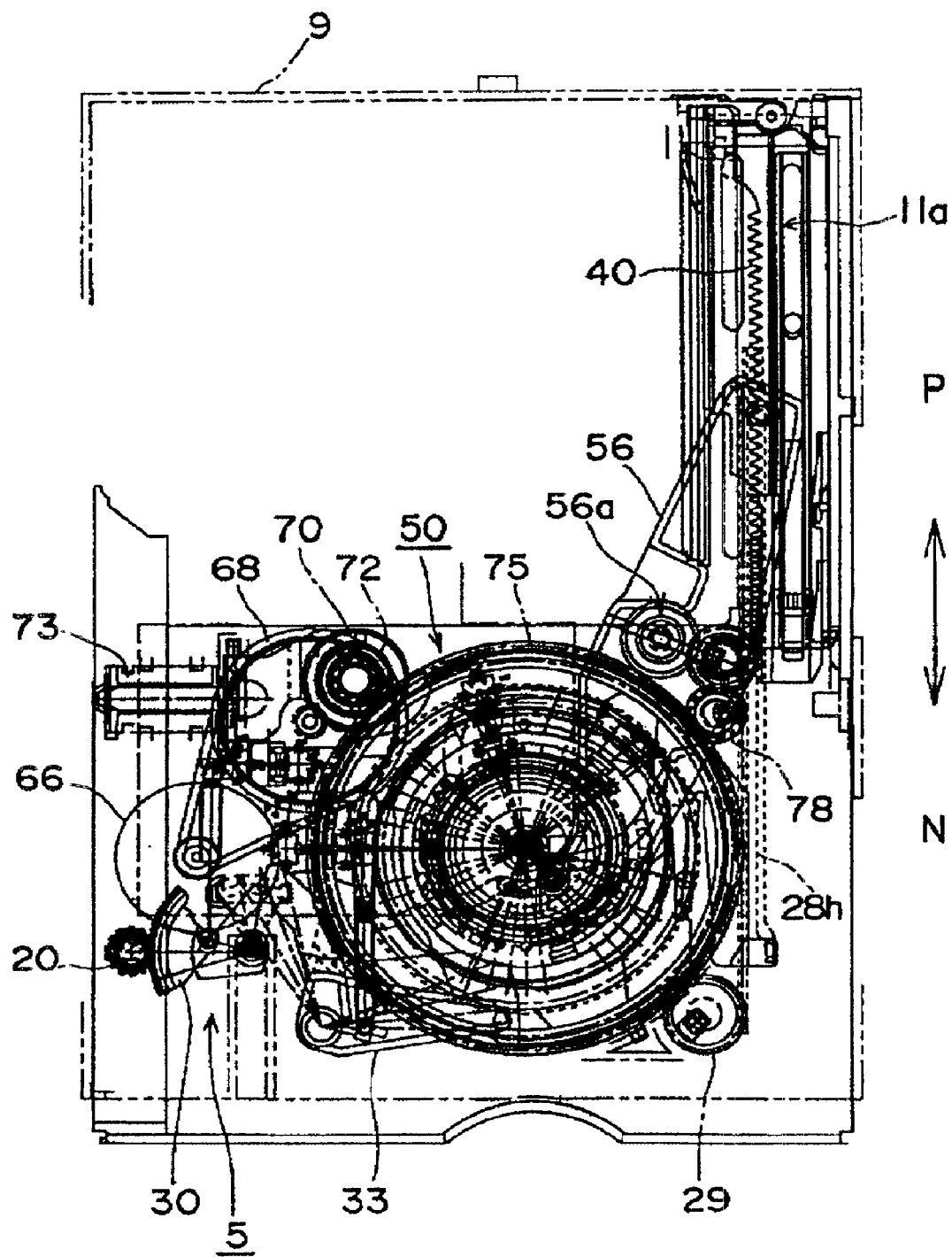
FIG. 28 is a plan view of a structure of the disk exchange system when a carriage 1 is in a play operation.
Figure 29:
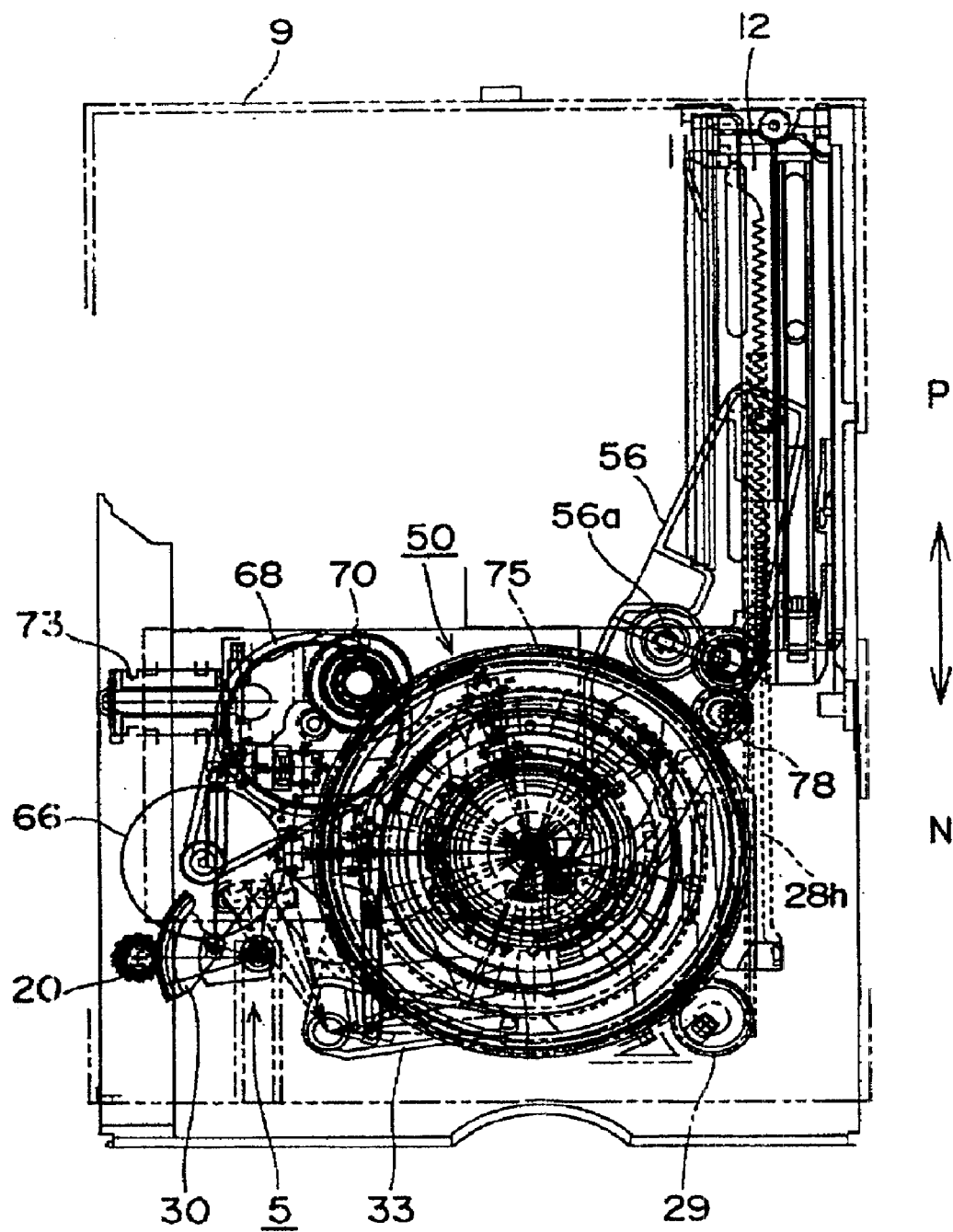
FIG. 29 is a plan view of a structure of the disk exchange system when a carriage 2 performs an exchange operation while the carriage 1 is in the play operation.
Figure 32:
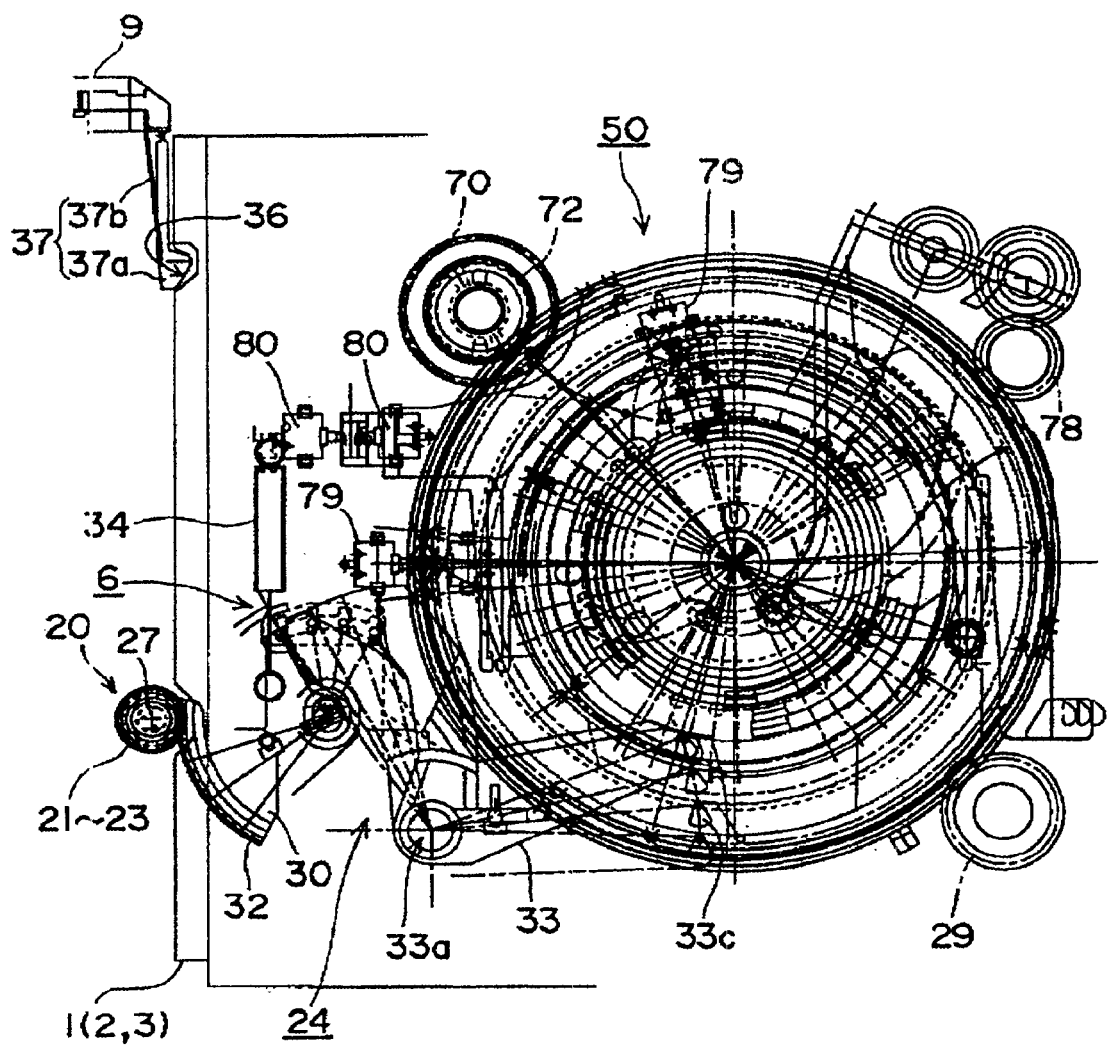
FIG. 32 is a plan view in part of the disk exchange system showing a structure of the selector system and other components.

The second gear 32 is a fan-shaped eccentric gear that transfers the rotational force of the rocking arm 33 to the first gear 31, as shown in FIGS. 24, 25 and 32, and is provided on an end face of an S-arm 30 that is rotatable about a pivot 32a as a center. The S-arm 30 is forced in a clockwise direction by a force application device 34 composed of a coil spring and the like. The S-arm 30 and the force application device 34 are provided on the bottom plate 28a of the drawer 28, and are moved to the ejection position with the interlocking cam 20, as shown in FIG. 30. Also, the S-arm 30, as shown in FIG. 24, has a protruded section 30a that protrudes toward the side of the play position and a protrusion 41 protruding in a vertical direction from an end section of the protruded section 30a. Rotational force is transferred from the rocking arm 33 through the protrusion 41. It is noted that the structure and actions of a first selected position retaining device (the protrusion 41 in this embodiment) that is provided on the S-arm 30 and a second selected position retaining device 42 that engages the first selected position retaining device will be described in detail in an embodiment of the selected position retaining and returning system 6 for the carriages 1–3.

The rocking arm 33 is a member that rocks about a pivot 33a as a center in a manner to rotate the first gear 31 through the second gear 32, and is bent in a generally V-shape as viewed in plan, as indicated for example in FIG. 24. The rocking arm 33 has at its one end a pushing end face 33b that comes in contact with the protrusion 41 of the second gear 32, and at the other end a follower protrusion 33c that follows a carriage selection cam 53 of the cam gear 50. Also, the rocking arm 33 is forced in a counterclockwise direction by a force application device 35 composed of a coil spring and the like such that the follower protrusion 33c is normally brought in contact with the carriage selection cam 53 of the cam gear 50. The rocking arm 33 takes four different rotation angles according to four stages with different radiuses of the carriage selection cam 53. Rocking widths of the rocking arm 33 and differences in the cam radiuses of the carriage selection cam 53 in stages of the carriage selection cam 53 are set in such a relation that, each time the follower protrusion 33c moves by one stage in the cams, the interlocking cam 20 rotates 90 degrees.

The cam gear 50 has the circular carriage selection cam 53 that is formed from a plurality of arcs with different radiuses and sloped sections connecting these arcs. The carriage selection cam 53 changes its cam radius as it rotates, and changes the distance from its center to the pivot 33a of the follower protrusion 33c that is guided, to thereby rock the rocking arm 33.

Also, the recessed sections 26 are provided on the side sections of the carriages 1–3, which engage any one of the cams 21–23 of the interlocking cam 20. The recessed section 26 has a size sufficient to store a large diameter section of the cam 21 (or the cam 22 or 23) and is provided with a shape that prevents the engagement between the recessed section 26 and the cam large diameter section from disengaging from one another while storing the cam, when the cam 21 (or 22 or 23) slides with the drawer 28 (for example, a fan like shape or a generally rectangular shape in the present embodiment shown). In association with the rotation of the interlocking cam 20, each of the cams 21–23 is hooked with or unhooked from each of the corresponding recessed sections 26. When they are hooked, the carriage 1, 2 or 3 can be drawn out with the drawer 28.

Furthermore, the side section of the carriages 1–3 is provided with another recessed section 36, as shown in FIG. 32. The recessed section 36 engages a position-retaining device 37 that is provided on the chassis 9 of the CD exchange system. The position-retaining device 37 engages the recessed section 36 with resilience to the extent to which it stops inadvertent sliding movements of the carriages 1–3 but naturally releases the engagement when it slides with the drawer 28, to thereby retain the position of each of the carriages 1–3. The position-retaining device 37 is formed from, for example, a hook 37a and a force application device 37b that forces the hook 37a to the side of the carriages 1–3.

It is noted that the selector system 5 of the present embodiment described so far is one example of preferred embodiments of the present invention, and is not limited to the CD exchange system described above. Many modifications can be made within a range that does not depart from the subject matter of the present invention. For example, when the cams 21–23 are directly engaged with the recessed sections 26 of the carriages 1–3 just as does the present embodiment, the large diameter section of each of the cams 21–23 functions as an engaging member. However, in other embodiments, the cams 21–23 may be indirectly engaged with the recessed sections 26 through another independent member. The embodiments will be described below.

Figure 33:
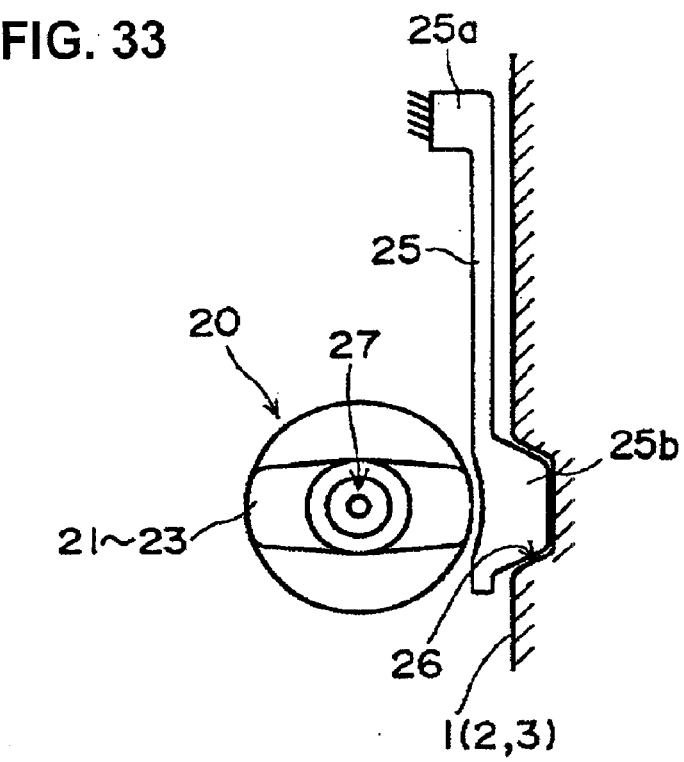
FIG. 33 schematically shows a selector system that couples a cam to a recessed section through a flexible engagement member.
Figure 34:
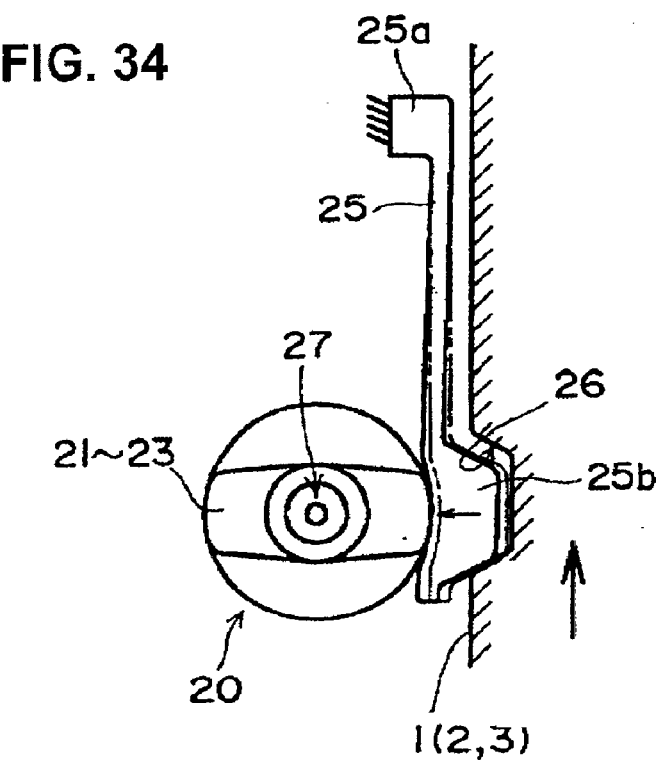
FIG. 34 schematically shows a selector system that couples a cam to a recessed section through a flexible engagement member.

For example, in an embodiment shown in FIG. 33, a flexible engaging member 25 is provided between the cams 21–23 and the recessed sections 26. The engaging member 25 has a base end 25a that is affixed on the drawer 28 and an end portion 25b extending toward the other end thereof that can be bent by its flexibility. In this case, the end portion 25b may be formed to have a shape that matches the shape of the recessed section 26. As a result, play of the carriages 1–3 with respect to the drawer 28 can be reduced: and even when a force in the sliding direction is applied on the carriage 1 (or 2 or 3) as shown in FIG. 34, the recessed section 26 does not directly rotate the cam 21 (or 2 or 3) such that excessive loads that may act on the interlocking cam 20 and each of the cams 21 through 23 can be alleviated.

Figure 35:
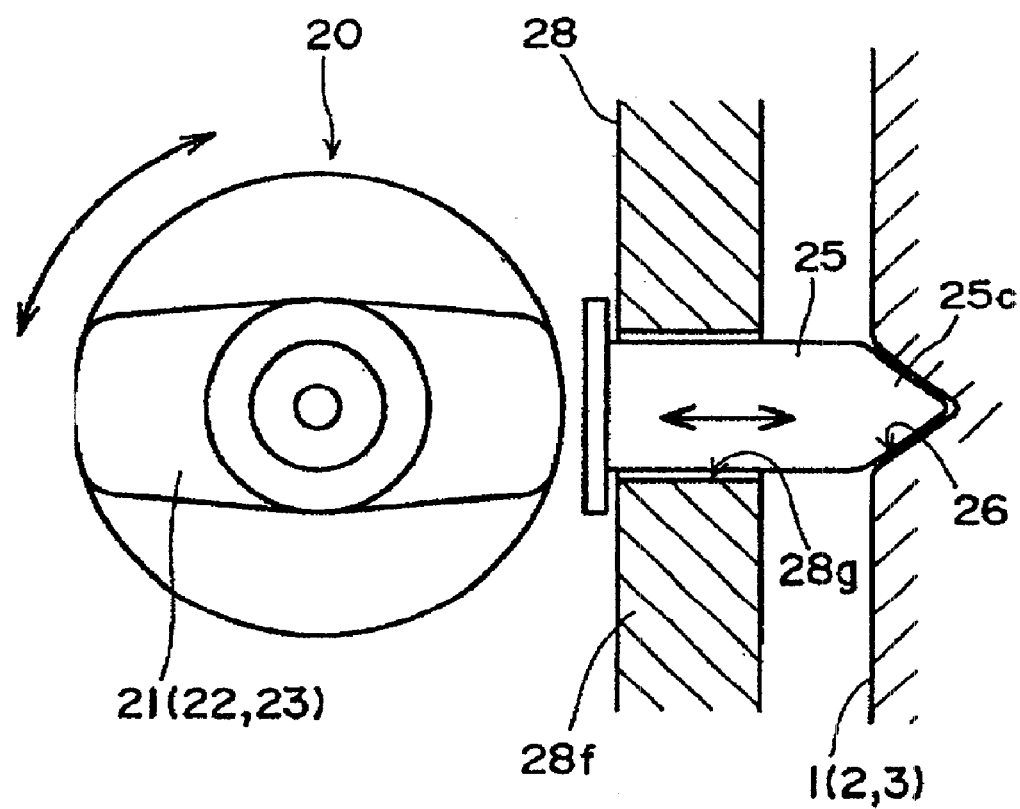
FIG. 35 schematically shows a selector system that couples a cam to a recessed section through a slidable engagement member.

Alternatively, an engaging member 25 that is slidable in a manner to approach and separate from the recessed section 26 may be provided. For example, the engaging member 25 shown in FIG. 35 can move in a stroke in an aperture 28a provided in a frame 28f of the drawer 28, and has a pointed end 25c that can be engaged with the recessed section 26. The stroke width of the engaging member 25 changes according to rotation angles of the cam 21 (or 22 or 23). For example, in the embodiment shown in FIG. 35, the stroke width of the engaging member 25 is limited to a minimum value by the large diameter section of the cam 21 (or 22, or 23), and thus the pointed end 25c always engages the recessed section 26.

When implementing the selector system 5 of the present invention in concrete embodiments, many variations in components including cam configurations may be considered. Such embodiments will be described below.

Next, the retaining and returning system 6 for retaining and returning selected positions of the carriages 1–3, which is a third feature of the present embodiment, will be described. The retaining and returning system 6 are shown in FIGS. 36 through 40.

The selected position retaining and returning system 6 is formed from the carriages 1–3, the interlocking cam 20, the recessed section 26, the first gear provided above the rotary shaft 27 of the interlocking cam 20, the :4 rocking arm 33, the cam gear 50, the first selected position retaining device and the second selected position retaining device 42. The selected position retaining and returning system 6 may operate such that, when the carriage 1 (or 2 or 3) is slid, the rotation angle of the interlocking cam 20 may be mechanically saved for retaining or returning to the original position the selected position of the carriages (or 2 or 3).

The first selected position retaining device is provided to change its positions according to the rotation of the interlocking cam 20. In the present embodiment, the protrusion 41 on the S-arm 30 that contacts the pushing end face 33b of the rocking arm 33 to transfer the rotation thereof is also used as the first selected position retaining device (hereafter this may also be referred to as the "first selected position retaining device 41"). In this case, since the first gear 31, the second gear 32 and the S-arm 30 rotate according to the amount of rotation of the interlocking cam 20, when the interlocking cam 20 assumes one of the rotation angles, i.e., 0 degree, 90 degrees, 180 degrees and 270 degrees, the first selected position retaining device 41 shifts to one of four positions that are in one-to-one correspondence to the rotation angles.

Figure 37:
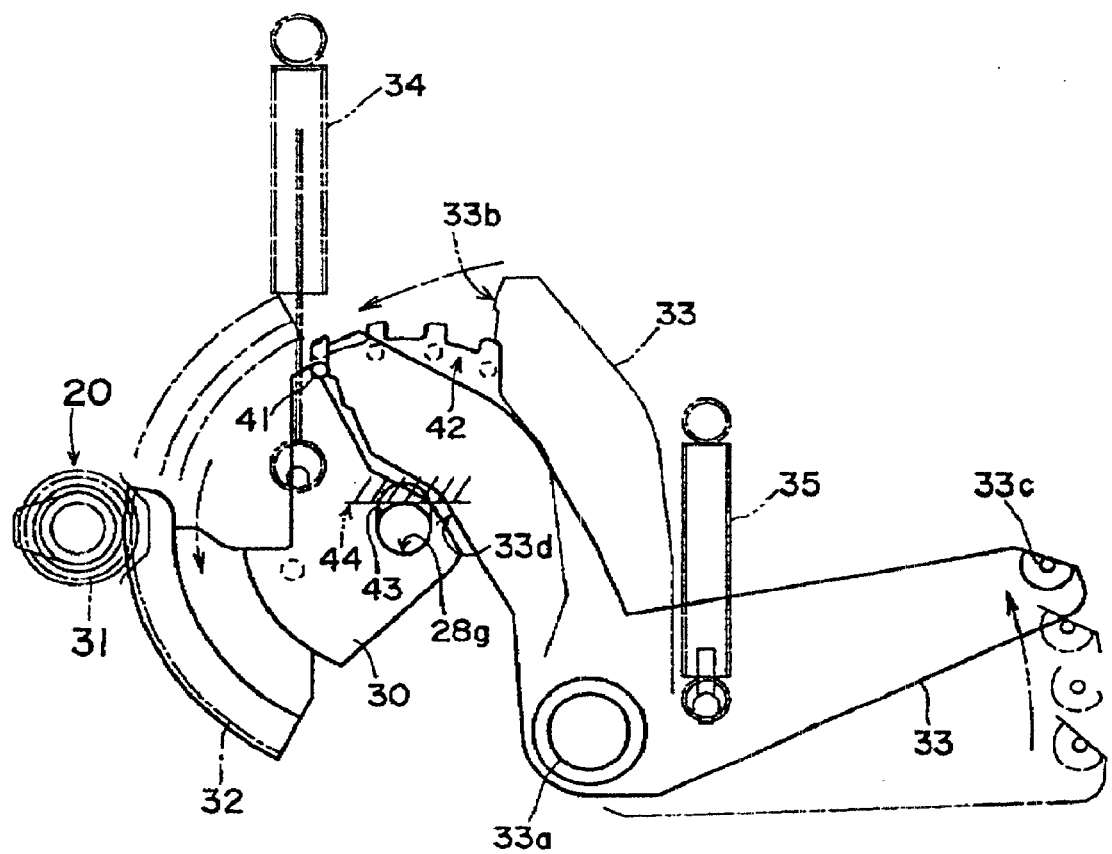
FIG. 37 is an enlarged plan view of a structure of the selected position retaining and returning system for carriages.

The pushing end face 33b of the rocking arm 33, which pushes the first selected position retaining device 41, may preferably have a stepped configuration that can generally vertically push the first selected position retaining device 41, as shown in FIGS. 36 and 37. Also, an edge of the rocking arm 33 extending from the pushing end face 33b to the pivot 33a defines an outer sloped end face 33d.

When an open/close operation of the selected one of the carriages 1–3 is performed, the second selected position retaining device 42 engages the first selected position retaining device 41 to restrict rotations of the S-arm and the interlocking cam 20 to retain the position of the selected one of the carriages 1–3. Also, the second selected position retaining device 42 returns the first selected position retaining device 41 to an original position in the pre-open/close operation state. In the present embodiment, as shown in FIGS. 30 and 37, a retaining section, which is composed of four grooves that engage or disengage the first selected position retaining device 41, is provided in the bottom plate 28a of the drawer 28 to define the second selected position retaining device 42.

Here, the first selected position retaining device 41 and the second selected position retaining device 42 release its restriction so as not to prevent free rotations of the S-arm 30, the second gear 32, the first gear 31 and the interlocking cam 20 while the carriage 1–3 is open (in other words, while the carriage is in the neutral position), and functions to securely stop rotations of the S-arm 30, the second gear 32, the first gear 31 and the interlocking cam 20 when the carriage 1–3 is in an open/close operation. In the present embodiment, the following structure is provided to secure the functions of the first selected position retaining device 41 and the second selected position retaining device 42.

As shown in FIG. 37, the rotation center of the S-arm 30 is formed with a pin 43, and a long-hole 28g, which extends in the direction of open/close operations and engages the pin 43, is provided in the frame 28f of the drawer 28. Accordingly, the S-arm 30 can move in a stroke in the direction of open/close operations within a range of the long-hole 28g. Furthermore, a stopper 44, which can abut against the pin 43, is provided on the chassis 9 of the CD exchange system.

Next, operations that take place when the carriage 1 is selected to eject only the carriage 1 are described. First, referring to FIG. 36, the cam gear 50 is rotated to a position where the cam radius becomes the minimum, to rock the rocking arm 33 counterclockwise by the force applied by the force application device 35, as shown in FIG. 37. At this moment, the pushing end face 33b of the rocking arm 33 pushes the first selected position retaining device 41 on the S-arm 30 to rotate the S-arm 30 counterclockwise. As a result, the second gear 32 rotates the first gear 31 and the interlocking cam 20 by a predetermined amount such that the cam 21 engages the recessed section 26 of the carriage 1.

Figure 38:
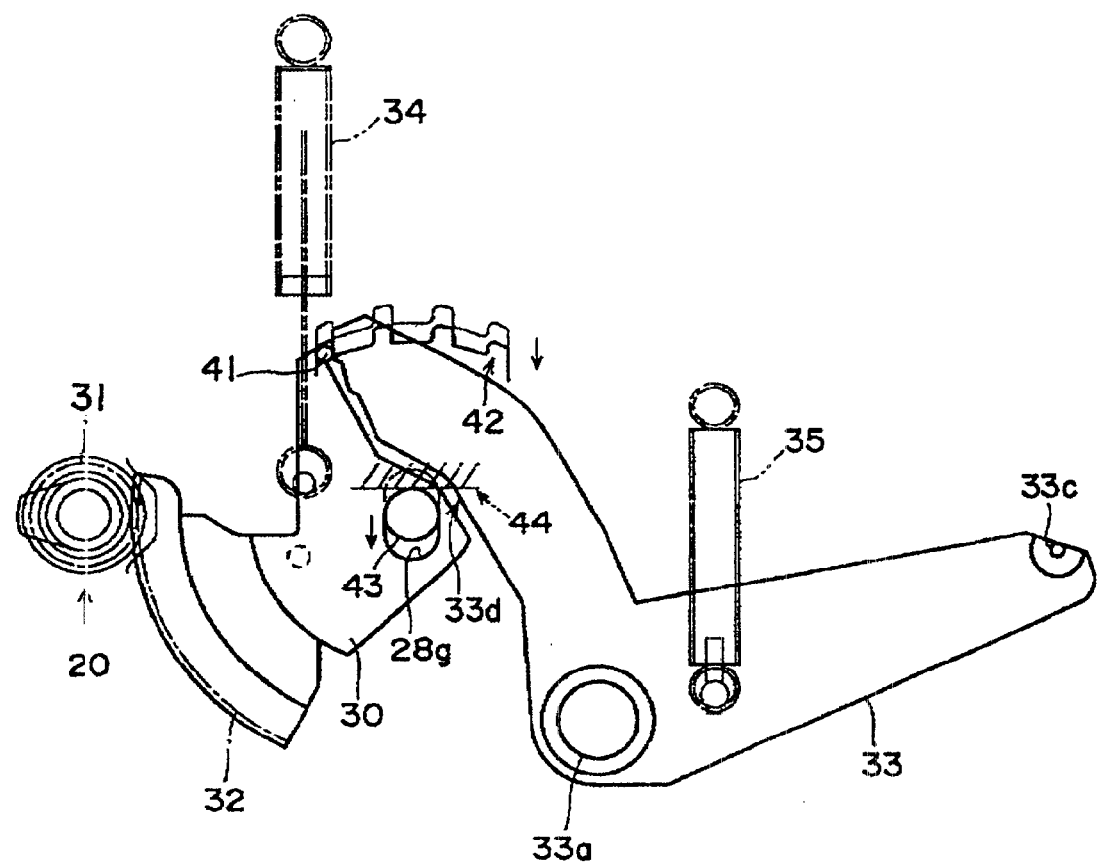
FIG. 38 is a plan view of the selected position retaining and returning system when first and second selected position retaining devices engage one another.

Next, in this state, the carriage 1 is drawn out with the drawer 28 to achieve an ejection operation. At this moment, the second selected position retaining device 42 and the long-hole 28g provided on the drawer 28 move as indicated in FIG. 38. However, the S-arm 30 does not initially move because it is pulled by the force application device 34. As a result, the first selected position retaining device 41 on the S-arm 30 does not initially move either. Accordingly, as shown in FIG. 38, the groove of the second selected position retaining device 42 engages the first selected position retaining device 41 such that the S-arm cannot rotate. By this, the rotation angles of the S-arm and the interlocking cam 20 are mechanically saved.

Figure 39:
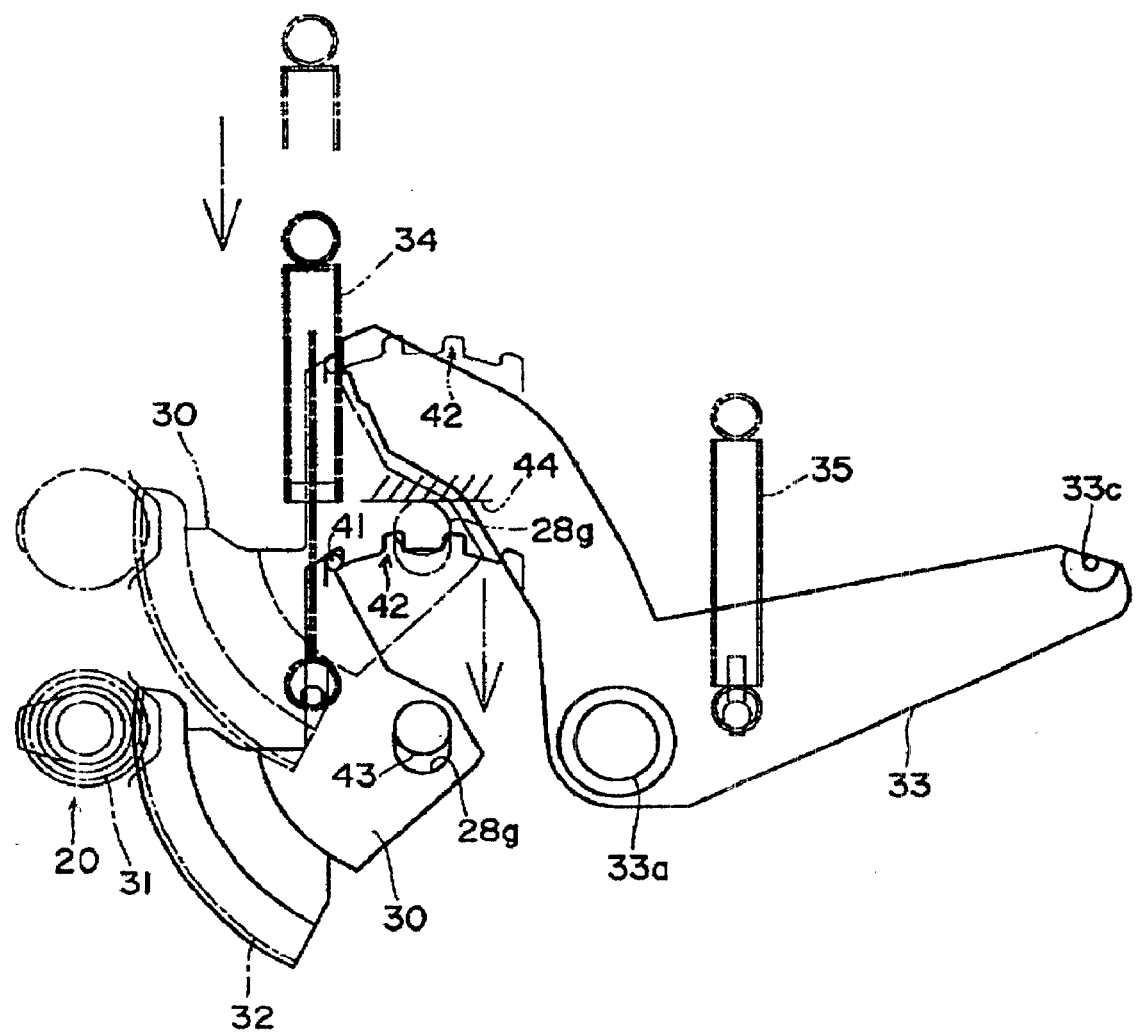
FIG. 39 is a plan view of the selected position retaining and returning device when the drawer and a carriage slide.
Figure 40:
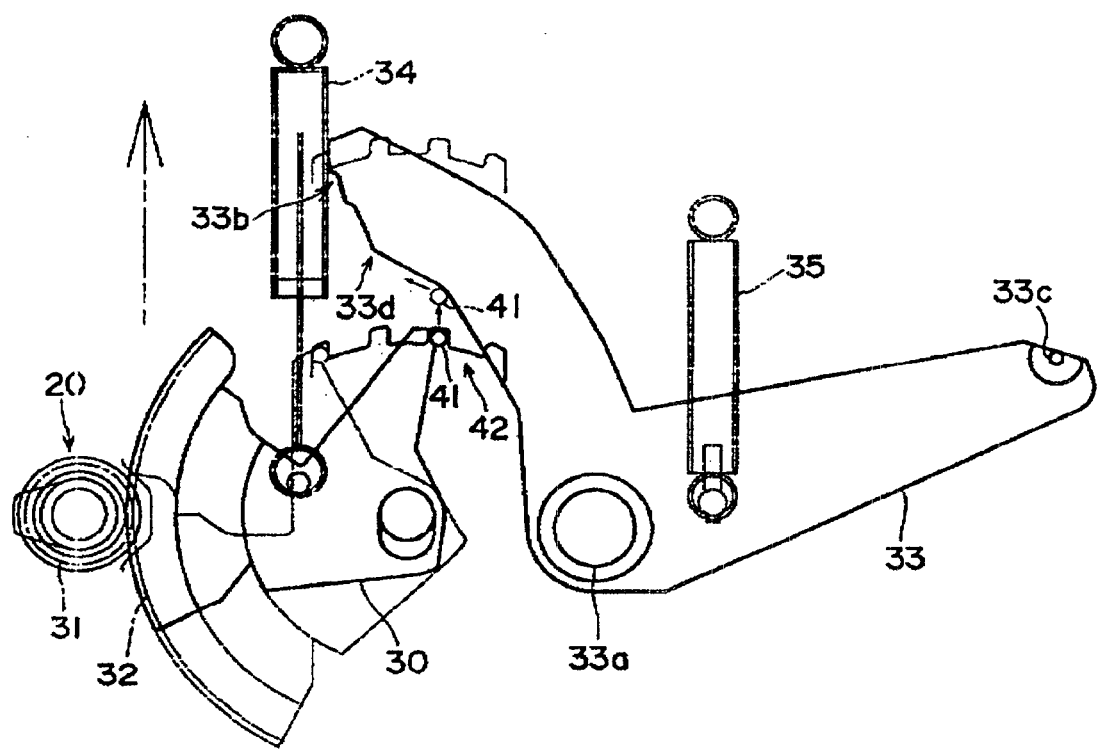
FIG. 40 is a plan view for explaining operations of the selected position retaining and returning device when an engagement position between the first and second selected position retaining devices is inadvertently shifted by an external force.

Then, the drawer 28 and the carriage 1 are slid. This time, the long-hole 28g hooks the pin 43, and the S-arm 30 is moved together, as shown in FIG. 39. At this moment, as shown in FIG. 24, the first gear 31, the interlocking cam 20, the force application device 34, as well as the second selected position retaining device 42 slide. As a result, the engagement between the first selected position retaining device 41 and the second selected position retaining device 42 is maintained during an open/close operation.

When the position of engagement between the first selected position retaining device 41 and the second selected position retaining device 42 is inadvertently shifted by an external force or the like during an open/close operation, the carriage 1 may be returned to the neutral position, such that the first selected position retaining device 41 moves along the outer sloped end face 33d of the rocking arm 33 and returns to the original position to regain the original engagement state.

Positions of the second gear 32 and the rocking arm 33 are briefly shown in FIG. 1 by dot-and-dash lines, which can assume four stages. For example, the rocking arm 33 when rotated to the utmost counterclockwise position assumes a position at which the carriage 1 is selected. As the rocking arm 33 rotates clockwise, it assumes successively in stages a position at which the carriage, 2 is selected, a position at which the carriage 3 is selected, and a position at which the entire carriages 1–3 are selected.

It is noted that, in the present embodiment, three carriages 1–3 are provided. However, the carriage selected position retaining and returning system 6 of the present invention is applicable to any cases where there are at least two carriages stacked in layers, which can be opened or closed independently only when one of them is selected.

Next, the cam structure 7, which is a fourth feature of the present embodiment, will be described. The cam structure 7 is shown in FIG. 1 and FIGS. 41 through 47.

The cam structure is equipped with a first cam 51 that displaces a first follower section 56 shown in FIG. 1 in a radial direction, and a second cam 52 that shifts in an axial direction a second follower section 57 that rotates together with the first cam 1 and has at least three support pins 58. The first cam 51 is formed from divided segments defining at least three arcuate surfaces 59 with different radiuses and sloped connection surfaces 60 that connect the arcuate surfaces and are provided in ranges that give appropriate pressure angles with respect to the first follower section 56. The second cam 52 is provided with cam sections 61, 62, 63, each of the cam sections 61, 62, 63 being divided in the radial direction into plural segments in a number corresponding to the number of the support pins, wherein the divided cam sections 61, 62, 63 are disposed at positions arranged in a circumferential direction in a manner that displacements in the axial direction of the second follower section 57 are timed with displacements in the radial direction of the first follower section 56.

Also, the first cam 51 is used to perform selection and positioning of one of at least two carriages, and the second cam 52 displaces the second follower section 57 in the axial direction to switch the power transmissions. There is also provided a third cam 53 in a circular configuration with a cam radius thereof changing in stages according to rotation angles. The third cam 53 selects one of the at least two carriages to be shifted. The first cam 51, the second cam 52 and the third cam 53 are integrally formed in one piece. The second cam 52 performs a power transmission switching within a rotation angle range that is continuous with the same radius of a predetermined one of the at least three arcuate surfaces 59 that compose the first cam 51. Also, the power transmission switching by the second cam 52 and the selection of one of the carriages 1–3 are conducted in a rotation angle range in one of the cam sections formed with a plurality of different radiuses.

Furthermore, in addition to the cams described above, the cam structure 7 of the present embodiment is also provided integrally with a fourth cam 54 that operates a rotational position determination switch 79 that determines rotational positions at respective operational positions of the first cam 51, the second cam 52 and the third cam 53, which rotate 360 degrees, within their rotation angles. The fourth cam 54 may be referred to as a "rotational position determination switch operation cam".

Cam structures of the cam gear 50 of the present embodiment which incorporate the cams with the multiple functions into one integral structure are described below. As described above, the cam gear 50 is formed from a rotary body that is equipped with the carriage selection cam 53 and so forth.

The first cam 51 defines grooved cams provided in the cam gear 50 that rotates, and includes at least three arcuate surfaces 59. In the present embodiment, the firs cam 51 is used as a cam that determines stages of the carriages 1–3 (hereafter referred to as the "stage determination cam 51"). As described above, in the present specification, the term "stage" is used to indicate any of the three carriages 1–3 in a play state. For example, when the carriage 1 is placed in a play state (in this case, the other carriage 2 or 3 can be ejected), this carriage is referred to as the first stage.

In the present embodiment, the stage determination cam 51 is formed from a grooved cam provided in one surface (for example, in a lower surface) of the cam gear 50. One end section 56b of the follower section 56 that follows the cam configuration engages the grooved cam of the stage determination cam 51. The first follower section 56 in the present embodiment defines a lift arm (hereafter referred to as the "lift arm 56") that has the one end 56b follow along the grooved cam to achieve a stage determination operation. The lift arm 56 is provided in a manner that can be rocked about a pivot 56a on the chassis 9 as a center, and has another end 56c that moves as indicated in FIG. 1 to select one of the carriages 1–3 that engages the engaging section 12a of the second gear 12.

Also, the stage determination cam 51 is formed from three arcuate surfaces 59-1, 59-2 and 59-3 with different peripheral configurations, in other words, different radiuses, and three sloped connection surfaces 60a, 60b and 60c that connect these three arcuate surfaces 59-1, 59-2 and 59-3. The sloped connection surface 60a connects the arcuate surface 59-1 and the arcuate surface 59-2, the sloped connection surface 60b connects the arcuate surface 59-2 and the arcuate surface 59-3, and the sloped connection surface 60c connects the arcuate surface 59-3 and the arcuate surface 59-1. Among the three arcuate surfaces 59-1, 59-2 and 59-3, the arcuate surface 59-1 has a smallest radius, and the arcuate surface 59-3 has a largest radius. The arcuate surface 59-2 has a radius intermediate between those of the arcuate surfaces 59-1 and the arcuate surface 59-3.

If rotation angles (in the present specification, a center angle of each sloped connection surface or each arcuate surface occupied in 360 degrees is generally called as a rotation angle) of the respective sloped connection surfaces 60a–60c were equal to one another, the slope of the sloped connection surface 60c that connects the arcuate surface 59-3 and the arcuate surface 59-1 would become steeper than those of the other two sloped connection surfaces 60a and 60b.

Therefore, in the present embodiment, the rotation angle of the sloped connection surface 60c is made larger to make its slope gentler. The rotation angle of the sloped connection surface 60c in this case is set in a range in which pressure angles defined between the one end 56b of the lift arm 56 and the sloped connection surface 60c are in an appropriate range to the degree to which the lift arm 56 is smoothly rocked. For example, the rotation angles of the sloped connection surfaces 60a, 60b and 60c may be set such that pressure angles between the one end 56b of the lift arm 56 and the sloped connection surfaces 60a, 60b and 60c are generally equal to one another. The rotation angles of the arcuate surfaces 59-1, 59-2 and 59-3 are represented by θ1, θ2 and θ3, respectively.

Next, the second follower section 57 that is driven by the second cam 52 is a plate cam (hereafter referred to as the "plate cam 57") equipped on its lower surface side with three protruded support pins 58 that are circularly disposed in accordance with the present embodiment. FIG. 45 shows a general configuration of the plate cam 57. The plate cam 57 is equipped with a rotation stopper 64 that prevents the rotation of the plate cam 57, and is therefore capable of elevating up and down without coming off the cam gear 50 or rotating with the rotating cam gear 50 even when the load increases.

The second cam 52 is a cam that rotates with the stage determination cam 51 to displace the plate cam 57 in the axial direction. The second cam 52 is equipped with three cam sections 61, 62 and 63 circularly disposed on the upper surface side of the gear cam 50, and elevates the plate cam 57 up and down through the support pins 58 to thereby switch the rotation transmission (hereafter, the second cam is referred to as the "rotation transmission switching cam 52"). The overall system relating to switching of rotation transmission will be described below as a fifth feature of the CD exchange system (as the rotation transmission switching system 8).

Figure 46:
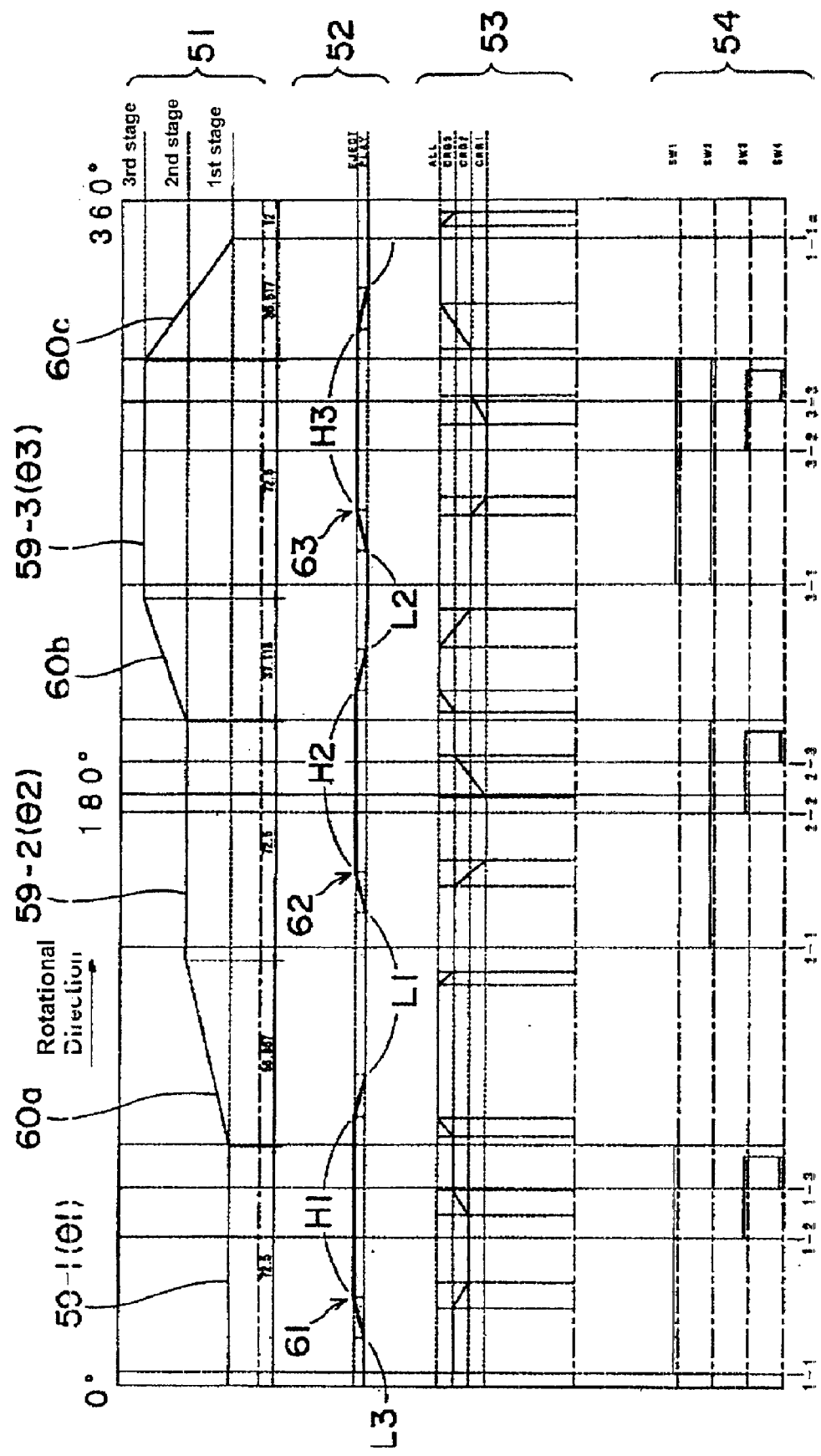
FIG. 46 is a cam diagram for the first-fourth cams.
Figure 47:
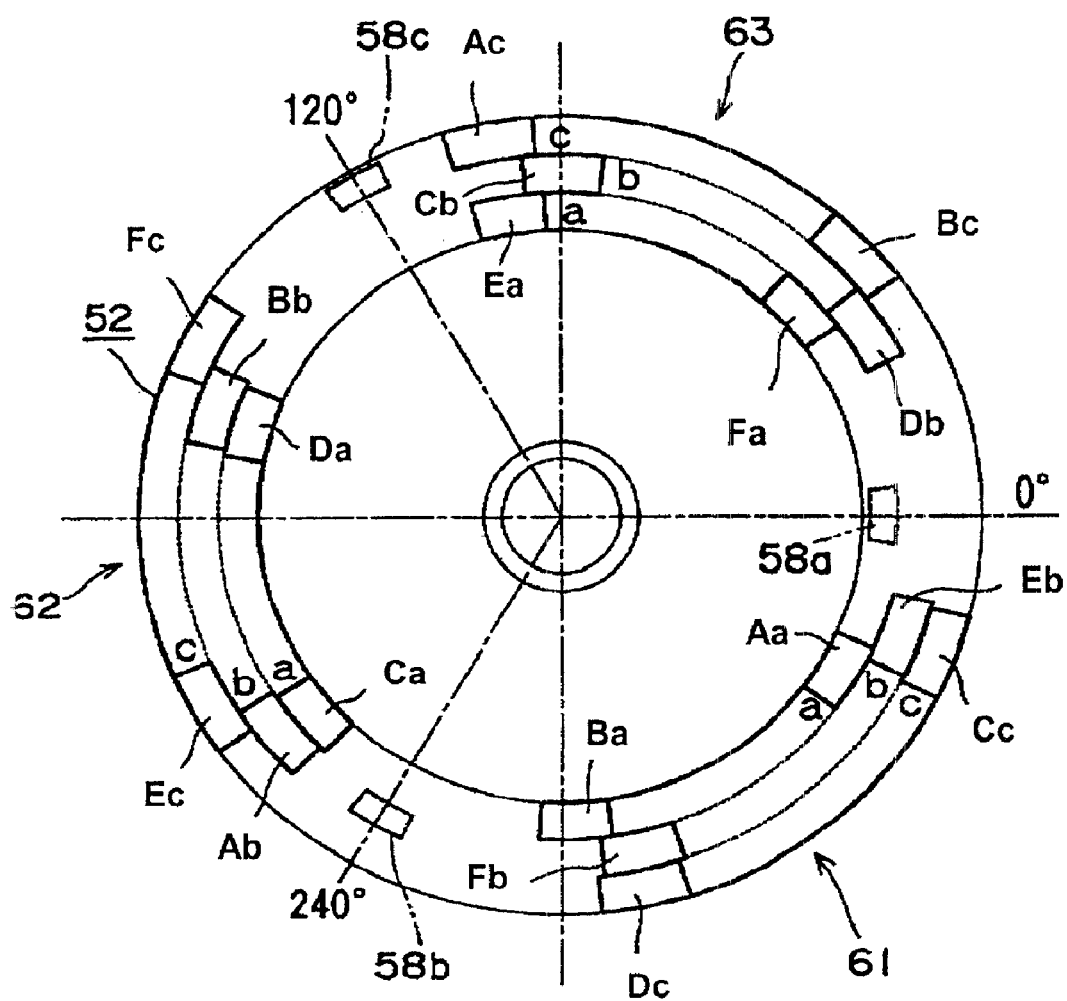
FIG. 47 schematically shows an example of a structure of the rotation transmission switching cam (second cam).

Each of the cam sections 61–63 of the rotation transmission switching cam 52 is formed from plane sections and sloped sections, as shown in thick lines in FIGS. 46 and 47, and elevates the plate cam (second follower section) 57 up and down between an upper position and a lower position as the cam gear 50 rotates. The cam sections 61–63 of the rotation transmission switching cam 52 may be coaxially provided about the rotational axis of the rotation transmission switching cam 52. Also, each of the cam sections 61–63 is divided in the radial direction into segments in the number corresponding to the number of the support pins 58 provided on the plate cam 57. In the present embodiment in which three support pins 58 are provided, each of the cam sections 61–62 is divided in the radial direction into three (outer, intermediate and inner) segments. For example, in FIG. 47, the cam section 61 is divided into an inner segment 61a, an intermediate segment 61b and an outer segment 61c. Also, the cam section 62 (63) is similarly divided into an inner segment 62a (63a), an intermediate segment 62b (63b) and an outer segment 62c (63c). The three inner segments 61a, 62a and 63a may be located on the same radius, the three intermediate segments 61b, 62b and 63b may be located on the same radius, and the three outer segments 61c, 62c and 63c may be located on the same radius.

Figure 45A:
FIGS. 45(A), 45(B), 45(C) and 45(D) are a left-side view, a plan view, a right-side view and a front view of a structure of a plate cam (second follower section), respectively.
Figure 45B:
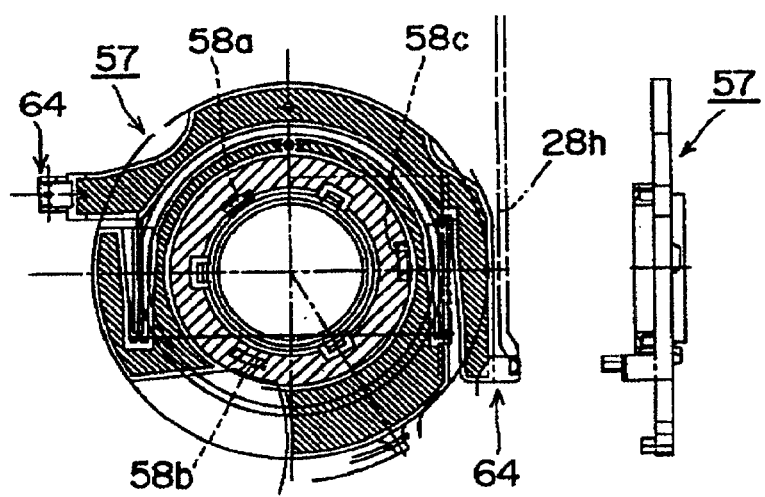
Figure 45C:
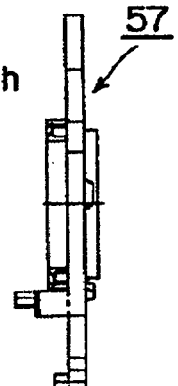
Figure 45D:
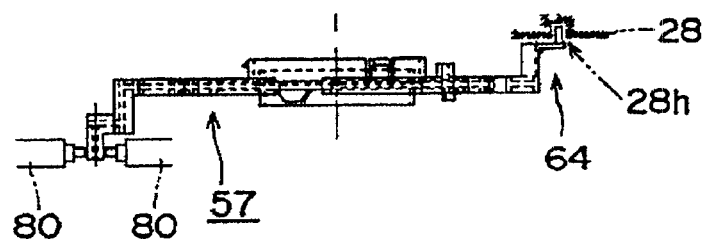

Also, radiuses of the respective three support pins 58 of the plate cam 57 are made different from one another according to the divided segments. More specifically, as shown in FIG. 45(B), the support pin 58a is provided at a radius equal to that of the inner segment 61a (62a, 63a), the support pin 58b is provided at a radius equal to that of the intermediate segment 61b (62b, 63b), and the support pin 58c is provided at a radius equal to that of the outer segment 61c (62c, 63c). Also, the three support pins 58a–58c are equally spaced at 120-degree circumferential angle positions.

Each of the segments of the cam sections 61–63 is disposed in a specified position in the circumferential direction such that the plate cam 57 is displaced in the axial direction at a proper timing at which the lift arm 56 shifts in the radial direction. To dispose the segments in view of the proper timings, the segments may be shifted from one another in the circumferential direction, and also the length of each of the segments in the circumferential direction and the slope of the sloped section may be changed from one another. As a result, the positions in the circumferential direction of the sloped connection surfaces 60a, 60b and 60c of the stage determination cam 51 coincide with the locations in the circumferential direction of the sloped sections of the segments, such that the lift arm 56 and the plate cam 57 operate at the same timings. One preferred embodiment of the disposition arrangement is described below.

For the sake of convenience, in the rotation transmission switching cam 52 shown in FIG. 47, ascending slope sections and descending slope sections of the inner segments 61a–63a are referred to in clockwise as A, B, C, D, E and F, and let us call them, successively, as Aa, Ba, Ca, Da, Ea and Fa. The intermediate segments 61b–63b and the outer segments 61c–63c may also be called in a similar manner, as Ab–Fb, and Ac–Fc, respectively. It is noted that those of the sloped sections that are brought in contact with the three support pins 58a–58c at the same time are indicated with the same letters among A–F. For this reason, for example, Aa, Ab and Ac are located on different ones of the cam sections (61–63).

Circumferential angular positions of the slope sections A, B, C, D, E and F are different from one another, and shifted in the circumferential direction from one another. However, the slope sections Aa, Ab and Ac, which are brought in contact with the three support pins 58a–58c at the same time, are disposed such that their circumferential angular positions are equally spaced from one another (in other words, at intervals of 120 degrees). As a result, when the cam gear 50 is rotated, the support pins 58a, 58b and 58c of the plate cam 57 abut against the slope sections Aa, Ab and Ac at the same time, respectively, to raise the plate cam 57. Accordingly, when the plate cam 57 is elevated, a twisting force is difficult to occur against the center shaft.

Similarly, the circumferential angular positions of Ba, Bb and Bc are equally spaced. The circumferential angular positions of Ca, Cb and Cc are equally spaced. The circumferential angular positions of Da, Db and Dc are equally spaced. The circumferential angular positions of Ea, Eb and Ec are equally spaced. Also, the circumferential angular positions of Fa, Fb and Fc are equally spaced. Also, the support pin 58a rotates along the corresponding slope sections Aa, Ba, Ca, Da, Ea and Fa, and elevates up and down with the rotation. The support pins 58b and 58c similarly operate. Then, when the cam gear 50 rotates one full turn, the plate cam 57 ascends and descends each three times without being twisted.

An example of cam configurations of the stage determination cam 51 and the rotation transmission switching cam 52 thus configured is further described by using a cam diagram shown in FIG. 46.

In the present embodiment, the rotation angles θ1, θ2 and θ3 of the respective arcuate surfaces 59-1, 59-2 and 59-3 of the stage determination cam 51 are mutually equal (θ1=θ2=θ3). Also, the circumferential angular widths of the respective plane surfaces (indicated as H1, H2 and H3, respectively) between the slope sections A and B, between C and D and between E and F in the cam sections 61–63 of the rotation transmission switching cam 52 are mutually equal (H1=H2=H3). In contrast, the circumferential angular widths of the sloped connection surfaces 60a, 60b and 60c of the stage determination cam 51 have different values. Similarly, the circumferential angular widths of the bottom sections (indicated as L1, L2 and L3, respectively) among the cam sections 61–63 in the rotation transmission switching cam 52 may be different from one another.

The support pins 58a–58c of the plate cam 57 are provided at equal intervals of 120 degrees, the slope sections of the cam sections 61–63 of the rotation transmission switching cam 52, which simultaneously come in contact with the support pins 58a–58c, are provided at equal intervals of 120 degrees, the slope sections in each of the cam sections are divided in the radial direction into three segments, and shifted from one another, to obtain appropriate timings. It is noted that, although FIG. 46 shows specific numerical values of the rotation angles θ1, θ2 and θ3 of the arcuate surfaces 59-1, 59-2 and 59-3 and the rotation angles of the sloped connection surfaces 60a, 60b and 60c, these values are shown as a preferred example, and the present invention is not limited to these values.

The cam structure of the stage determination cam 51 and the rotation transmission switching cam 52 provided in the cam gear 50 has been described so far. In the present embodiment, in addition to these cams 51 and 52, the third cam 53 and the fourth cam 54 are further integrally provided in one piece with the cams 51 and 52. The third cam 53 and the fourth cam 54 are described below.

Figure 44A:
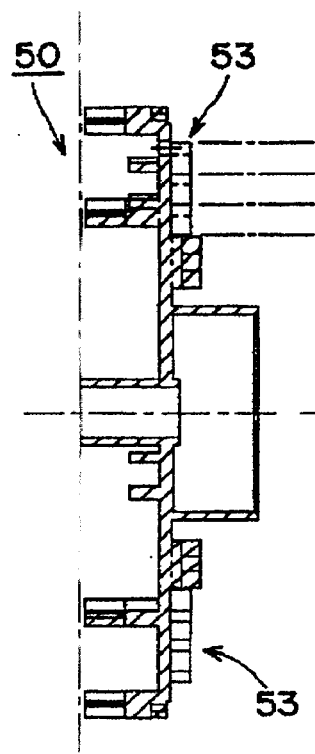
FIGS. 44(A) and 44(B) are an entire cross-sectional view and a plan view of a structure of the cam gear and a carriage selection cam (third cam).
Figure 44B:
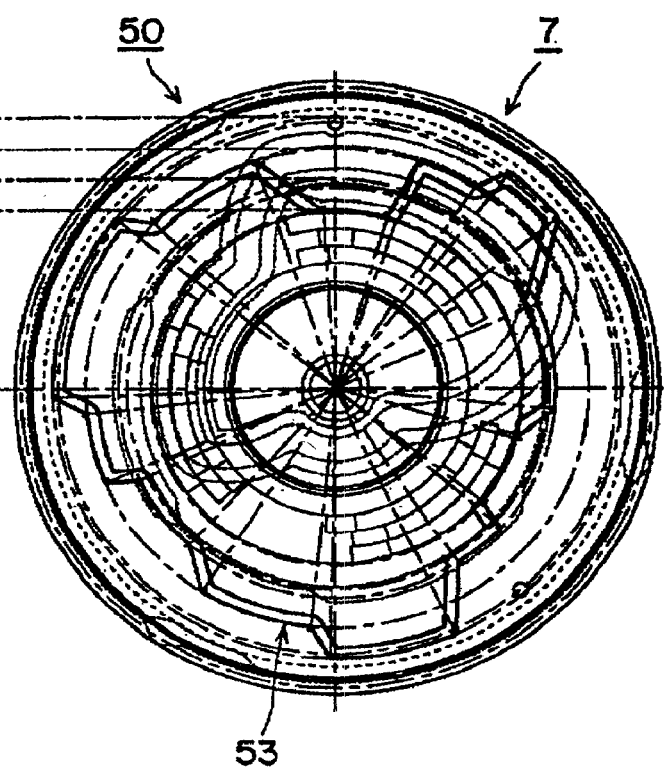

The third cam 53 is a cam that selects a carriage to be shifted among the three carriages 1–3. In the CD exchange system in the present embodiment, the carriage selection cam 53 in the selector system 5 described above corresponds to the third cam. Accordingly, in the present embodiment, components of the third cam and the carriage selection cam are indicated by the same reference numbers. FIG. 44 shows a general configuration of the carriage selection cam 53.

It is understood from FIG. 46 that, when the gear cam 50 is rotated in normal or reverse direction by an appropriate amount within the range of the circumferential angular width θ1 of the arcuate surface 59-1, the rotation transmission can be switched by the rotation transmission switching cam 52, and the carriage selection can be performed by the carriage selection cam 53 while the determined stage is maintained in the first stage state. Similar operations can be achieved by the arcuate surfaces 59-2 and 59-3, in which the rotation transmission can be switched and the carriage selection can be performed while the second stage state or the third stage state is maintained. In other words, within a range of the rotation angle that is continuous with the same radius of any of the arcuate surfaces 59 that form the stage determination cam 51, the rotation transmission switching cam 52 performs switching of power transmission; and the switching of power transmission by the rotation transmission switching cam 52 and the selection of the carriages 1–3 can be performed within each of the ranges of rotation angles of the cam sections 61–63 with a plurality of different radiuses.

Figure 42A:
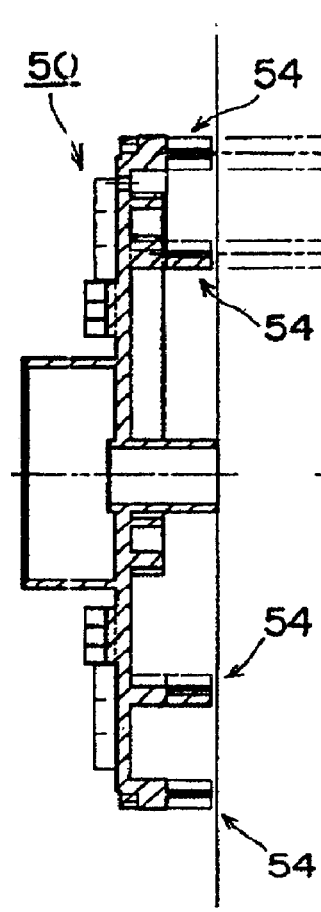
FIGS. 42(A) and 42(B) are an entire cross-sectional view and a bottom view of a structure of the cam gear and an operation cam (fourth cam) for a rotational position determination switch, respectively.
Figure 42B:
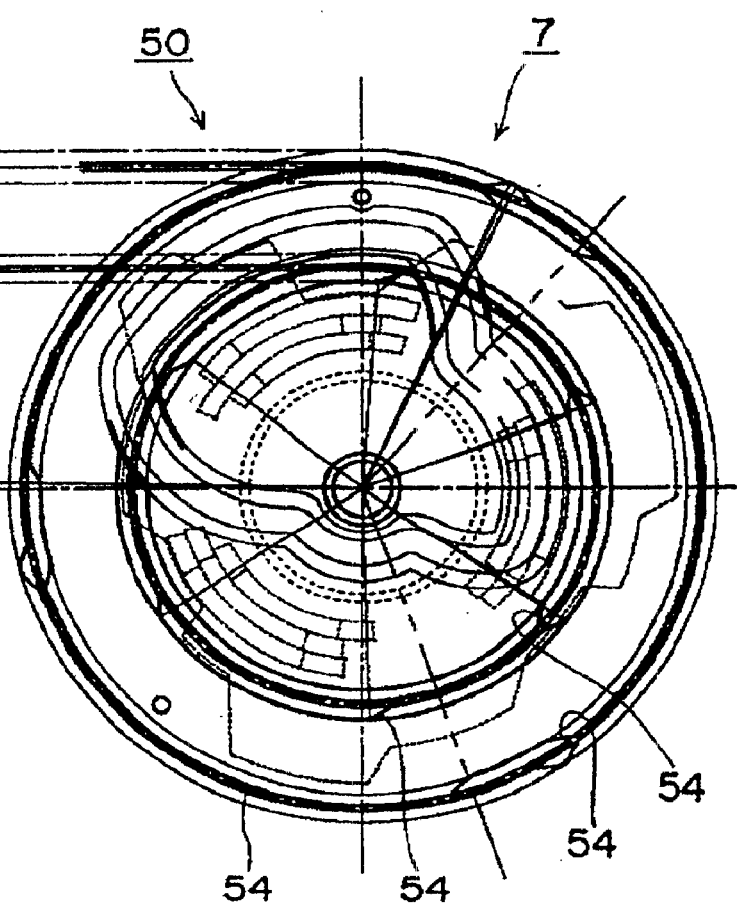
Figure 43A:
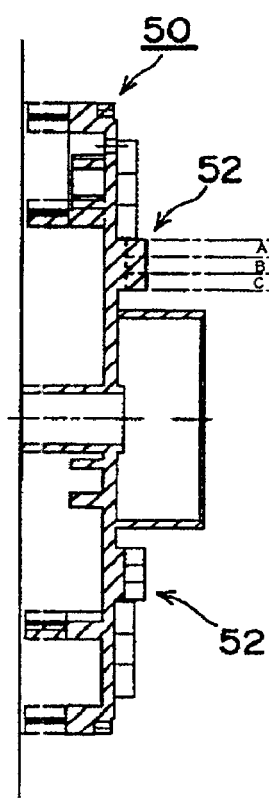
FIGS. 43(A), 43(B) and 43(C) are an entire cross-sectional view and a plan view of the cam gear and a rotation transmission switching cam (second cam), and a cam diagram, respectively.
Figure 43B:
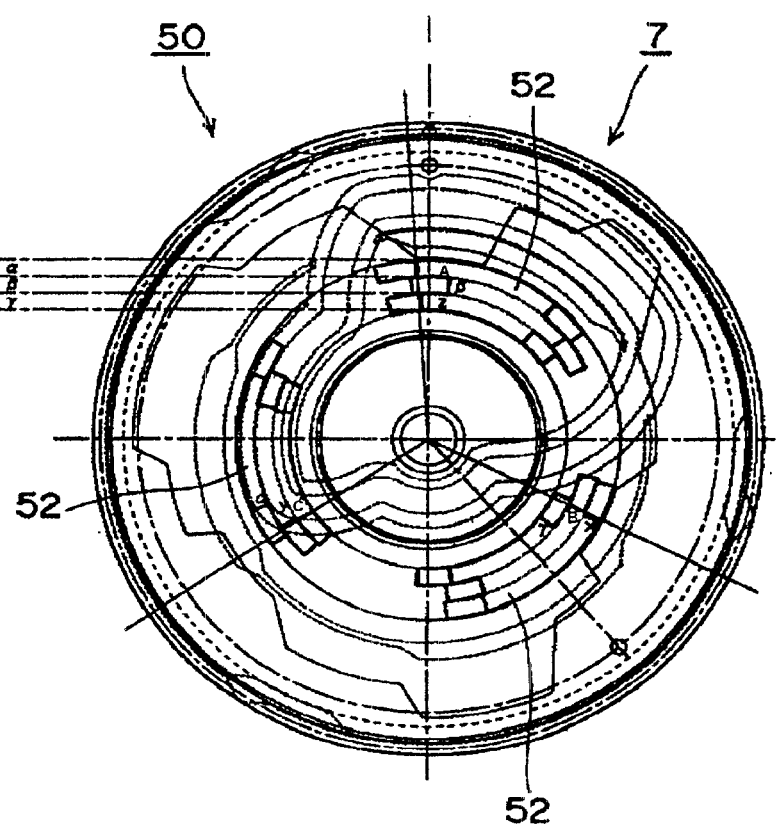
Figure 43C:
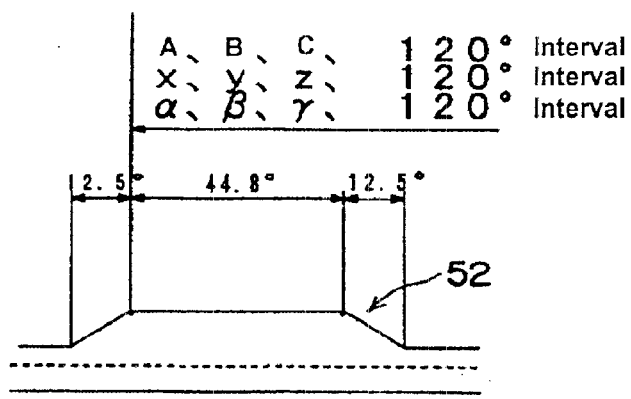

The fourth cam 54 is a cam that functions as an operation cam for the rotational position determination switch 79 that determines operation positions of the cam sections to be integrally rotated within their rotation angles, which rotate 360 degrees, and turns the rotational position determination switch 79 on and off. The fourth cam 54 includes circumferentially provided cams on the lower surface side of the cam gear 50 adjacent to the outer periphery of the cam gear 50 and in an intermediate area in the radius thereof, as shown in FIG. 42, and turns the rotational position determination switch 79 on and off according to rotational amounts of the cam gear 50.

Figure 3:
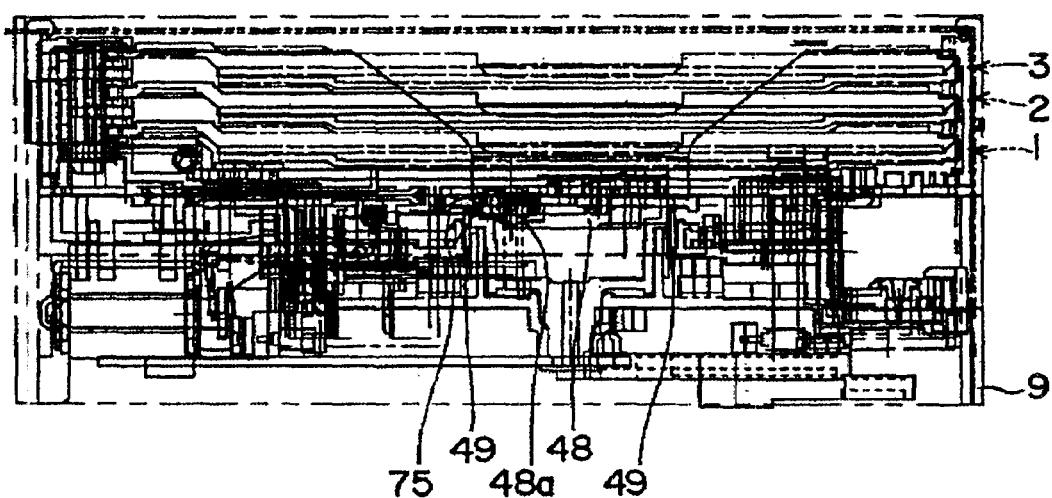
FIG. 3 is a plan view of the disk exchange system shown in FIG. 2.

Furthermore, in the present embodiment, a fifth cam 55 may be provided on the cam gear 50 to prohibit shifts of the drawer 28 in a stop state to thereby prevent its fall and impacts. In the case of the present embodiment, as shown in FIG. 3, a drawer stopper 48 is provided immediately below the carriages 1–3 in the center of the neutral position, and the cam gear 50 rocks up and down the drawer stopper 48 to prevent the drawer 28 from shifting. The drawer stopper 48 is forced downwardly by a force application device 49, and is capable of rocking about a pivot 48*a* of the chassis 9 and engaging the lower section of the drawer 28. In the present embodiment, the operation transfer device 75 shown in FIGS. 48 and 49 that moves up and down between an upper position and a lower position is also used to function as the fifth cam 55.

Next, the rotation transmission switching system 8, which is a fifth feature of the present embodiment, will be described. FIGS. 48–56 show the rotation transmission switching system 8.

The rotation transmission switching system 8 is a system that switches rotational positions of the rotary gear 70 to engage or disengage the rotary gear 70 with either the first gear 71 or the second gear 72. In the present embodiment, the rotation transmission switching system 8 is equipped with a plunger 73 that shifts the rotary gear 70 in the rotational axial direction, at least two carriages (three carriages in the present embodiment) 1–3 that are capable of an ejection operation or a play operation when selected, an operation switching device 74 that switches the power transmission to a selected one of the ejection operation side and the play operation side, and an operation transmission device 75 that performs the eject operation or the play operation. The rotation transmission switching system 8 couples one of the first gear 71 and the second gear 72 to a driving system (operation switching system) of the operation switching device 74, and couples the other to a driving system (operation transmission system) of the operation transmission device 75

Figure 48:
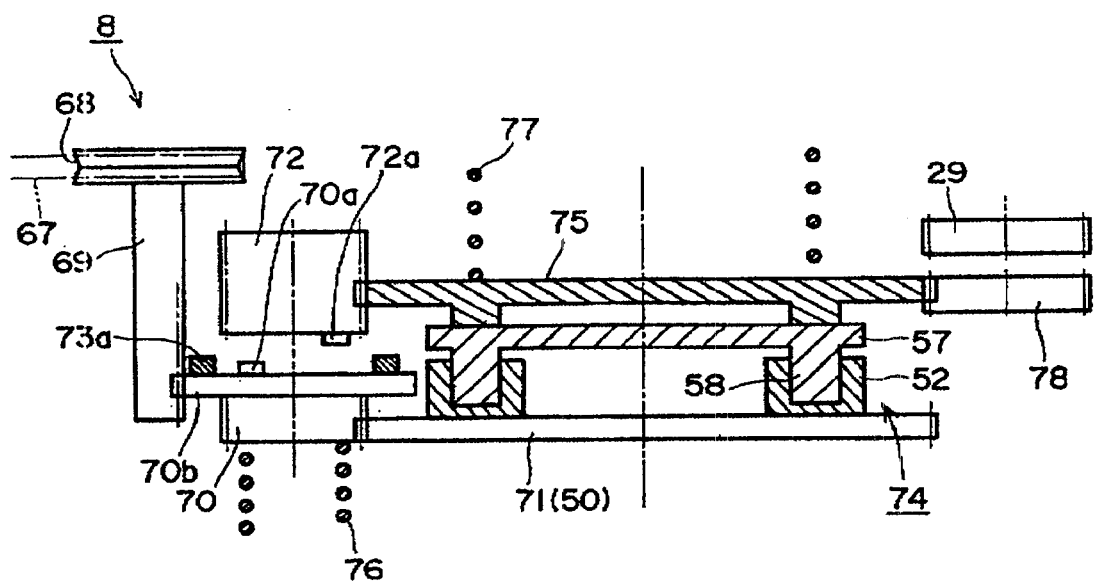
FIG. 48 schematically shows the rotation transmission switching system in a play operation (when the plunger is turned on).
Figure 49:
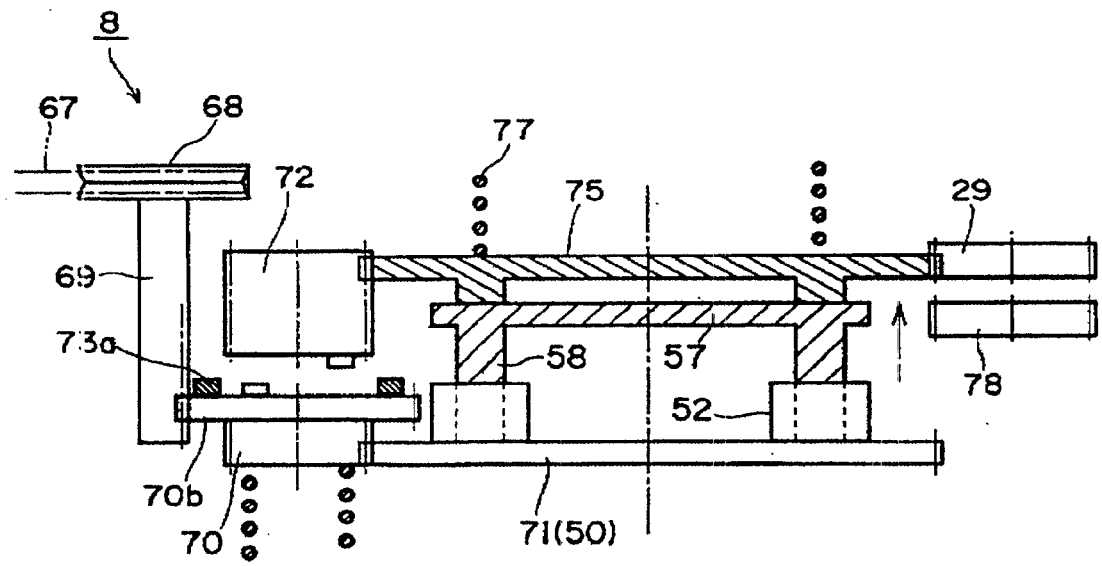
FIG. 49 schematically shows the rotation transmission switching system in an ejection operation (when the plunger is turned on).
Figure 50:
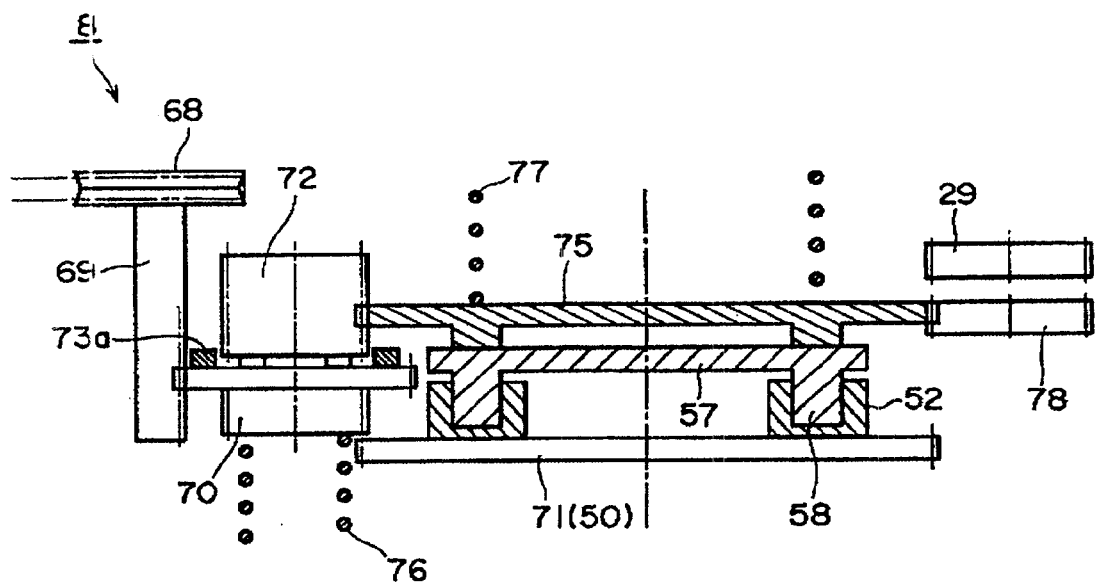
FIG. 50 schematically shows the rotation transmission switching system in a play operation (when the plunger is turned off).

The rotary gear 70 is a gear that is capable of shifting in its rotational axial direction, as shown in FIG. 48, and changes its position in two stages according to movements of the plunger 73. In this case, the position of the rotary gear 70 may be switched solely by the plunger 73. However, in the present embodiment, a force application device 76 such as a coil spring that forces the rotary gear 70 upward is also used to change the position of the rotary gear 70. As shown in FIG. 48, the rotary gear 70 engages the first gear 71 in a lower position, and engages the second gear 72 in an upper position by the engagement protrusions 70*a* and 72*a*, as shown in FIG. 50.

The second gear 72 is a gear that engages the rotary gear 70 in the upper position and coaxially rotates with the rotary gear 70, and is coupled to the operation transmission system to transfer the power to the operation transmission device 75. The second gear 72 is elongated in the axial direction so that it always engages the operation transmission device 75 that is capable of up and down movements. Also, the second gear 72 has on its lower section the engagement protrusion 72*a* that engages the rotary gear 70.

Figure 52:
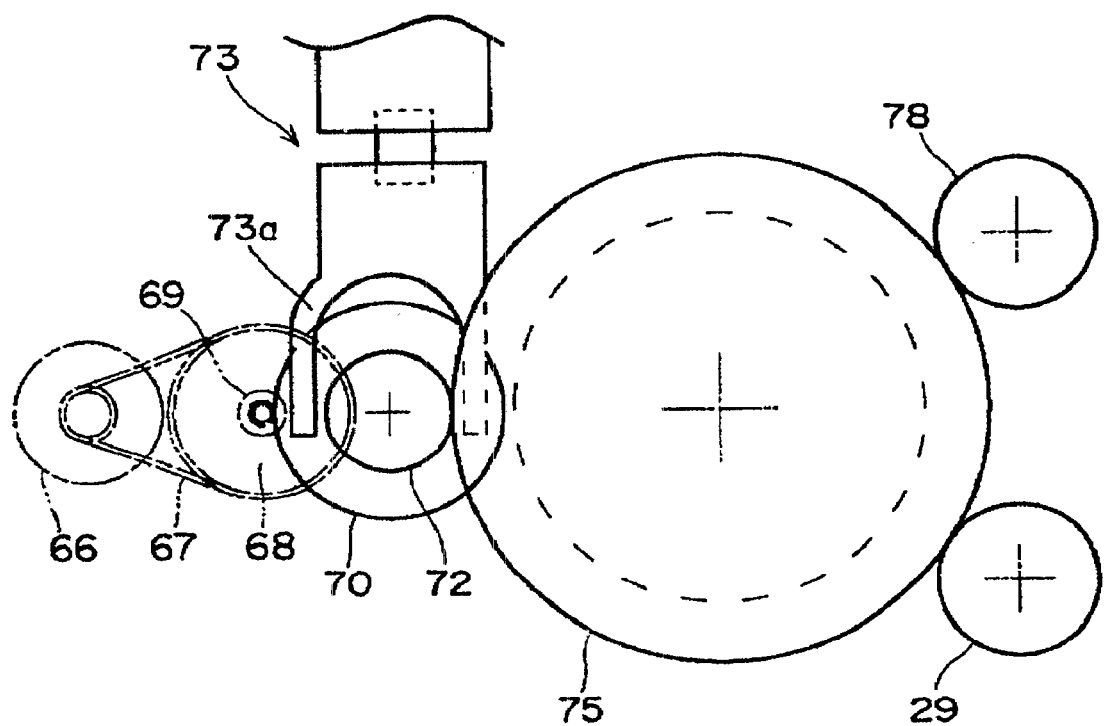
FIG. 52 schematically shows a plan view of the rotation transmission switching system.
Figure 53:
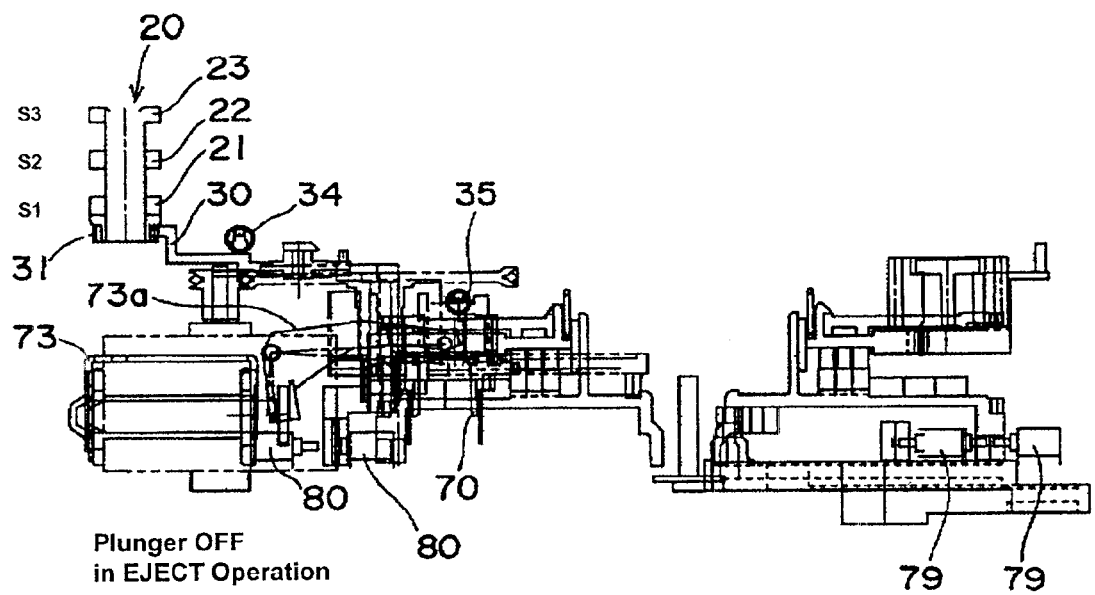
FIG. 53 schematically shows a structure of the rotation transmission switching system in an ejection operation (when the plunger is turned off).
Figure 54:
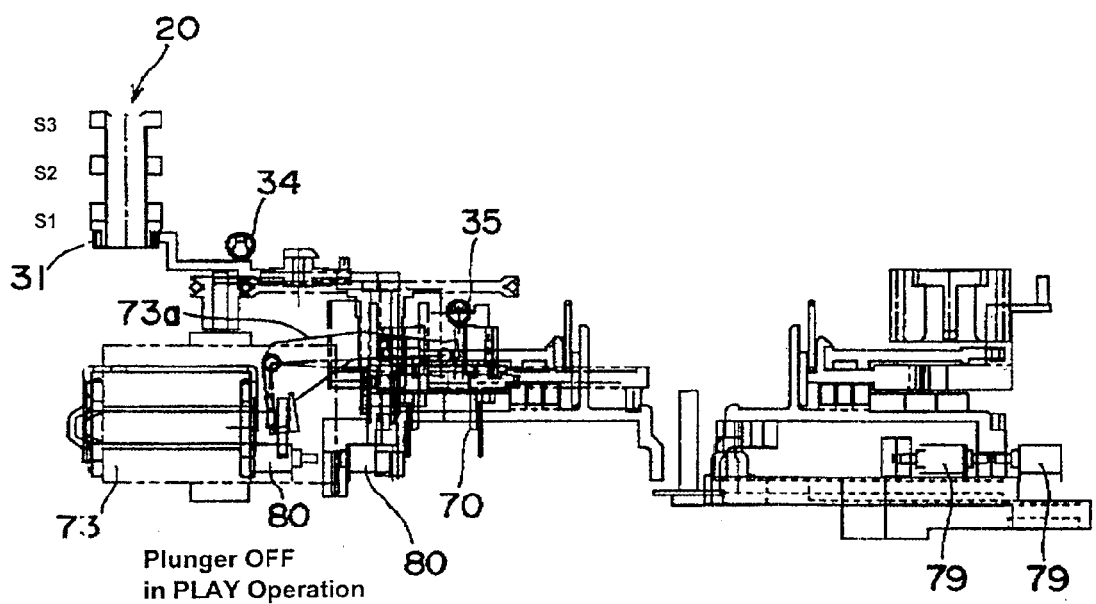
FIG. 54 schematically shows a structure of the rotation transmission switching system in a play operation (when the plunger is turned off).
Figure 55:
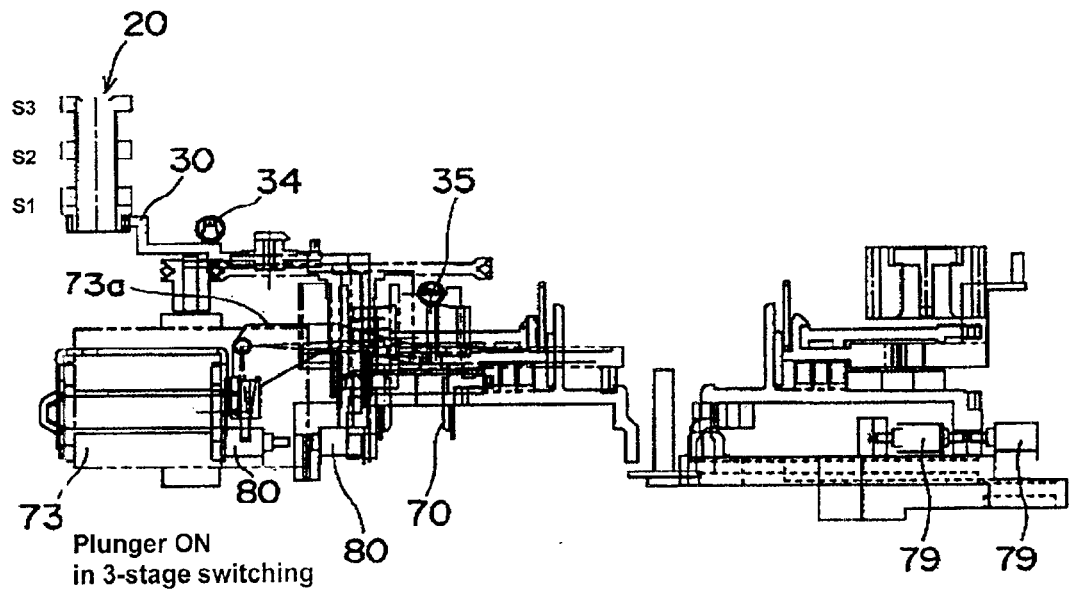
FIG. 55 schematically shows a structure of the rotation transmission switching system in a stage switching operation (when the plunger is turned on).

A driving device 66 that drives the rotary gear 70 is formed from a motor (hereafter referred to as a "motor 66"), as shown in FIG. 52, and its rotational force is transmitted through a belt 67, a pulley 68 and a driving gear 69. The driving gear 69 always engages the rotary gear 70, which changes its positions in two stages, in both of the stages to transfer the power. In the present embodiment, a single motor 66 is provided as a driving power source, and the single driving power source is used to drive both of the operation switching device 74 and the operation transmission device 75.

The plunger 73 is a device that switches the position of the rotary gear 70 in the axial direction between the upper position and the lower position. In the present embodiment, for example, as shown in FIG. 52, a bifurcate lever 73*a* of the plunger 73 is positioned on a flange 70*b* of the rotary gear 70, and the rotary gear 70 is pushed down through the lever 73*a*. As the plunger 73 is placed in a non-operation state, the rotary gear 70 moves to the upper position by the force created by the force application device 76. It is noted that the above is an operation example of switching the position of the rotary gear 70, and the present invention is not limited to this particular embodiment that uses the plunger 73.

The operation switching device 74 is a device that switches the power transmission to the ejection operation side or the play operation side, whichever is selected. In the present embodiment, the operation switching device 74 switches the operation transmission device 75 up or down, and functions to couple the operation transmission device 75 with one of the ejection gear 29 and the play gear 78. The operation switching device 74 of the present embodiment is formed from the cam gear 50, the rotation transmission switching cam 52 and the plate cam 57, wherein, when the cam gear 50 that functions as the first gear 71 and the rotation transmission switching cam 52 on the cam gear 50 rotate by a predetermined amount, the plate cam 57 moves up and down through the support pins 58, whereby the operation transmission device 75 is switched between the upper position and the lower position. The cam gear 50 rotates and also makes a selection among the carriages in the first-third stage.

The operation transmission device 75 is a device that operates the ejection gear 29 or the play gear 78, whichever is selected. In the present embodiment, as shown in FIG. 48, an operational gear that transfers the rotational driving force from the second gear 72 functions as the operation transmission device 75 (hereafter referred to as the "operation transmission gear 75"). Also, as shown in FIG. 48, the operation transmission gear 75 of the present embodiment is coaxially disposed with the first gear 71 (in other words, the cam gear 50) and the plate cam 57. In this case, rotational frictions between the operation transmission gear 75 that rotates and the plate cam 57 that does not rotate can be alleviated by protrusions 75*a* provided on a lower surface of the operation transmission gear 75. Also, the operation transmission gear 75 is forced downwardly by a force application device 77 that is formed from a coil spring or the like.

The ejection gear 29 is a gear that is coupled to a displacement system of the drawer 28 to make the selected carriage 1 (or 2 or 3) perform an ejection operation between the neutral position and the ejection position. On the other hand, the play gear 78 is a gear that makes the carriage 1 (or 2 or 3) whose stage is determined perform a play operation from the neutral position to the play position (or the play position to the neutral position), and engages the racks 39 and 40 of the first slider 11 and the second slider 12.

In the present embodiment, the operation transmission gear 75 rotates in the same rotational direction in both of the ejection operation and the play operation. In other words, the rotational direction of the ejection gear 29 at the time of the ejection operation in which the carriage moves from the neutral position to the ejection position is the same as the rotational direction of the play gear 78 at the time of the play operation in which the carriage moves from the neutral position to the play position. In this case, the motor 66 can be operated in the same rotational direction when the carriage 1 (or 2 or 3) is moved forward and rearward from the neutral position. When the carriage 1 (or 2 or 3) is returned to the neutral position from the play position or from the ejection position, the motor 66 may be rotated in a reverse direction in both of the cases. When the rotational direction of the motor 66 is unified in this manner, the following operation is possible. For example, when the plunger 73 is placed in an off state at the time of a reset operation (in this case, the rotary gear 70 is in the upper position), the carriage 1 (or 2 or 3) can be returned to the neutral position from either the ejection position or the play position by rotating the motor 66 in a reverse direction. At this moment, the rotational transmission path from the single motor 66 has been switched by the plunger 73. It is noted that the "reset operation" generally means to return the system to a state in which the next operation can be immediately conducted, and more particularly, to return the carriage 1 (or 2 or 3) to the neutral position, when it cannot be determined where the carriage 1 (or 2 or 3) is located.

Also, play may be provided in the rotational direction at engaging sections of the first gear 71 and the second gear 72 that engage or disengage the rotary gear 70. In the present embodiment, a detection switch 80 that is capable of detecting shifts of the carriages 1–3 is provided. The detection switch 80 is operated to thereby start a closing operation (i.e., an operation to return the carriage from the ejection position to the play position) of the carriages 1–3 from the ejection position. FIG. 1 shows an example of the disposition of the detection switch 80. In this case, when the carriage 1 (or 2 or 3) is pushed in within the range of the play after the ejection operation, the detection switch 80 detects the movement of the carriage 1. Upon detection of the movement by the detection switch 80, the operation device is rotated in a reverse direction to perform the closing operation for the carriage 1 (or 2 or 3). In this manner, when play is provided in the rotation transmission switching system 8, the plunger 73, which may be difficult to move up and down due to contact pressures between the gears, is released from the frictions such that the plunger 73 becomes readily moveable. Further, when the drawer 28 is pushed in to perform a closing operation after the ejection is completed, a lighter force can be applied to push in the drawer 28, instead of pushing it back with a force greater than the load of the rotary gear 70, to operate the motor 66, whereby the closing operation can be readily performed. Although a time lag may occur before the time when the carriage 1 (or 2 or 3) actually starts closing, such a time lag can be accommodated by controlling the operation program. Also, the rotation angle of the play may be in a range between 160 degrees and 350 degrees, and preferably be varied according to the sizes of the gears and gear ratios.

Referring to FIG. 46, the operation of the rotation transmission switching system 8 in accordance with the embodiment of the present invention will be described. FIGS. 53–56 roughly show movements of the components that take place when the plunger 73 is switched on and off, and the ejection operation or the play operation is selected.

First, the cam gear 50 (the first gear 71) is rotated, to thereby change the height of the operation transmission gear 75 through the plate cam 57. Referring to FIG. 46, for example, when the plunger 73 is turned on in a state indicated by state 1—1 (the first number "1" in state "1—1" indicates that the first stage is selected) and the motor 66 is rotated, the cam gear 50 operates. When the first stage (1—1, 1-2, 1-3) is selected, the carriage 1 always moves to a play position.

Figure 51:
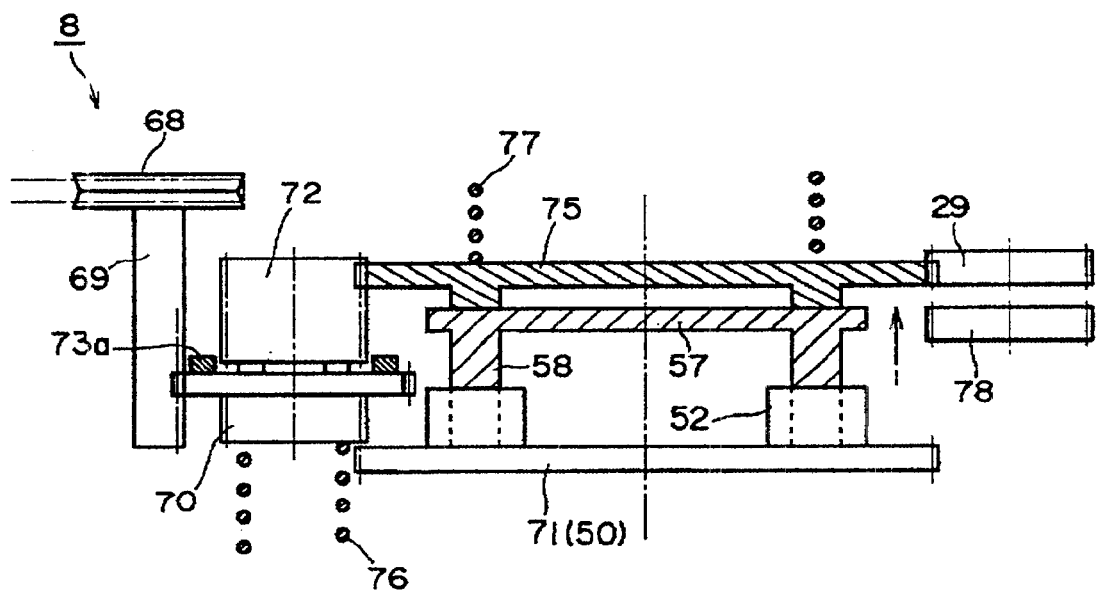
FIG. 51 schematically shows the rotation transmission switching system in an ejection operation (when the plunger is turned oft.

At state 1-2, while the condition of the first stage is maintained, the carriage 2 is selected. In other words, while the carriage 1 in the first stage is maintained in a play state, the carriage 2 is set in a state in which an ejection operation can be conducted. At this moment, the operational transmission is switched by the operation transmission gear 75 that shifts upward, and the selection of the carriage 2 by the lift arm 56 simultaneously take place. When the operation transmission gear 75 is placed in the upper position, as shown in FIG. 51, the play mode changes to the ejection mode whereby the ejection operation is set. When the plunger 73 is turned off to switch the power to the operation transmission device 75 side, the second gear 72, the operation transmission gear 75 and the ejection gear 29 rotate whereby the drawer 28 moves to set the carriage 2 in an ejection operation.

When it is desired to eject the carriage 3, the plunger 73 is temporarily turned on to rotate the cam gear 50 (see FIG. 49), to thereby set state 1-3 to select the carriage 3. Then, the plunger 73 is turned off and the motor 66 is rotated to operate the operation transmission system such that only the carriage 3 is ejected.

At state 1—1, when the plunger 73 is turned off and the motor 66 is rotated, a play mode is set. At state 1-2 or 1-3, by turning the plunger 73 off and rotating the motor 66, the selected carriage (2 or 3) is shifted. Also, at state 3-1, which indicates selection of the third stage, when the motor 66 is rotated, the carriage 3 moves to a play position (performs a play operation). State 3-2 indicates a state in which the carriage 1 is selected; and state 3—3 indicates a state in which the carriage 2 is selected. It is noted that, at state 2—2 or 3—3 (when the same numbers are repeated), the carriage 2 or 3 is merely placed in a play state.

Also, for example, when the first stage is in a play state, the carriage 2 or the carriage 3 can be ejected. However, when the first stage in a play state and the carriage 1 needs to be ejected, the carriage 1 cannot be instantly ejected because it is in the play position. Accordingly, the cam gear 50 is rotated to operate the stage determination cam 51, to select the second stage. The operation is stopped at state 2—2, and the plunger 73 is turned off and the motor 66 is rotated. As a result, the drawer 28 is ejected and the carriage 1 is also ejected.

As described above, with the rotation transmission switching system 8 of the present embodiment, the carriages 1—3 always close when the motor 66 is rotated in a reverse direction (in other words, the carriage in the ejection position closes, and the carriage in the play position returns to the neutral position). Therefore, the carriages are reset and returned to a state in which the next operation can be started.

Also, the power generated by the rotation of the operation transmission gear 75 is either for sliding the carriage to the ejection position or for sliding to the play position depending on the up or down position of the operation transmission gear 75, and is pre-selected by the configurations of the cams and other components.

Furthermore, in the rotation transmission switching system 8, both of the operation transmission system and the operation switching system can be driven by the single motor 66. Therefore, the system structure can be simplified and a CD exchange system that uses the above-described systems can be reduced in size.

Also, with the CD exchange system of the present embodiment equipped with the rotation transmission switching system 8, when one of the carriages 1–3 (one of the first stage–the third stage) is selected for performance, the other carriages can be ejected without moving the selected stage. As a result, while one of the CDs in the carriages is being played, the other CDs can be exchanged.

The embodiment described above is one example of preferred embodiments of the present invention. The present invention is not limited to the embodiment described above, and many modifications can be made without departing from the subject matter of the present invention. In other words, only one example of preferred embodiments of the present invention, in which the linkage 4, the selector system 5, the selected position retaining and returning system 6, the cam structure 7 and the rotation transmission switching system 8 are implemented in a CD exchange system, has been described so far, and the present embodiment is also applicable to systems other than the CD exchange system.

A variety of modifications in the cam configuration in the selector system 5 can be made. Some of the cam configurations are described below.

FIGS. 57–60 show tables of a variety of patterns of engagements between cams in the interlocking cams 20 and carriages. In the following example, the number of carriages (stages) may be three or five, and the interlocking cam can assume rotation angles of a maximum of six stages θ0–θ5 depending on the number of carriages. Various combinations between the number of carriages and the rotation angles are considered. In the tables, S1–S5 indicate cams corresponding to the respective carriages (stages), and θ0–θ5 indicate rotation angles determined by the number of divisions of the rotation angle of each of the cams.

Also, FIGS. 61–66 show allocation patterns of positions of indication sections on each of the cams and the rotation angles. Patterns (A)–(P) indicated in FIGS. 61–66 correspond to tables (A)–(P) shown in FIGS. 57–60, respectively. In FIGS. 61–66, the indication sections on each cam are indicated by black dots (●), non-indication sections by white dots (○), and an indication direction by a triangle. The term "indication sections" means protruded sections that engage the recessed sections 26 to indicate engagement of the interlocking cam 20 with selected carriages, and corresponds to the engaging members 25 in the present embodiment. On the other hand, the "non-indication sections" are different from the indication sections and indicate non-engagement of the interlocking cam 20 with carriages. When a plurality of the non-direction sections engages, they can serially engage. The "indication direction" is a set direction in which engagements and non-engagements are indicated.

Pattern (A) defines three stages, and the number of rotation angle divisions is equal to the number of the stages. Pattern (B) is defined by increasing the number of rotation angle divisions in pattern (A) by one; and at this added angle, the entire stages are simultaneously set as the indication sections. Pattern (B) corresponds to the configuration of the interlocking cam 20 of the present embodiment. In Pattern (C), at the added angle in pattern (B), the entire stages are set simultaneously as the non-indication sections. Pattern (G) is defined by increasing the stages in pattern (B) to five stages, and pattern (G') is defined by increasing the stages in pattern (C) to five stages. In the above five patterns, the indication sections (●) are set to correspond to the carriages (S1–S5) of the respective stages in the indication direction. For example, at the rotation angle θ1, the indication section of the cam 21 matches the first stage Si in the indication direction; at the rotation angle θ2, the indication section of the cam 22 matches the second stage S2 in the indication direction; the indication section of the cam 23 matches the third stage S3 in the indication direction; and so forth.

On the other hand, in patterns (D), (E), (F) (H) and (H'), the non-indication sections (○) match the carriages of the respective stages at the indication direction. Pattern (D) defines three stages, and pattern (E) is defined by increasing the number of rotation angle divisions in pattern (D) by one; and this addition is used to set simultaneously the entire stages as the non-indication sections. Pattern (F) uses the addition in pattern (E) to set simultaneously the entire stages as the indication sections. Pattern (H) is defined by increasing the stages in pattern (E) to five stages, and pattern (H') is defined by increasing the stages in pattern (F) to five stages.

Pattern (I) defines three stages, and the number of rotation angle divisions is equal to the number of the stages. Pattern (J) is defined by increasing the number of rotation angle divisions in pattern (I) by one; and at this addition, the non-indication section is set. Pattern (J') uses the addition in pattern (J) to set the entire stages as the non-indication sections. Pattern (N) is defined by increasing the stages in pattern (J) to five stages, and pattern (M) is defined by increasing the stages in pattern (J') to five stages. In the above five patterns, the stages (S1–S5) are set to correspond to the rotation angles (θ0–θ5) at the indication sections such that all of the stages above and below a stage that is set with the indication section (●) are indicated in the indication direction. For example, in pattern (I), at the rotation angle θ0, the first stage S1 matches the indication section of the first cam 21 in the indication direction; at the rotation angle θ1, the first stage S1 and the second stage S2 match the indication sections of the first cam 21 and the second cam 22 in the indication direction; at the rotation angle θ2, the first stage S1, the second stage S2 and the third stage S3 match the indication sections of the first cam 21, the second cam 22 and the third cam 23 in the indication direction; and so forth.

On the other hand, in patterns (K), (L), (P) and (0), the stages (S1–S5) are set to correspond to the rotation angles (θ0–θ5) at the indication sections such that all of the stages above and below a stage that is set with the non-indication section (○) are non-indicated in the indication direction. Pattern (K) defines three stages, and the number of rotation angle divisions is equal to the number of the stages. Pattern (L) is defined by increasing the number of rotation angle divisions in pattern (K) by one; and at this addition, the entire stages are set as the indication sections. Pattern (P) is defined by increasing the stages in pattern (L) to five stages, and pattern (O) is defined by increasing the stages in pattern (K) to five stages.

When only a selected carriage is freed such as in patterns (E) and (F), the carriages can be ejected as a result of having been freed. In the case of freeing the selected carriage and in the case of indicating engagement output stage a selected carriage like in patterns (B) and (C), the operations of the interlocking cam 20 and the recessed section 26 are reversed. For example, a carriage can be pulled out by hooking the hook 37a of the position-retaining device 37 at the recessed section 36 of the carriage, and shifting the hook 37a. In this case, for carriages that do not require an ejection operation, the interlocking cam 20 may be coupled to side sections thereof to prevent the ejection operation. In such a case, the hook 37a moves by riding over the recessed section 36. In other words, each of the carriages is hooked by the interlocking cam 20 so as not to shift from the neutral position.

Also, in pattern (B), which corresponds to the present embodiment, at least one of the cams is hooked by the interlocking cam 20 at any of the rotation angles of the interlocking cam 20. Therefore, at any one of the rotation angles, the entire carriages 1–3 would not be freed. It is noted that, making the indication of the entire stages possible would be convenient because the carriages can be maintained fixed so that they would not jump out when the equipment such as the CD exchange system is transferred.

As described above, with the cam structure in accordance with the embodiment of the present invention, the cam configuration can be optimized in the rotation angle of 360 degrees of the cams, and therefore movements in the axial direction of one of the follower sections and movements in the radial direction of another of the follower sections can be readily and optimally timed. As a result, movements in a variety of patterns can be realized by a single rotary cam.

Also, with the cam structure in accordance with the embodiment of the present invention, a single rotary cam achieves an operation in which, while a desired one of the carriages is maintained in a state in which its position is determined, and switching of the power transmission and selection of other carriages to be shifted can be conducted.

Furthermore, with the cam structure in accordance with the embodiment of the present invention, an operation cam (fourth cam) that is capable of switching on and off a rotational position determination switch depending on the rotation amounts of the cam can be integrated.

Also, with the cam structure in accordance with the embodiment of the present invention, a disk exchange system equipped with the effects provided by the cam structure described above can be obtained.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A cam structure comprising:
    a first follower section:
    a first cam for displacing the first follower section in a radial direction, the first cam having divided segments defining at least three arcuate surfaces with different radiuses and sloped connection surfaces that connect the arcuate surfaces, each of the sloped connection surfaces extending in a predetermined rotation angle range that gives pressure angles in a specified range with respect to the first follower;
    a second follower section that engages and rotates with the first cam, the second follower section having at least three support pins; and
    a second cam that displaces the second follower section in an axial direction, the second cam having cam sections, each of the cam sections being divided in the radial direction in a number corresponding to the number of the support pins, wherein the divided cam sections are arranged in a circumferential direction at locations that time displacements in the axial direction of the second follower section with displacements in the radial direction of the first follower section.

2. A cam structure according to claim 1, wherein rotation angles of the respective arcuate surfaces of the first cam are mutually equal, and each of the cam sections of the second cam has a plane surface and sloped sections on both sides of the plane surface wherein circumferential angular widths of the plane surfaces of the respective cam sections of the second cam are mutually equal.

3. A cam structure according to claim 2, wherein circumferential angular widths of the sloped connection surfaces of the first cam are different from one another, and the second cam has bottom sections between adjacent ones of the cam sections wherein circumferential angular widths of the bottom sections between adjacent ones of the cam sections of the second cam are different from one another.

4. A cam structure according to claim 3, wherein the support pins of the second follower section are provided at equal angular intervals of 120 degrees, and the sloped sections of the cam sections of the second cam are provided at equal angular intervals of 120 degrees, wherein each of the cam sections is divided in the radial direction into three segments, the three segments being shifted from one another in the circumferential direction to time displacements in the axial direction of the second follower section with displacements in the radial direction of the first follower section.

5. A cam structure according to claim 1, further comprising a third cam in a circular configuration with a cam radius thereof changing in stages according to rotation angles for selecting one of at least two carriages to be moved, wherein the first cam performs selection and positioning of one of the at least two carriages, the second cam displaces the second follower section in the axial direction to switch a power transmission, wherein the first cam, the second cam and the third cam are formed in one piece.

6. A cam structure according to claim 5, wherein the second cam switches the power transmission within a specified rotation angle range that is continuous with the same radius of each of at least three arcuate surfaces of the first cam, and switching of the power transmission by the second cam and the selection of the carriages are performed in a specified rotation angle range of the cam sections of a plurality of radiuses.

7. A cam structure according to claim 6, further comprising a fourth cam that operates a rotational position determination switch for detecting operation positions of the first, second and third cams, which rotate 360 degrees, within respective rotation angles thereof.

8. A cam structure comprising:
    a first cam having three arcuate surfaces with different radiuses for displacing a rotatably supported follower arm in a radial direction in three stages; and
    a second cam that shifts in an axial direction a follower plate that rotates with the first cam and has three support sections, the second cam having first, second and third cam sections,
    wherein each of the first, second and third cam sections of the second cam is divided in the radial direction in a number equivalent to the number of the support pins into three segments, the first, second and third cam sections being disposed in a circumferential direction such that shifts of the follower plate in the axial direction are timed with shifts in the radial direction of the follower arm.

9. A cam structure according to claim 8, wherein the three segments of each of the first, second and third cam sections are shifted from one another in the circumferential direction to time movements of the follower plate in the axial direction with movements in the radial direction of the follower arm.

10. A cam structure according to claim 9, wherein the three segments in each of the first, second and third cam sections define an inner segment, an intermediate segment and an outer segment, and the three support sections of the follower plate are disposed at different radiuses corresponding to radiuses of the inner segment, the intermediate segment and the outer segment, respectively.

11. A cam structure according to claim 10, wherein the three support sections of the follower plate are in contact with the inner segment of the first cam section, the intermediate segment in the second cam section and the outer segment of the third cam section, respectively.

12. A cam structure according to claim 11, wherein the inner segment, the intermediate segment and the outer segment in each of the first, second and third cam sections are shifted from one another in the circumferential direction.

13. A cam structure according to claim 11, wherein the three support sections of the follower plate are disposed at equal angular lintervals of 120 degrees.

14. A cam structure according to claim 12, wherein portions on the inner segment of the first cam section, the intermediate segment in the second cam section and the outer segment of the third cam section, which are in contact with the three support sections of the follower plate, are disposed at equal angular intervals of 120 degrees.

15. A cam structure according to claim 9, wherein each of the three segments of each of the first, second and third cam sections of the second cam has a raised plane surface and sloped sections on both sides of the raised plane surface, and the second cam has bottom sections provided between adjacent ones of the first, second and third cam sections in the circumferential direction, wherein the circumferential angular widths of the bottom sections between adjacent ones of the first, second and third cam sections in the circumferential direction are different from one another.

16. A cam structure according to claim 8, further comprising a third cam with a cam radius thereof changing in stages in the circumferential direction for selecting one of at least two carriages to be moved, wherein the first cam operates to select and position one of the at least two carriages, the second cam displaces the follower plate in the axial direction to switch a power transmission, wherein the first cam, the second cam and the third cam are formed in one piece.

17. A cam structure according to claim 16, wherein the second cam switches the power transmission within a specified rotation angle range that is continuous with the same radius of each of the three arcuate surfaces of the first cam, and switching of the power transmission by the second cam and the selection of the carriages are performed in a specified rotation angle range of each of the first, second and third cam sections of a plurality of radiuses.

18. A cam structure according to claim 17, further comprising a fourth cam that operates a rotational position determination switch for detecting operation positions of the first, second and third cams within respective rotation angles thereof.

19. A cam structure according to claim 12, wherein portions on the inner segment of the first cam section, the intermediate segment in the second cam section and the outer segment of the third cam section, which are in contact with the three support sections of the follower plate, are disposed at equal angular intervals of 120 degrees.

20. A cam structure according to claim 9, wherein the three segments in each of the first, second and third cam sections define an inner segment, an intermediate segment and an outer segment, the three support sections of the follower plate are disposed at different radiuses corresponding to radiuses of the inner segment, the intermediate segment and the outer segment, respectively, and are in contact with portions on the inner segment of the first cam section, the intermediate segment in the second cam section and the outer segment of the third cam section.

21. A cam structure according to claim 20, wherein the first cam includes sloped connection surfaces that connect the three arcuate surfaces of the first cam, and the second cam has bottom sections between adjacent ones of the first, second and third cam sections, wherein circumferential angular widths of the three arcuate surfaces of the first cam are mutually equal, circumferential angular widths of the sloped connection surfaces of the first cam are different from one another, and circumferential angular widths of the bottom sections between adjacent ones of the first, second and third cam sections of the second cam are different from one another.

22. A disk exchange system comprising:
  a first cam having at least three arcuate surfaces with different radiuses for displacing a rotatably supported follower arm in a radial direction in three stages;
  a second cam that shifts in an axial direction a follower plate that rotates with the first cam and has three support sections, the second cam having at least three cam sections,
  wherein each of the cam sections of the second cam is divided in the radial direction in a number equivalent to the number of the support pins, the plurality of cam sections being disposed in a circumferential direction such that shifts of the follower plate in the axial direction are timed with shifts in the radial direction of the follower arm;
  a selector system that selects one of carriages according to displacement positions of the follower arm; and
  a rotation transmission switching system that switches a rotational power transmission by up and down movements of the follower plate.

* * * * *